US010503598B2

(12) United States Patent
Trichardt et al.

(10) Patent No.: US 10,503,598 B2
(45) Date of Patent: Dec. 10, 2019

(54) REBUILDING DATA WHILE READING DATA IN A DISPERSED STORAGE NETWORK

(71) Applicant: International Business Machines Corporation, Armonk, NY (US)

(72) Inventors: Brennan James Trichardt, Chicago, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 16/151,108

(22) Filed: Oct. 3, 2018

(65) Prior Publication Data

US 2019/0034279 A1  Jan. 31, 2019

Related U.S. Application Data

(63) Continuation of application No. 15/352,292, filed on Nov. 15, 2016, now Pat. No. 10,095,580, which is a continuation of application No. 14/306,312, filed on Jun. 17, 2014, now Pat. No. 9,501,360.

(60) Provisional application No. 61/841,603, filed on Jul. 1, 2013.

(51) Int. Cl.
*G06F 11/10* (2006.01)

(52) U.S. Cl.
CPC .. *G06F 11/1092* (2013.01); *G06F 2211/1028* (2013.01)

(58) Field of Classification Search
CPC .................................................. G06F 11/1092
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Joseph R Kudirka
(74) *Attorney, Agent, or Firm* — Garlick & Markison; Timothy W. Markison; Timothy D. Taylor

(57) ABSTRACT

A method includes executing a read request regarding a set of encoded data slices stored in storage units of the DSN, where a data segment of data is encoded in accordance with a dispersed storage error coding function to produce the set of encoded data slices, and where a decode threshold number of encoded data slices of the set of encoded data slices is required to rebuild the data segment. The method further includes reconstructing the data segment from at least the decode threshold number of encoded data slices of the set of encoded data slices, where the at least the decode threshold number of encoded data slices are included in read responses from the storage units. The method further includes determining an encoded data slice not used in the reconstructing needs to be rebuilt and rebuilding the encoded data slice using the reconstructed data segment.

18 Claims, 51 Drawing Sheets

(56) References Cited

U.S. PATENT DOCUMENTS

| | | |
|---|---|---|
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 7,809,979 B2 * | 10/2010 | Mochizuki .......... G06F 11/1092 714/38.14 |
| 9,424,132 B2 | 8/2016 | Volvovski et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0002946 A1 | 1/2007 | Bouton et al. |
| 2007/0074266 A1 | 3/2007 | Raveendran et al. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2009/0113237 A1 * | 4/2009 | Ito ...................... G06F 11/1092 714/6.32 |
| 2010/0023524 A1 | 1/2010 | Gladwin et al. |
| 2011/0029711 A1 | 2/2011 | Dhuse et al. |
| 2011/0029836 A1 | 2/2011 | Dhuse et al. |
| 2013/0151927 A1 | 6/2013 | Leggette et al. |
| 2014/0351659 A1 | 11/2014 | Dhuse et al. |

OTHER PUBLICATIONS

European Patent Office; Extended European Search Report; EP Application No. 14819242.0; dated Feb. 10, 2017; 8 pgs.

Harrison; Lightweight Directory Access Protocol (LDAP): Authentication Methods and Security Mechanisms; IETF Network Working Group; RFC 4513; Jun. 2006; pp. 1-32.

International Searching Authority; International Search Report and Written Opinion; International Application No. PCT/US2014/044869; dated Nov. 19, 2014; 9 pgs.

Jay J. Wylie, Survivable Information Storage System, IEEE, pp. 61-68, Aug. 2000.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Norking Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner

DST allocation info 242 | data partition info 320: data ID; No. of partitions; Addr. info for each partition; format conversion indication task execution info 322

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

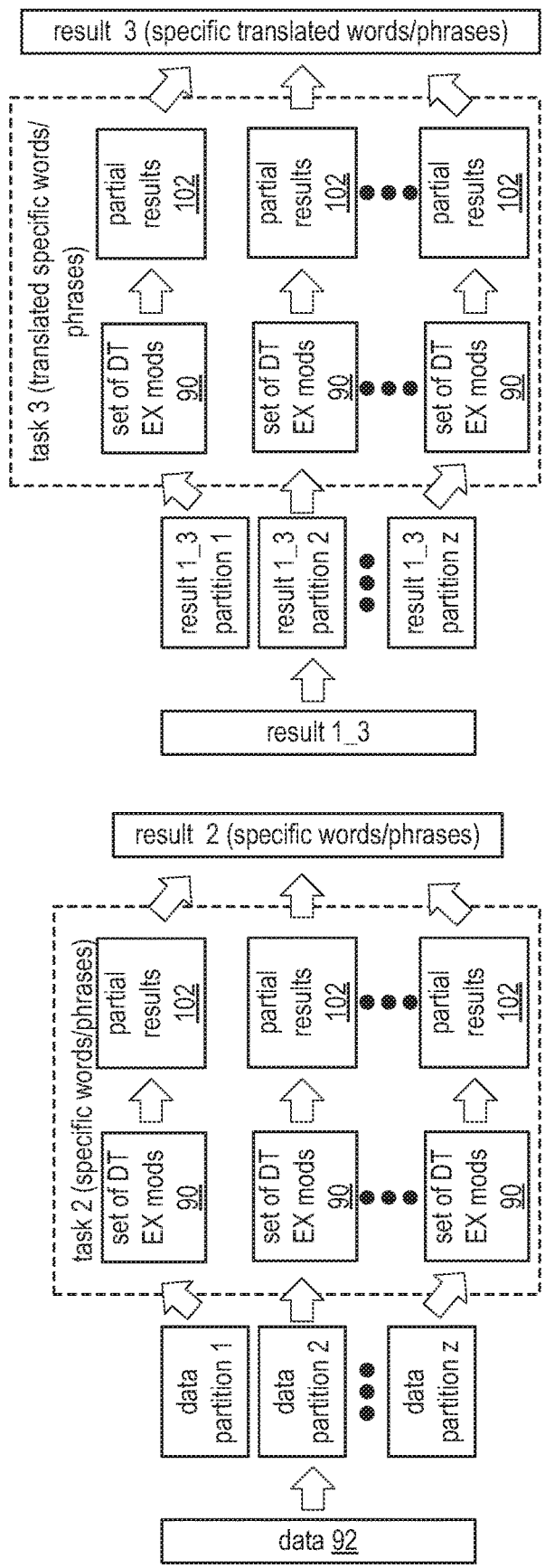
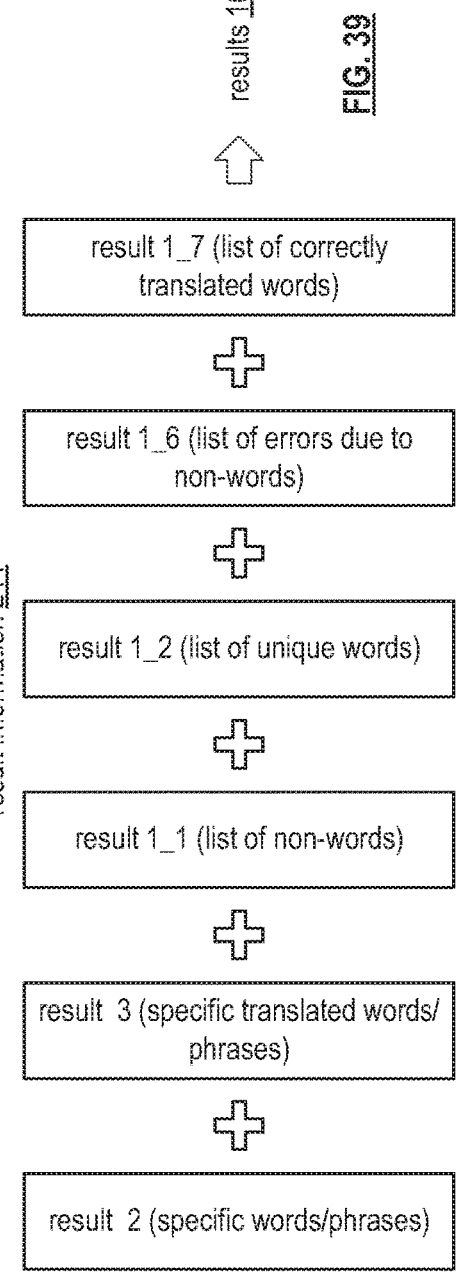

REBUILDING DATA WHILE READING DATA IN A DISPERSED STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 15/352,292, entitled "REBUILDING DATA WHILE READING DATA Ind. A DISPERSED STORAGE NETWORK," filed Nov. 15, 2016, issuing as U.S. Pat. No. 10,095,580 on Oct. 9, 2018, which is a continuation of U.S. Utility application Ser. No. 14/306,312, entitled "REBUILDING DATA WHILE READING DATA Ind. A DISPERSED STORAGE NETWORK," filed Jun. 17, 2014, now as issued U.S. Pat. No. 9,501,360, which claims priority pursuant to 35 U.S.C. § 119(e) to U.S. Provisional Patent Application No. 61/841,603, entitled "ACCESSING PERMUTATIONS OF DATA WITHIN A DISPERSED STORAGE NETWORK", filed Jul. 1, 2013, expired, all of which are hereby incorporated herein by reference in their entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 45A:
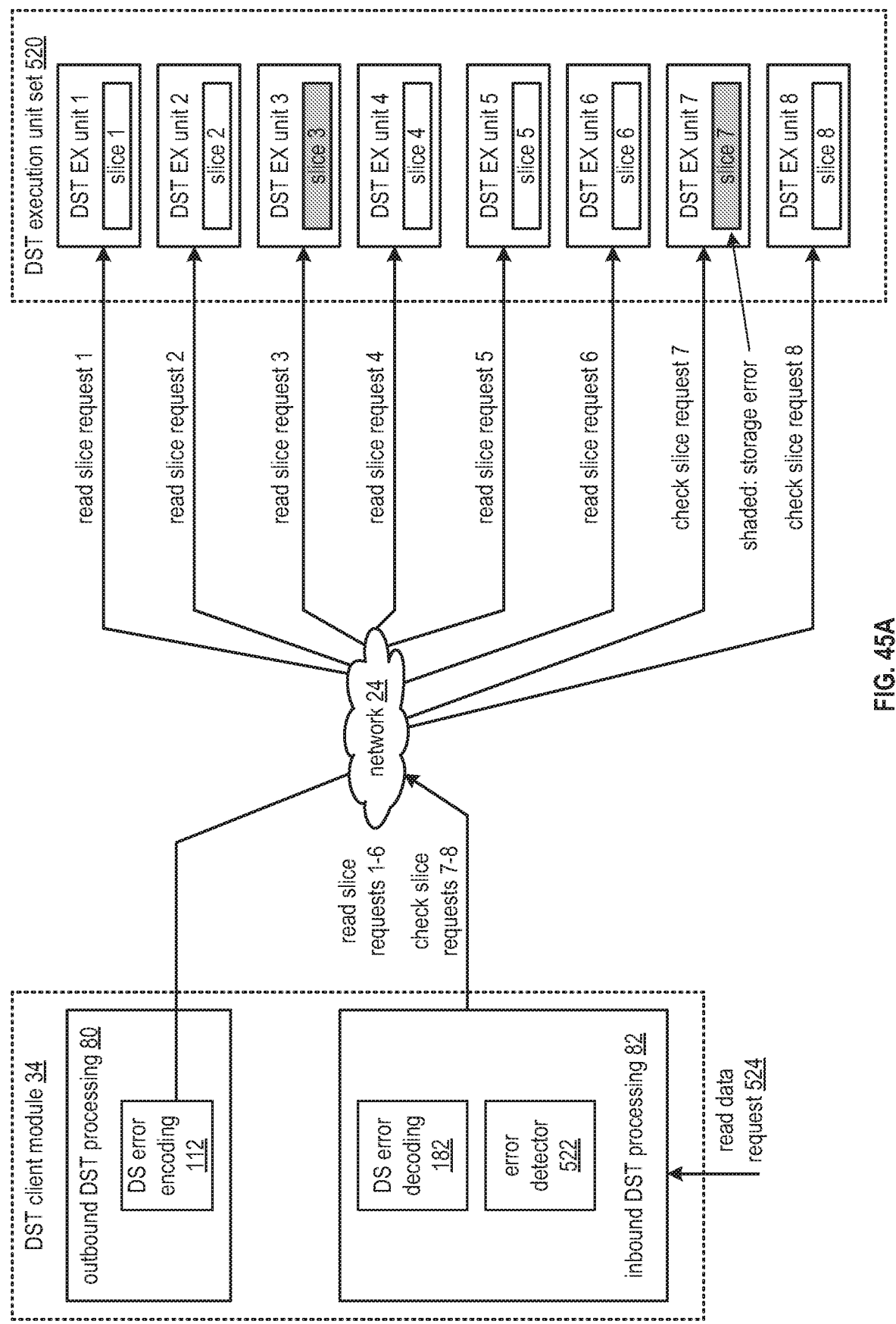
Figure 45B:
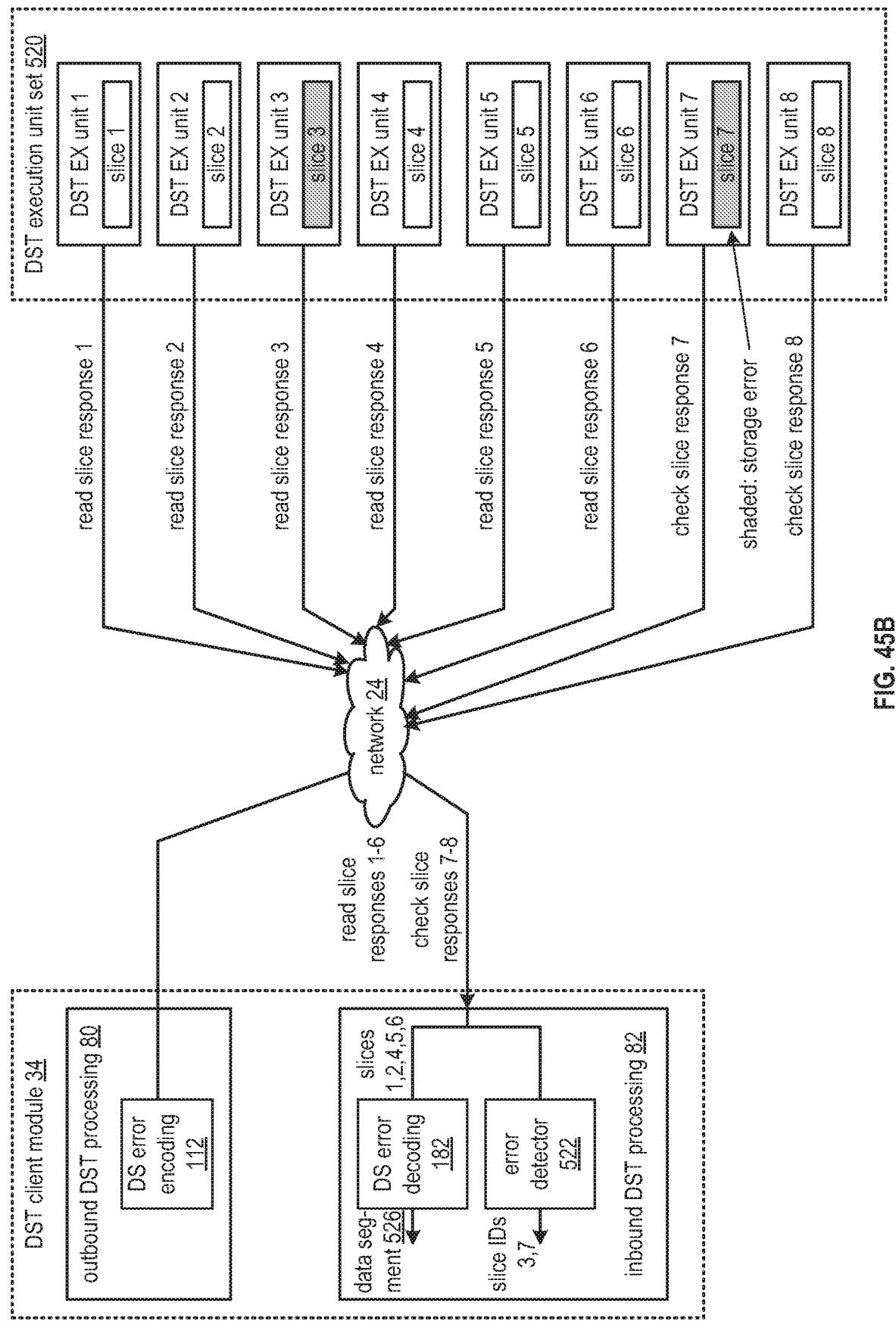
Figure 45C:
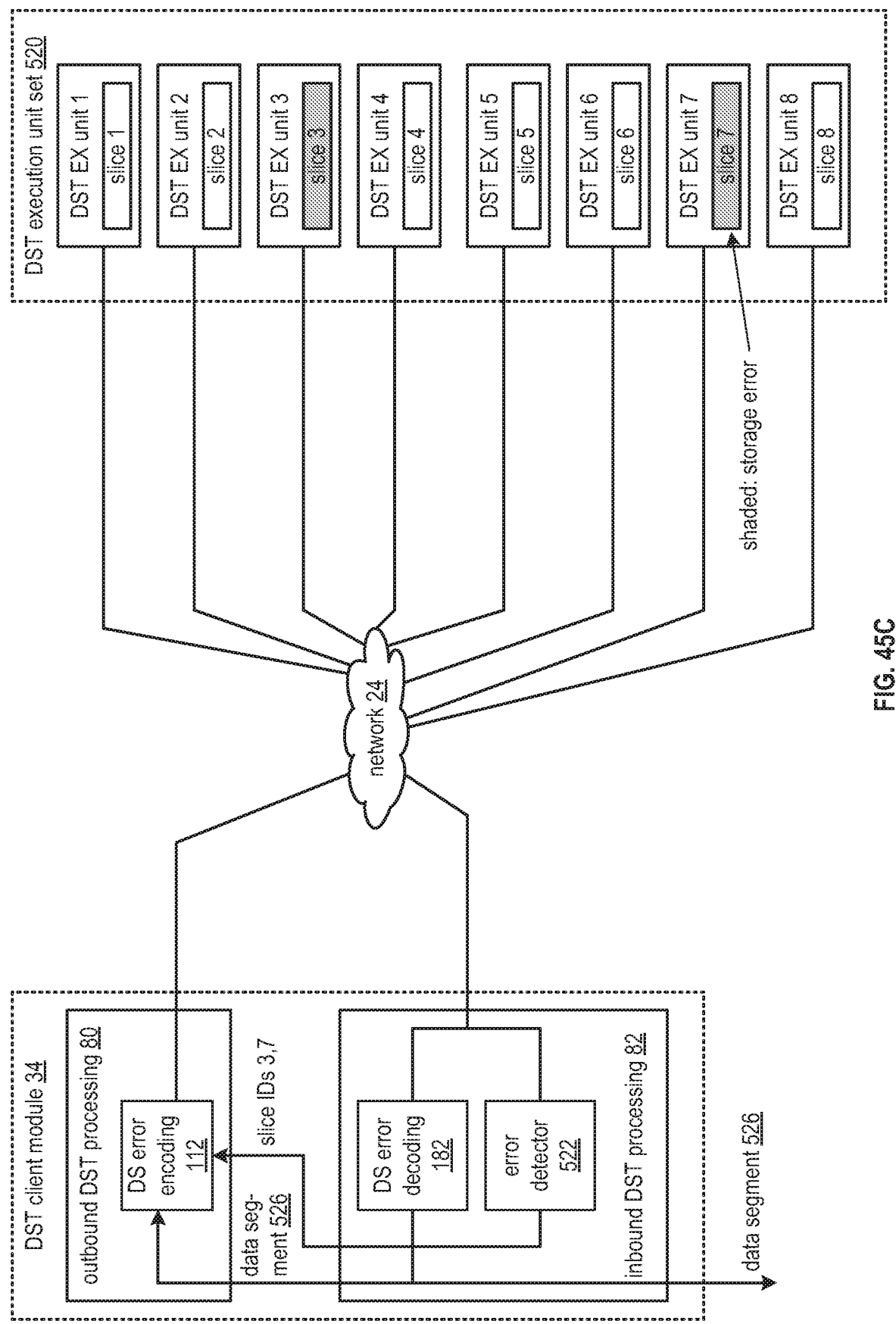
Figure 45D:
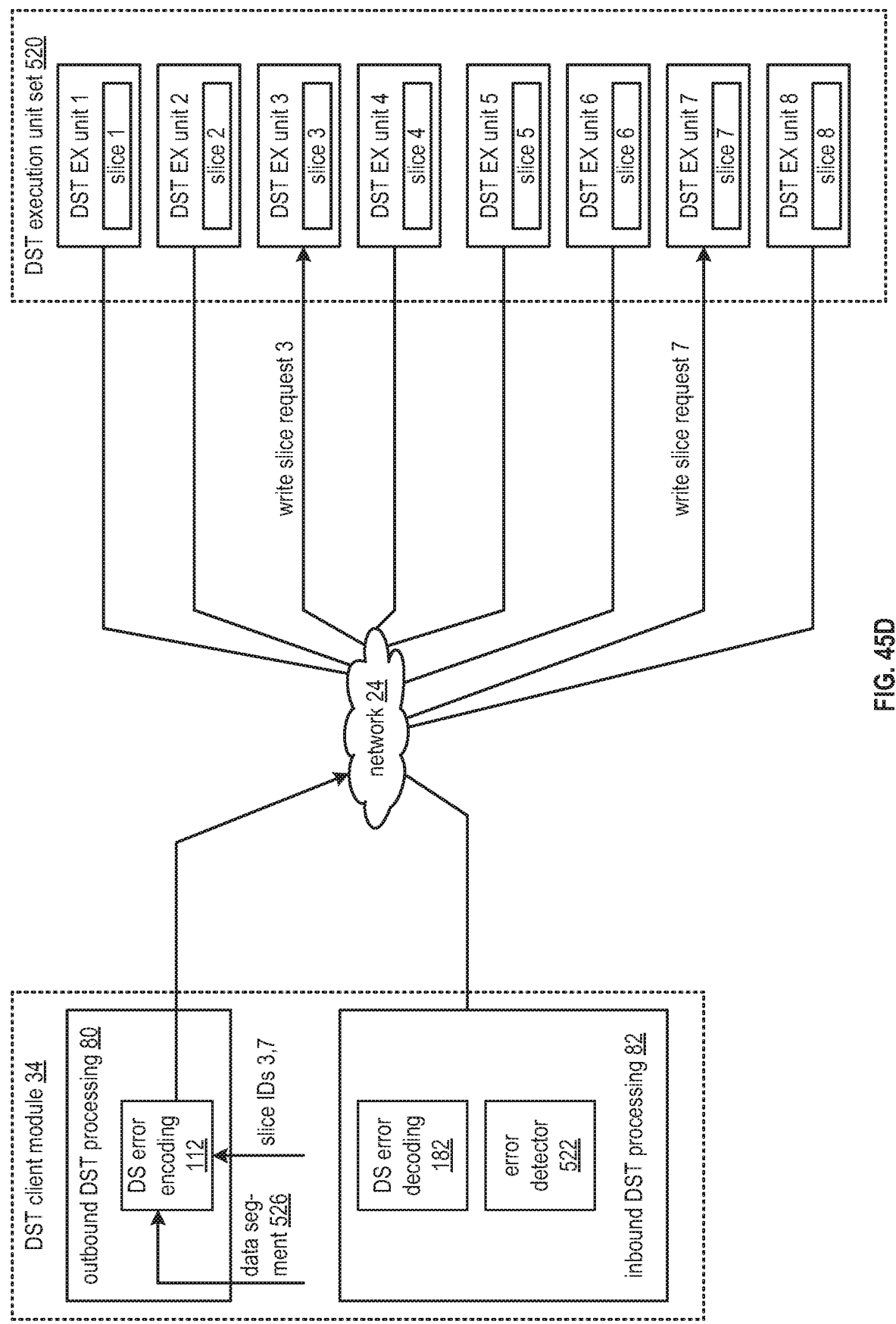
Figure 45E:
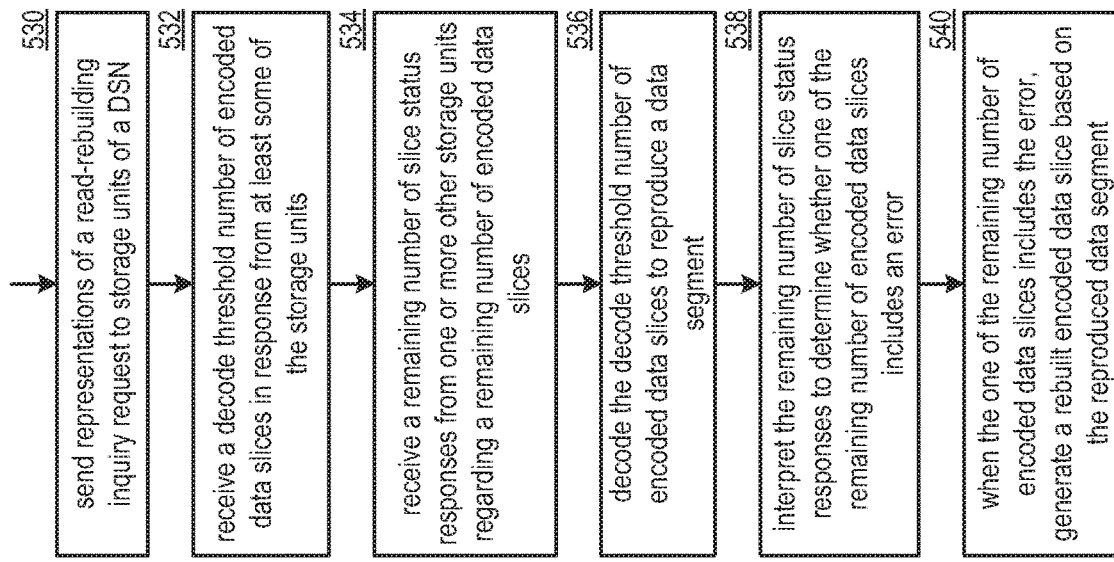
Figure 46A:
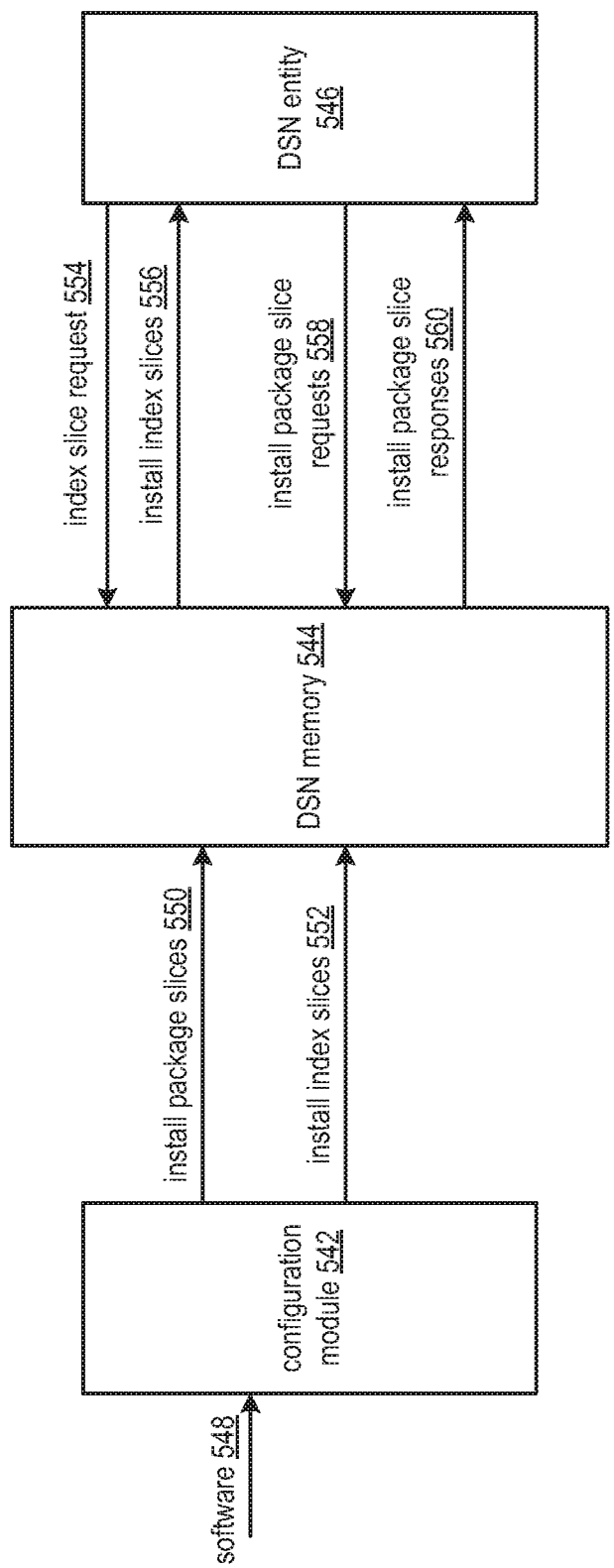
Figure 46B:
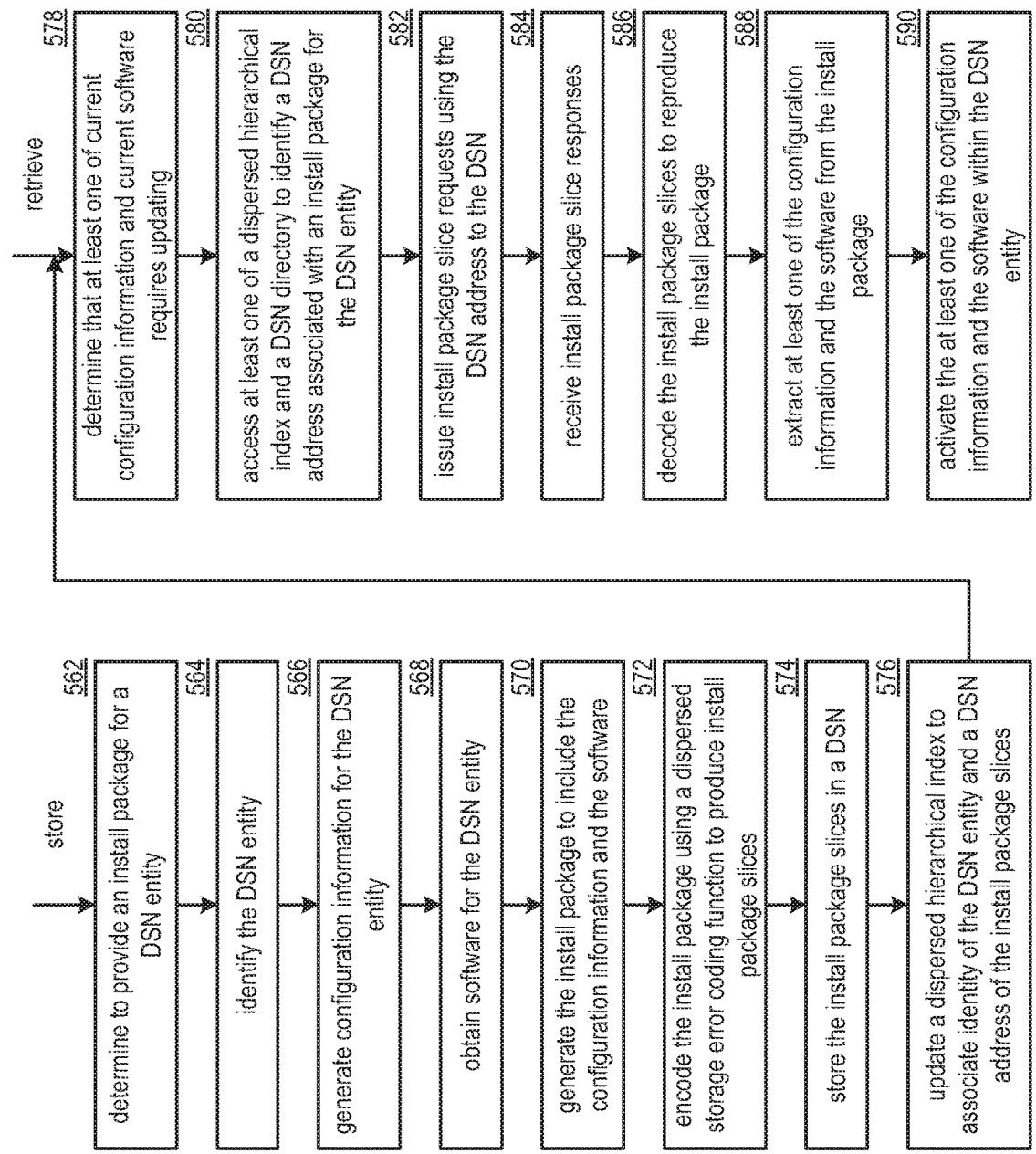

FIGS. 45A-D are diagrams of another embodiment of a dispersed storage network (DSN) illustrating an example of rebuilding data in accordance with the present invention;

FIG. 45E is a flowchart illustrating an example of rebuilding data in accordance with the present invention;

FIG. 46A is a diagram of another embodiment of a dispersed storage network in accordance with the present invention; and FIG. 46B is a flowchart illustrating an example of updating configuration information and software in accordance with the present invention.

DETAILED DESCRIPTION OF THE INVENTION

Figure 1:
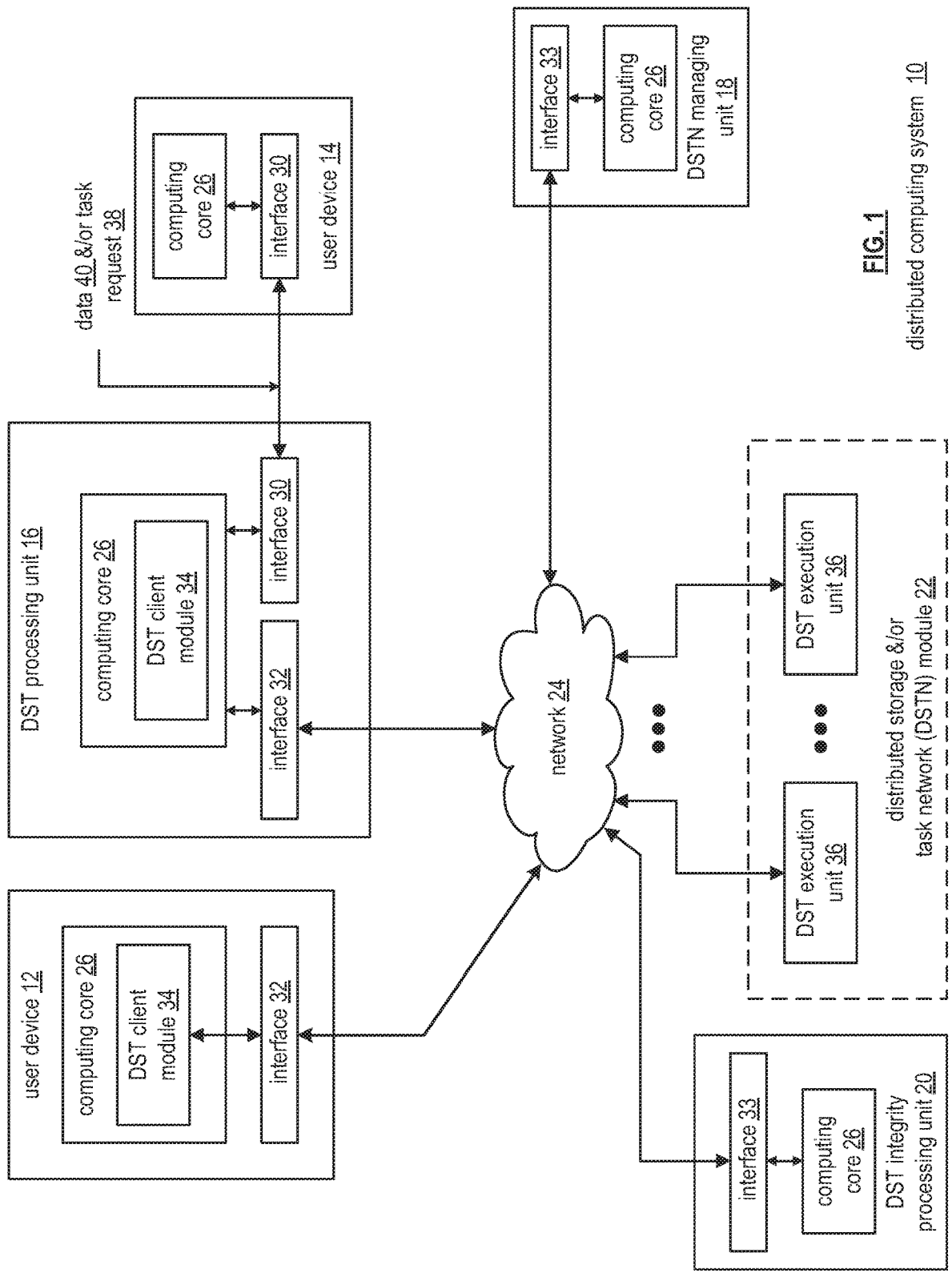
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
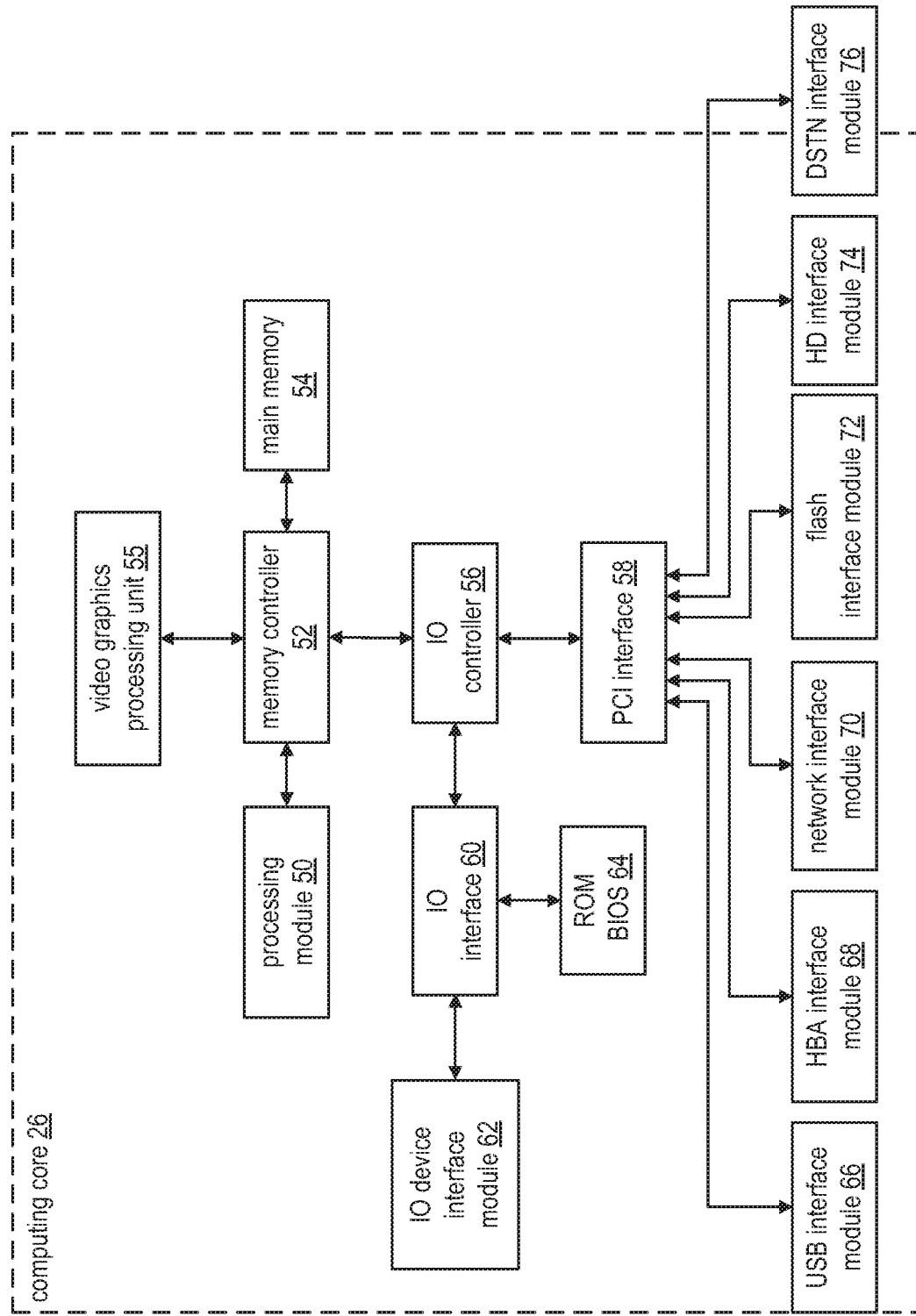
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
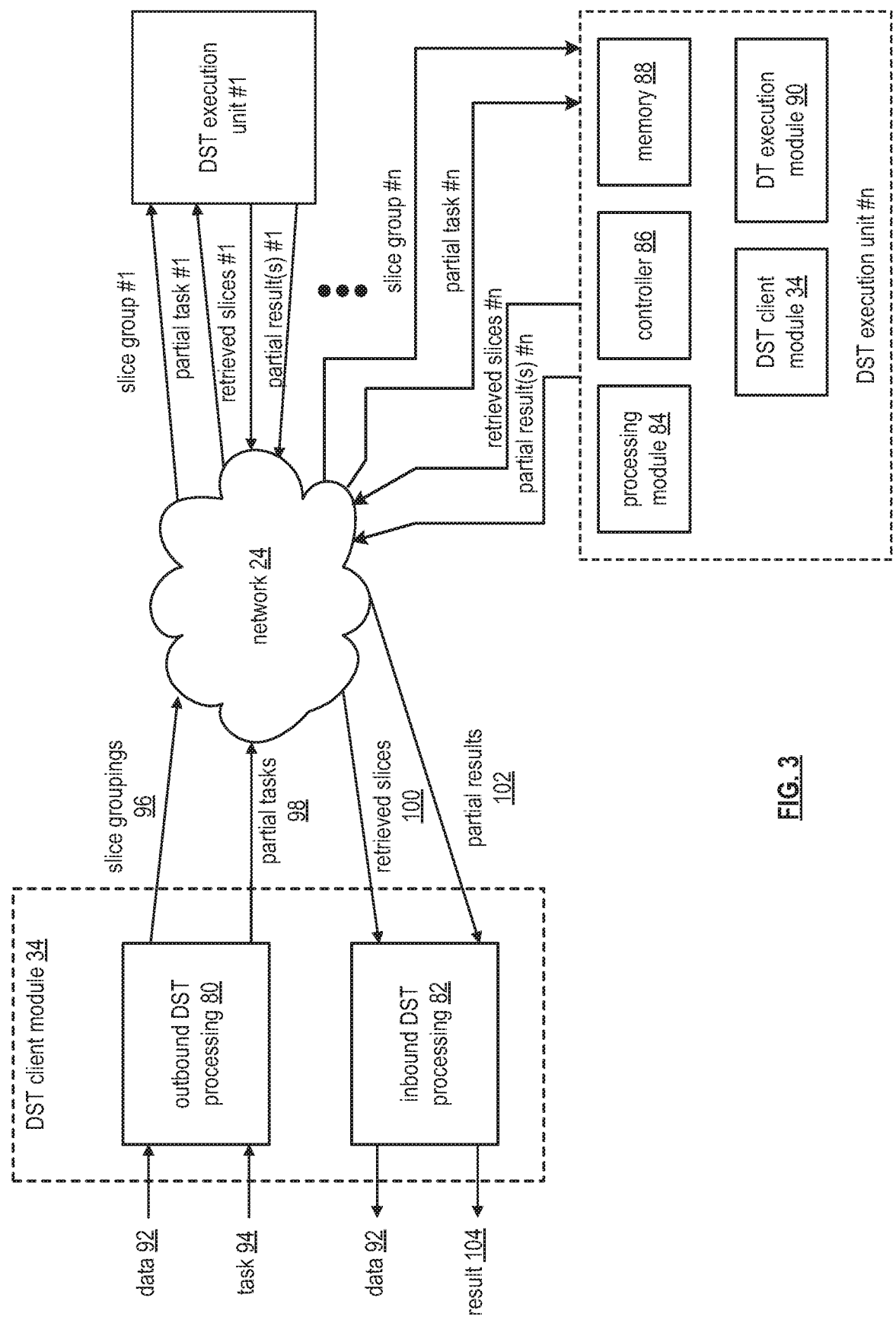
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-*n*.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
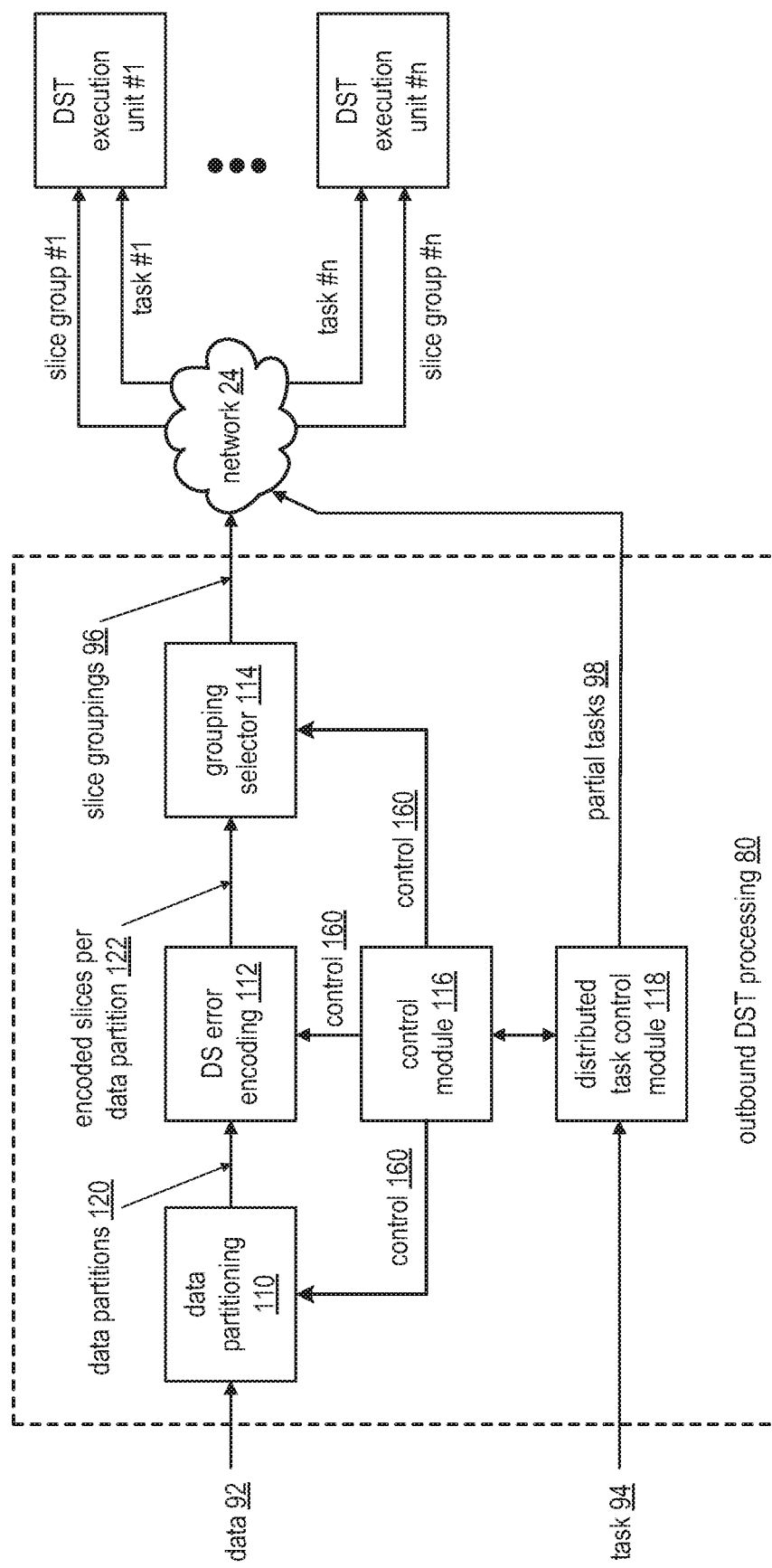
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
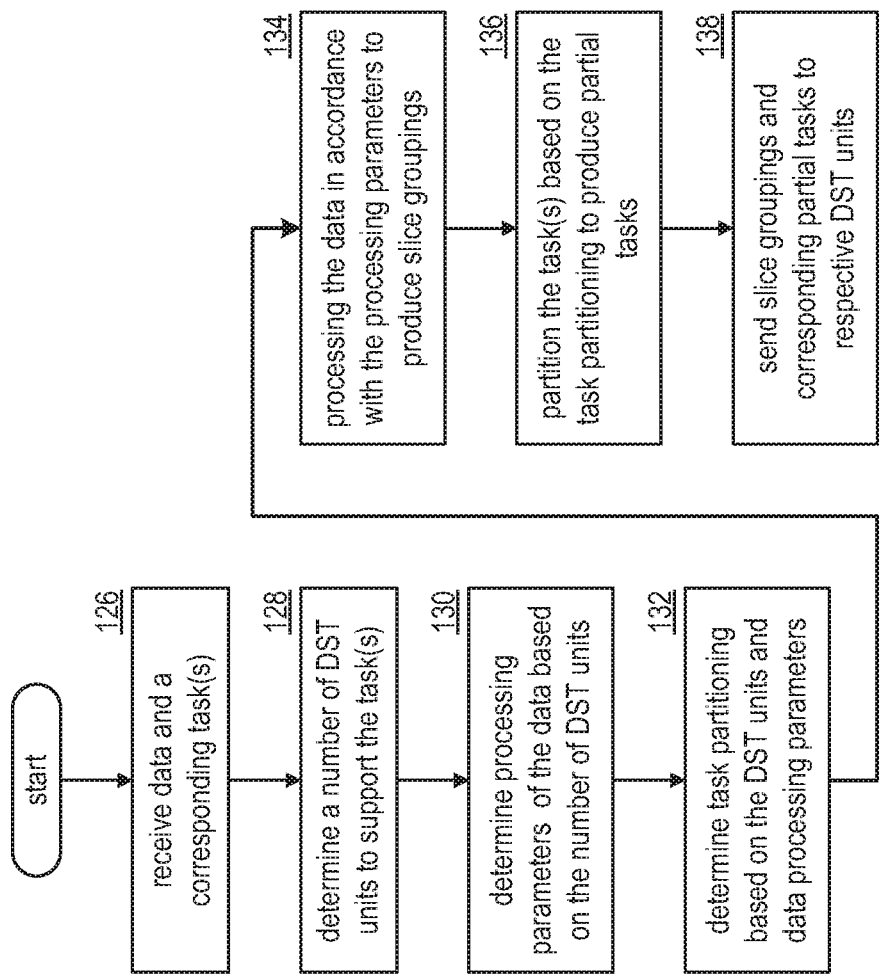
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
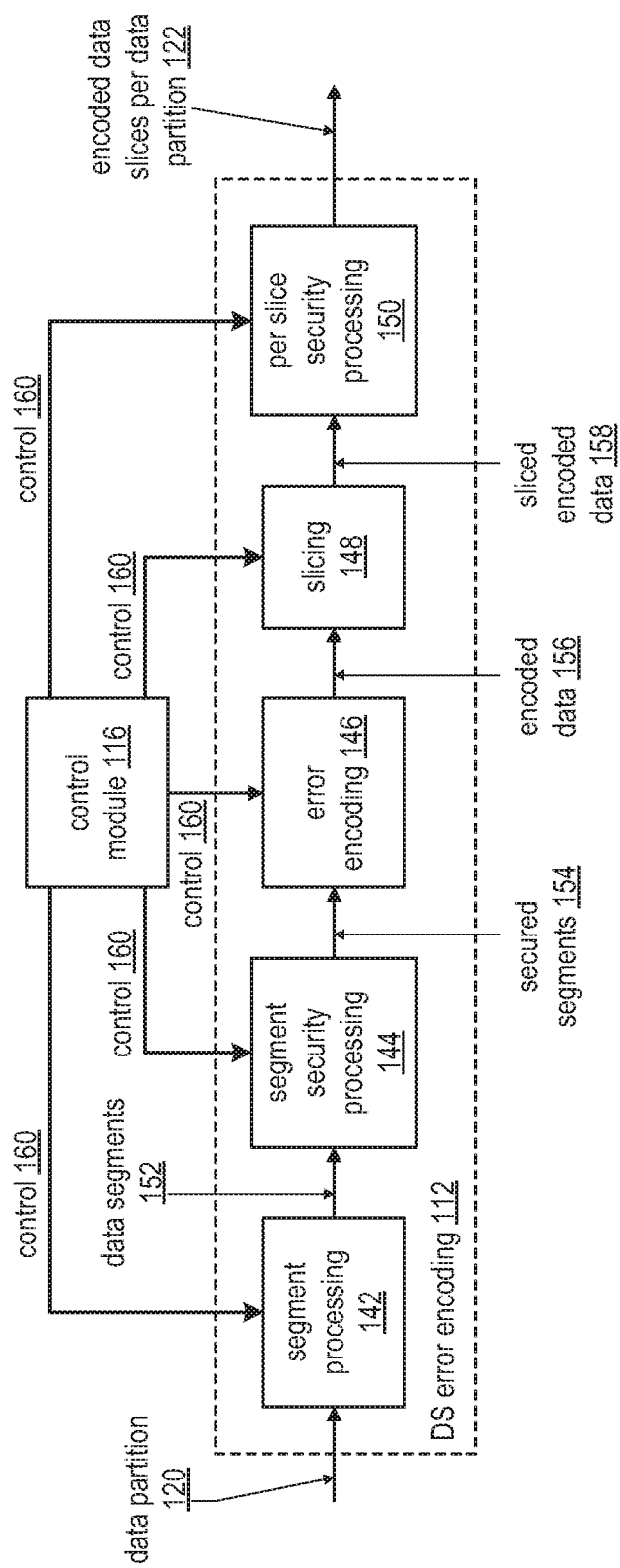
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
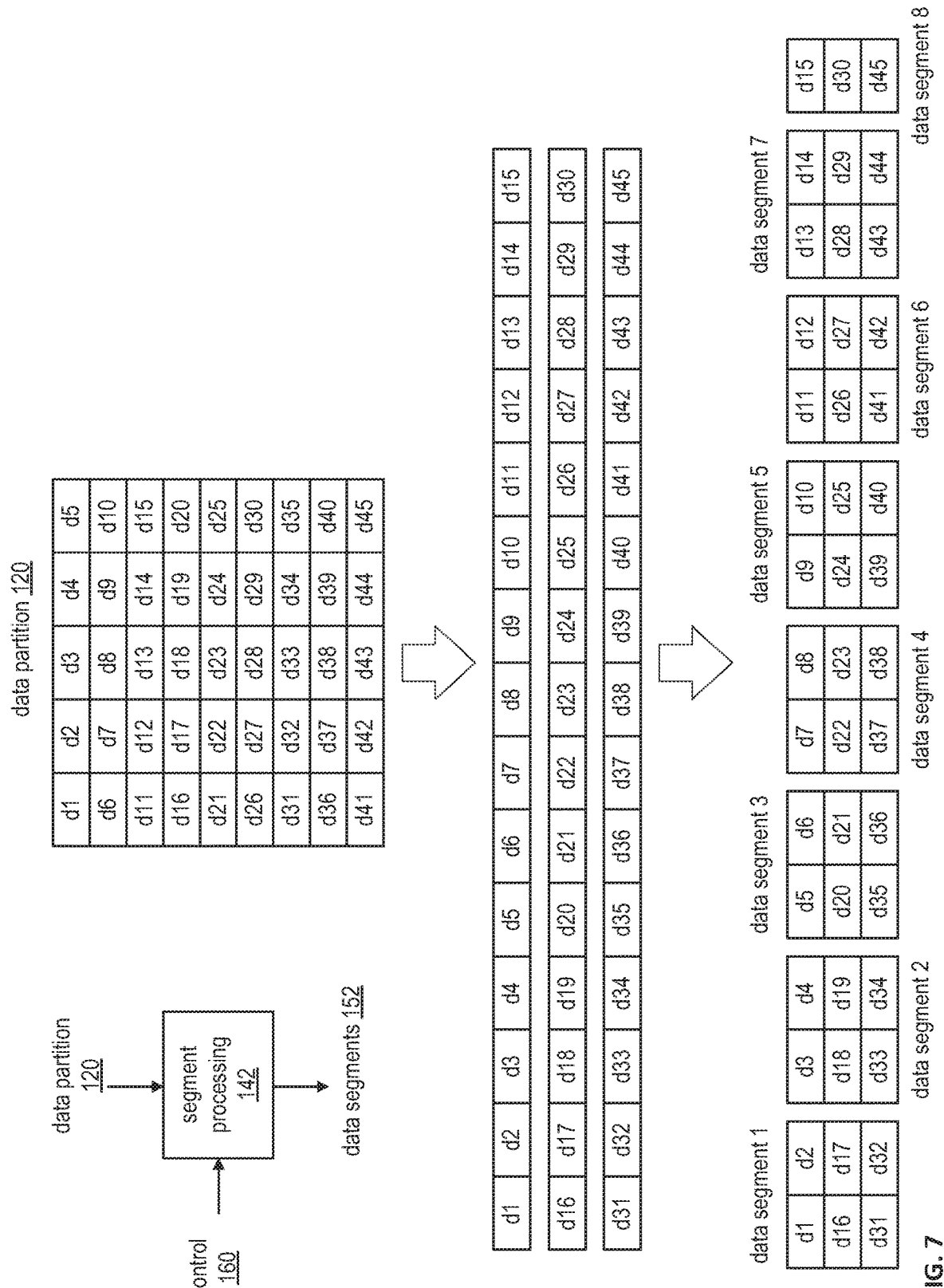
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
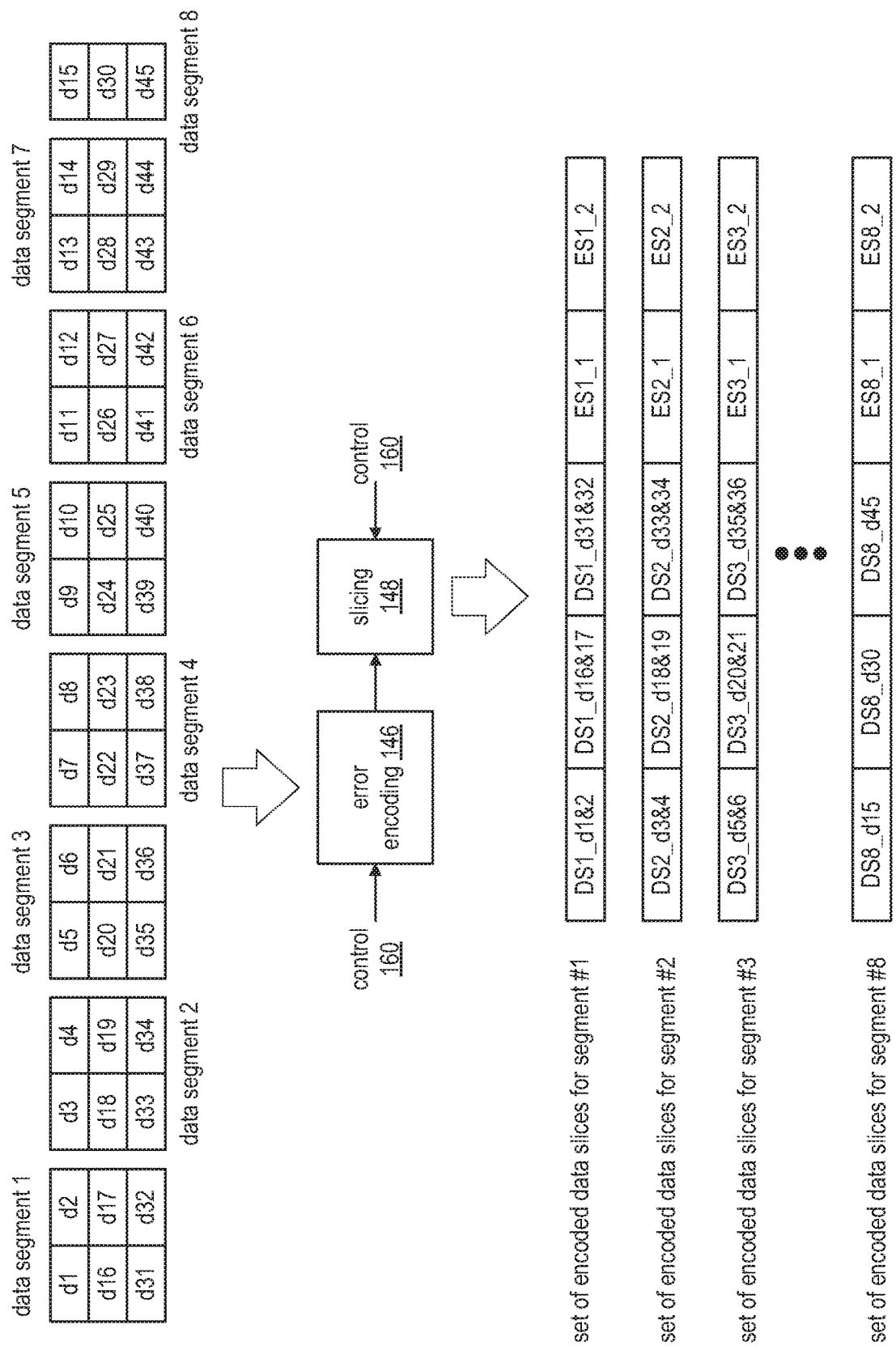
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
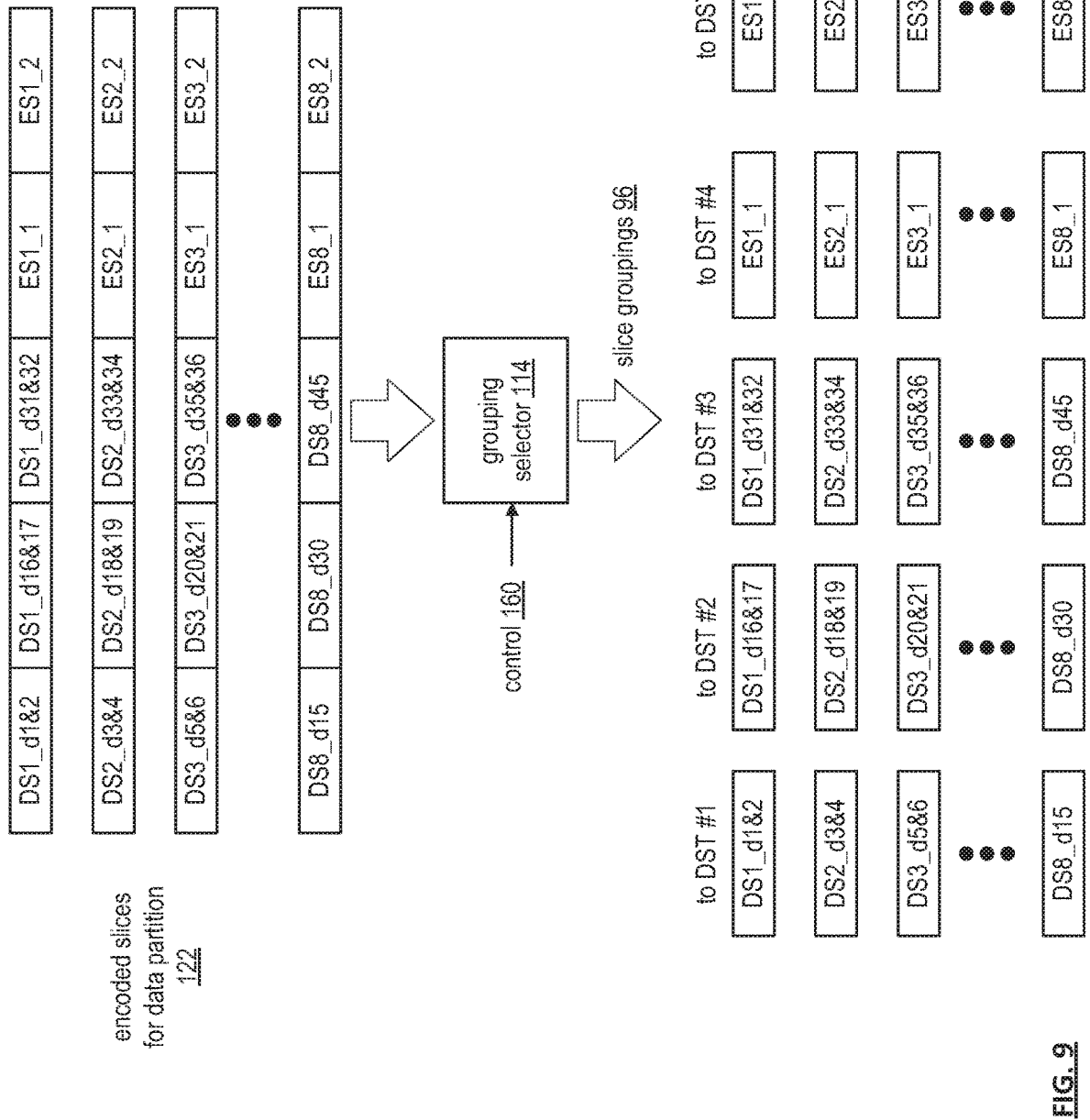
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
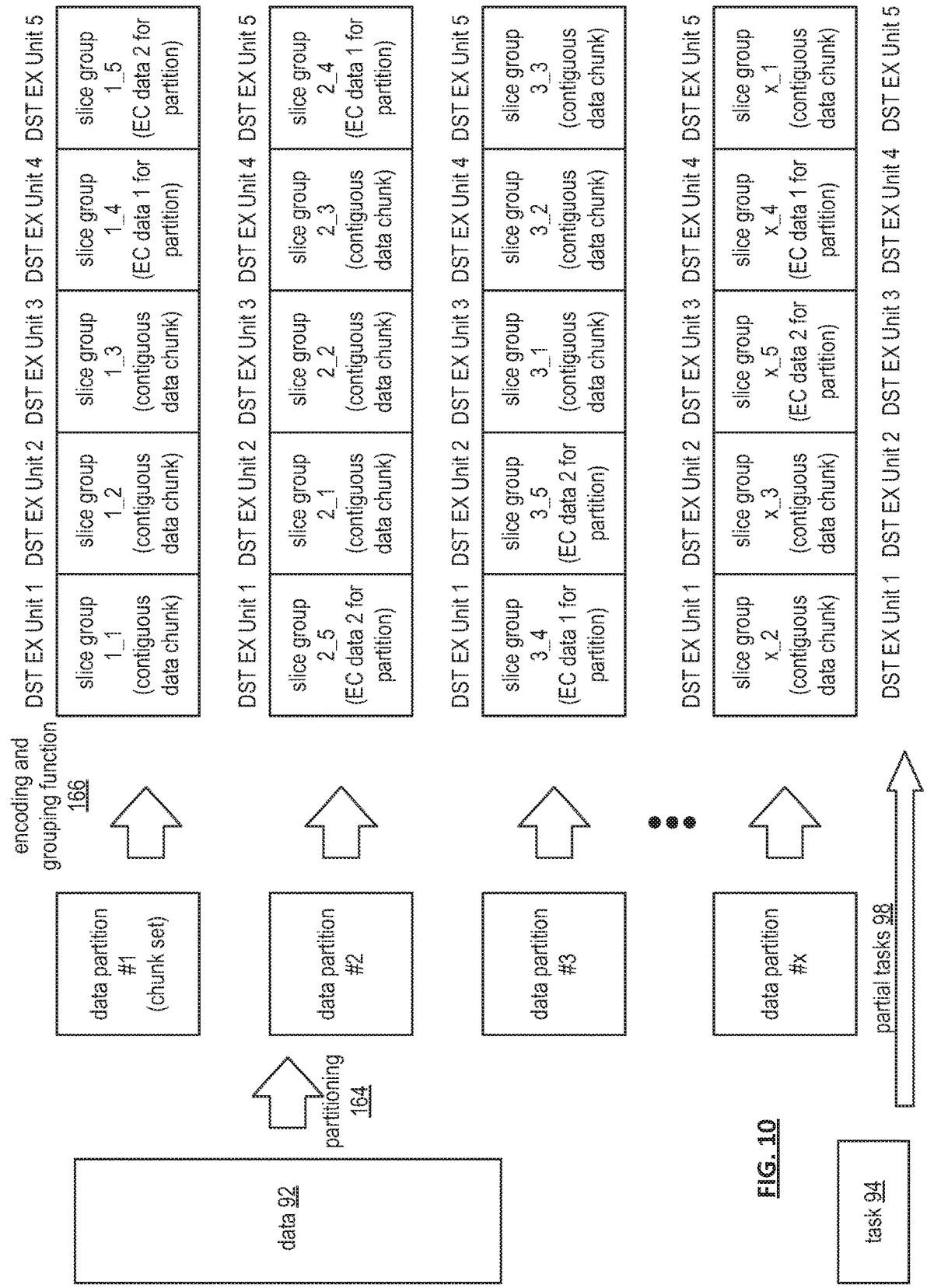
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
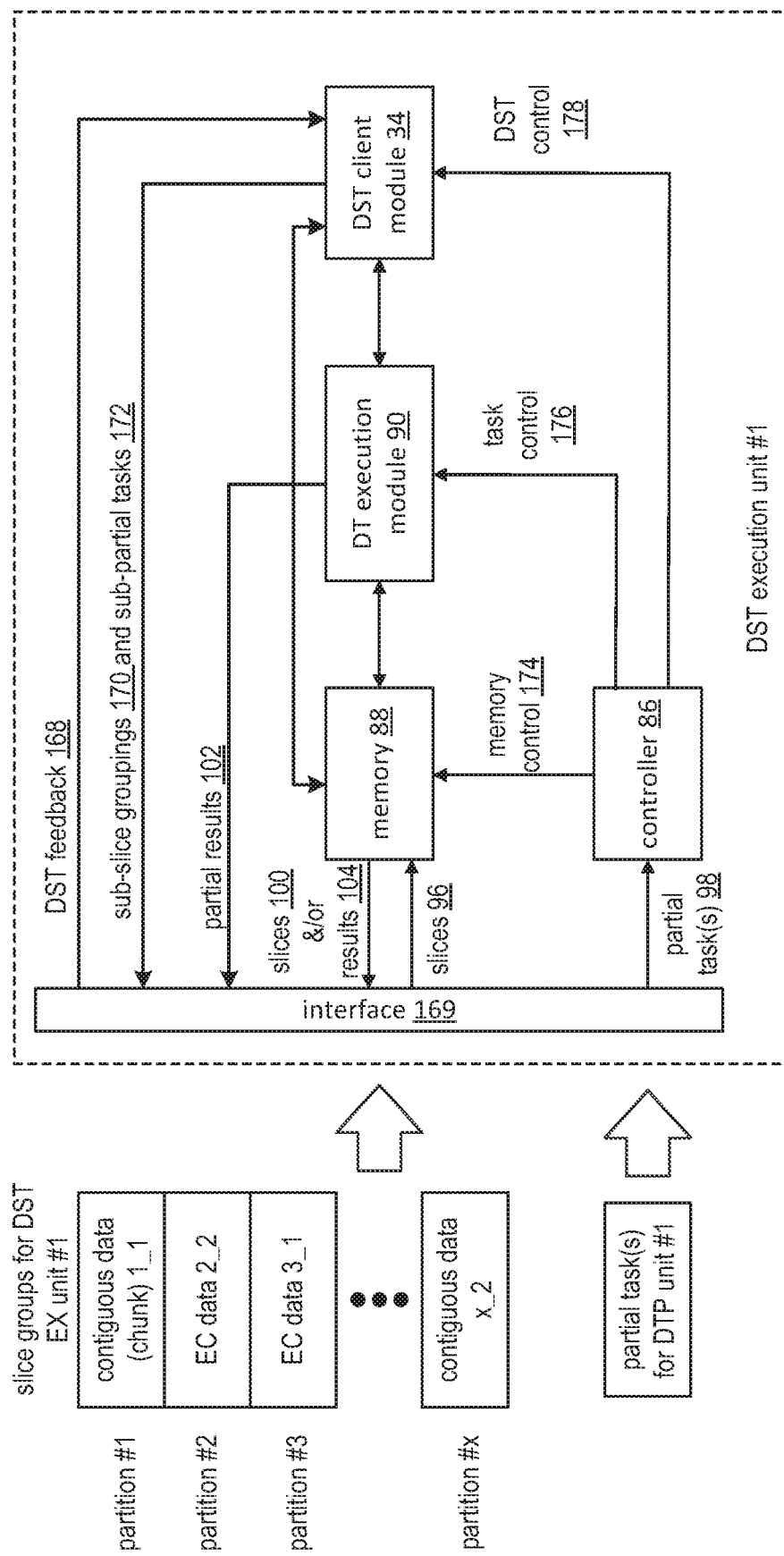
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
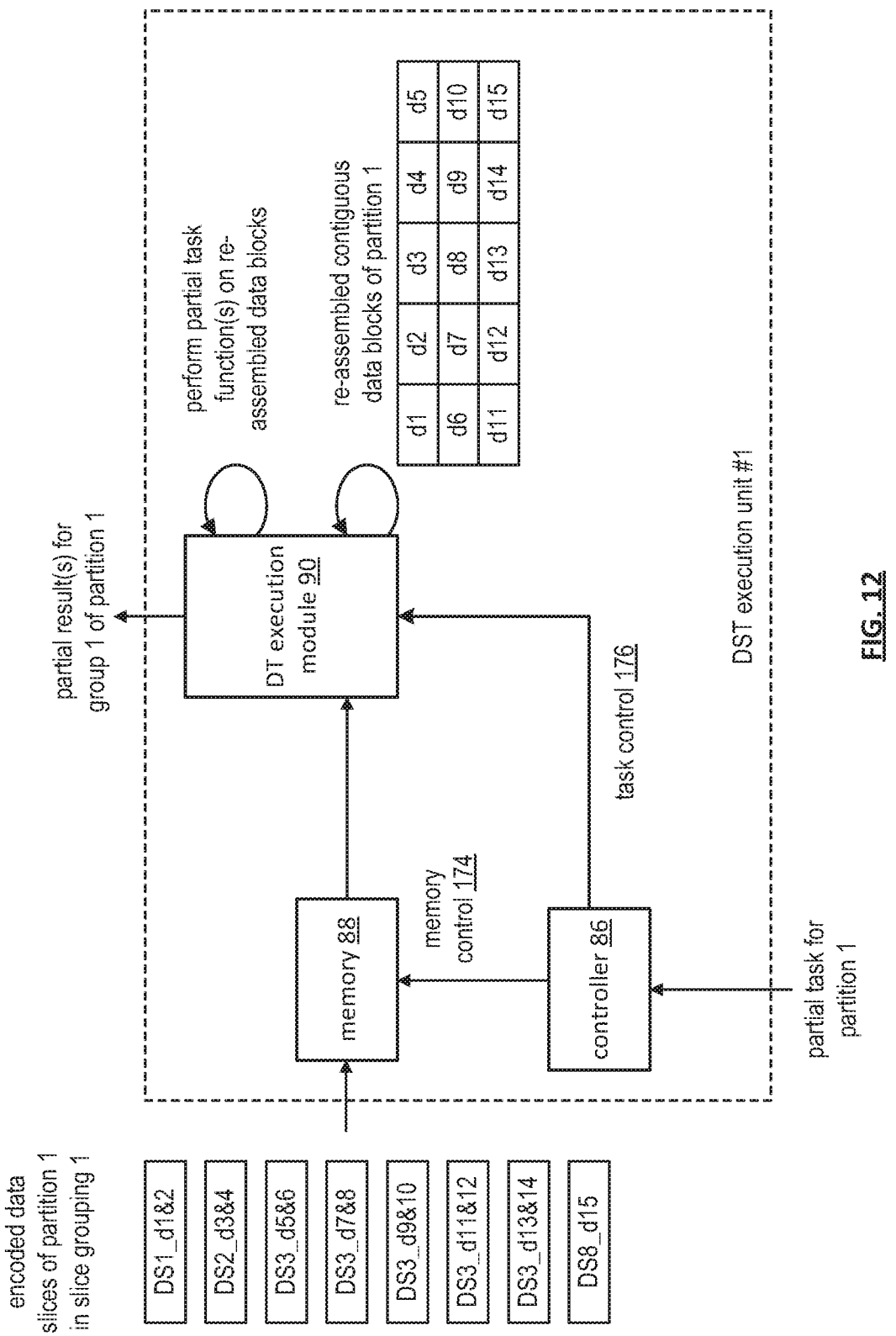
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
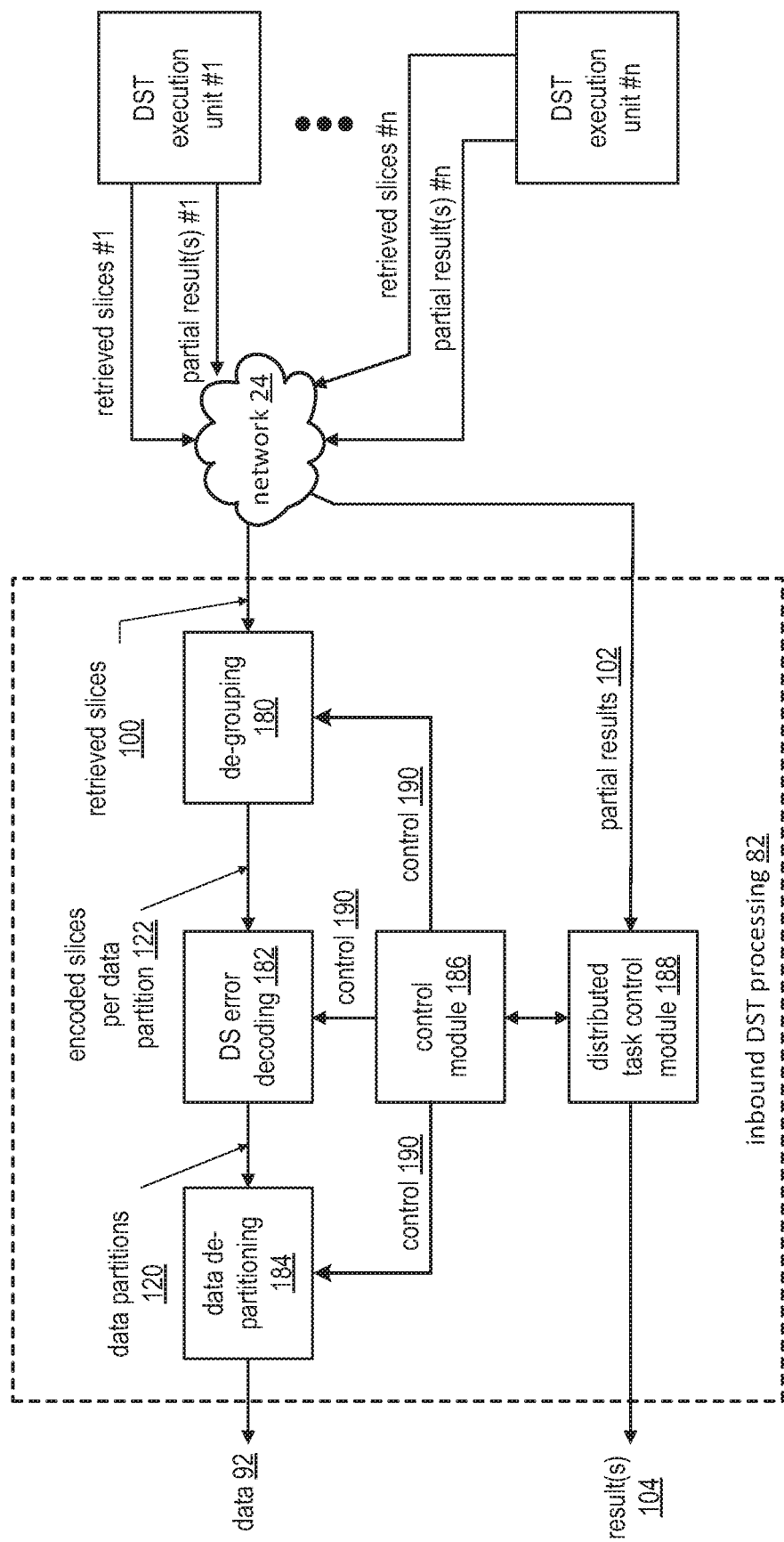
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
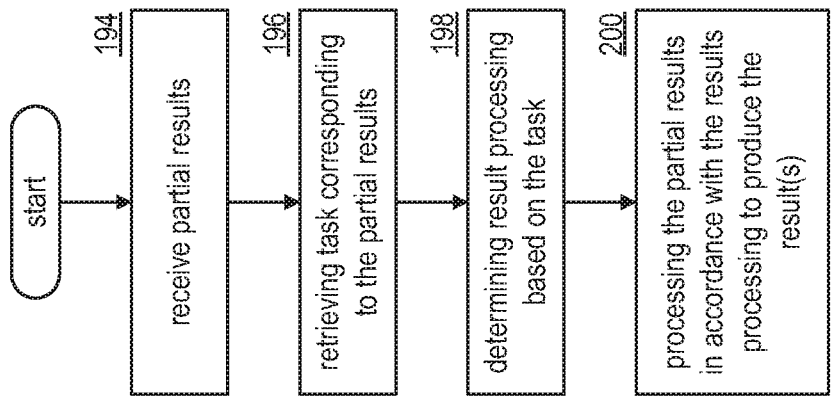
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
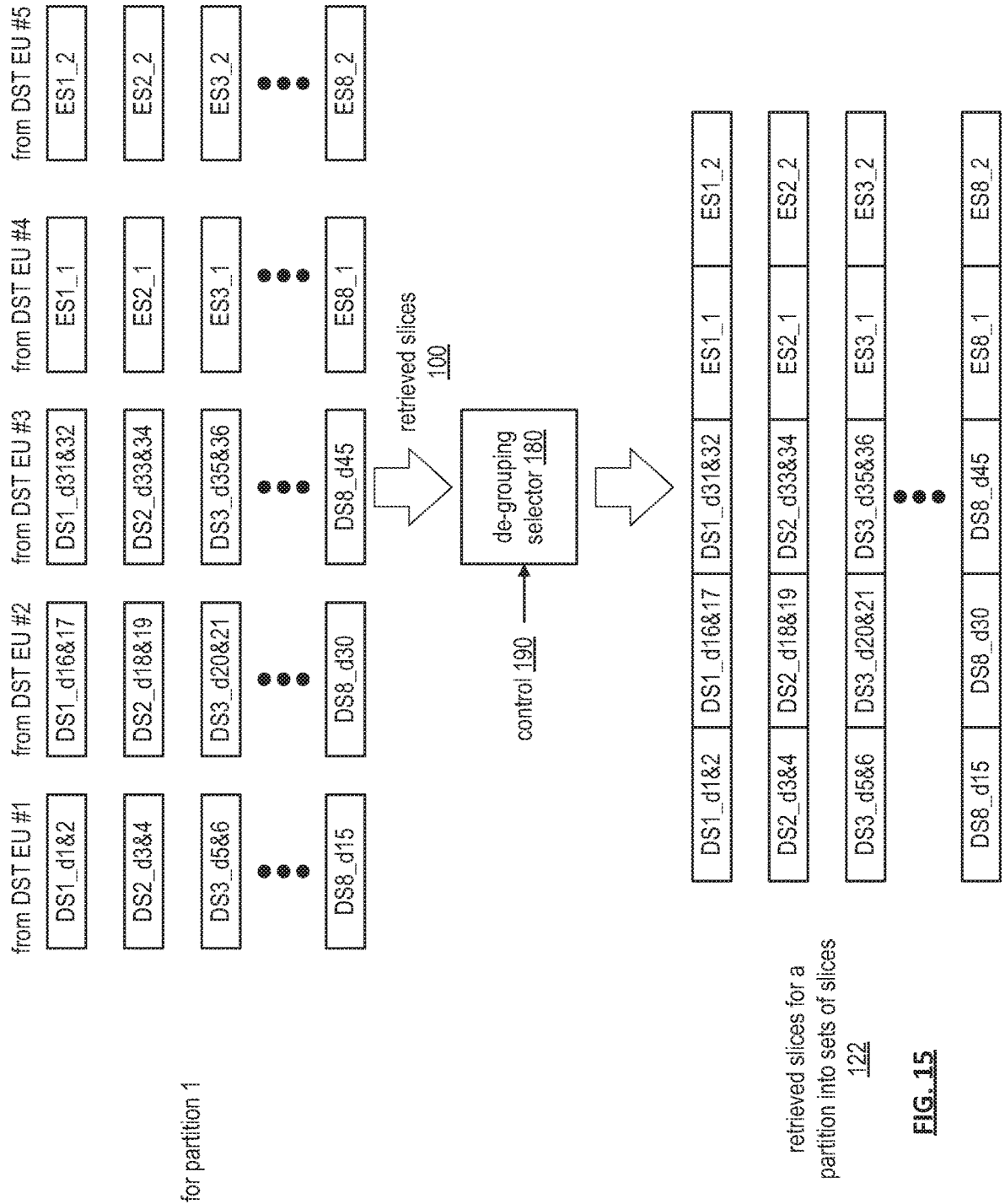
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
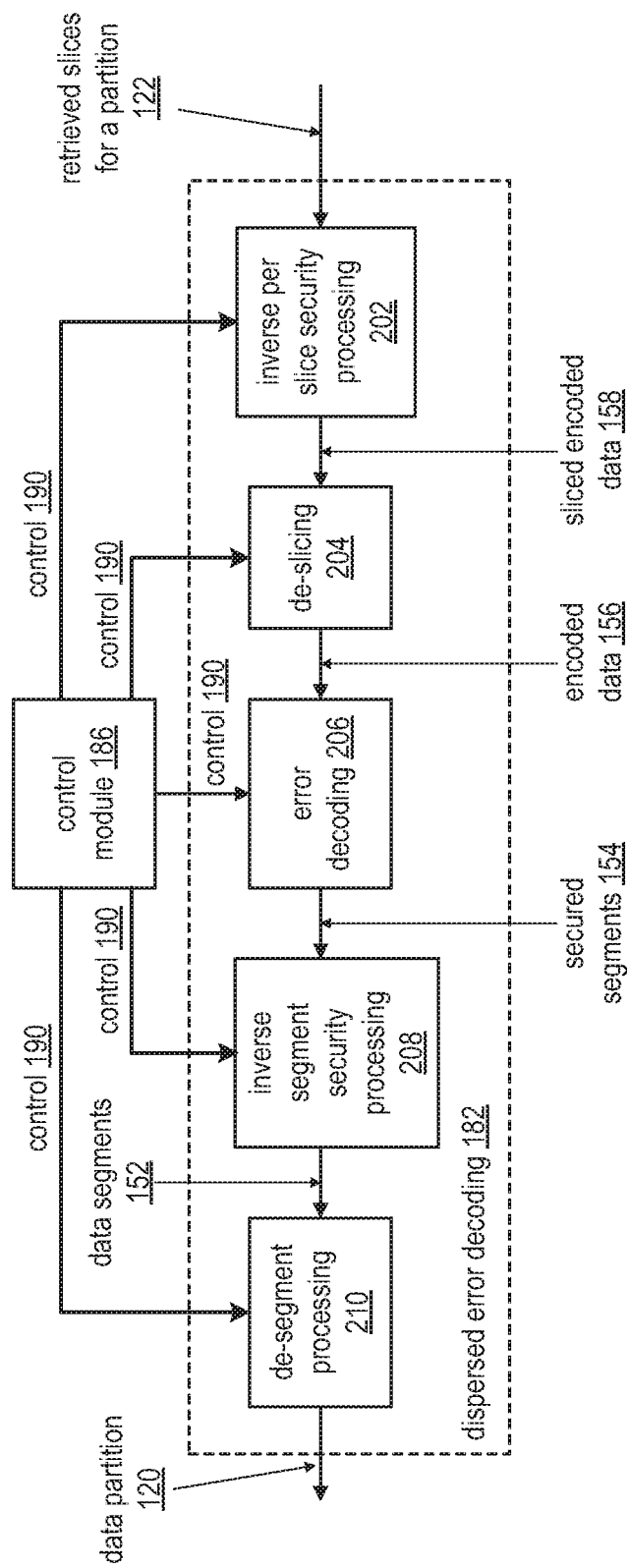
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
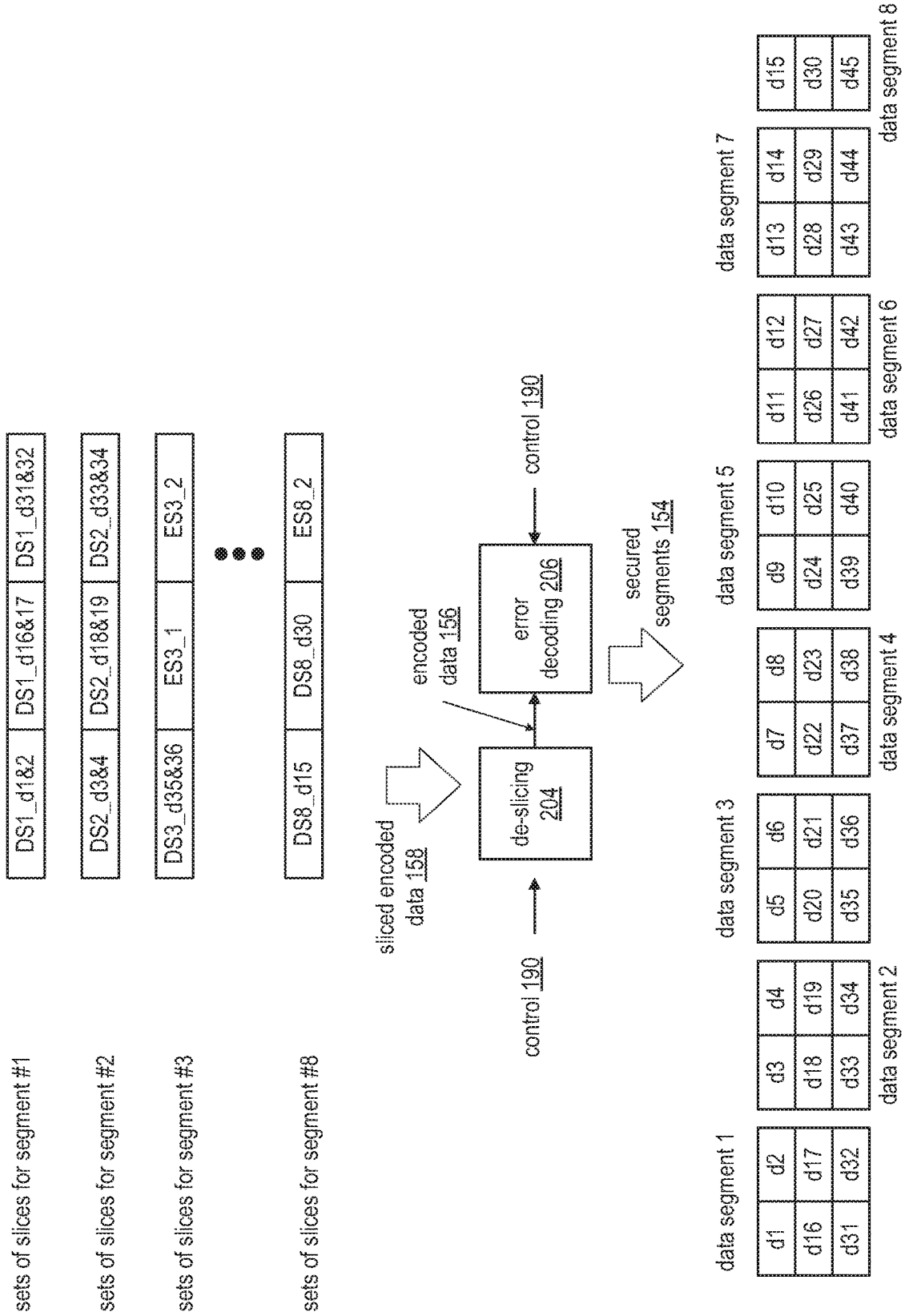
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
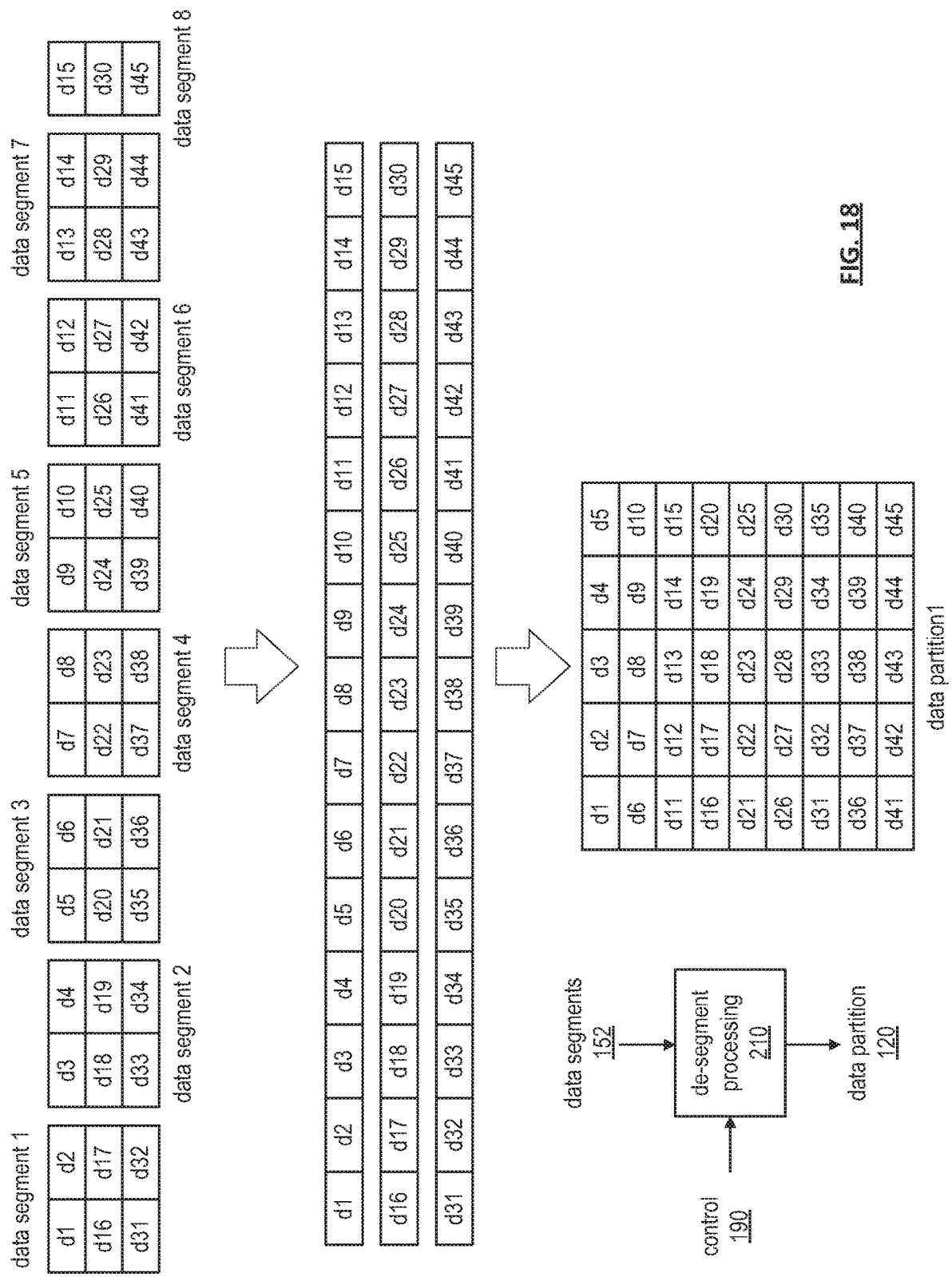
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
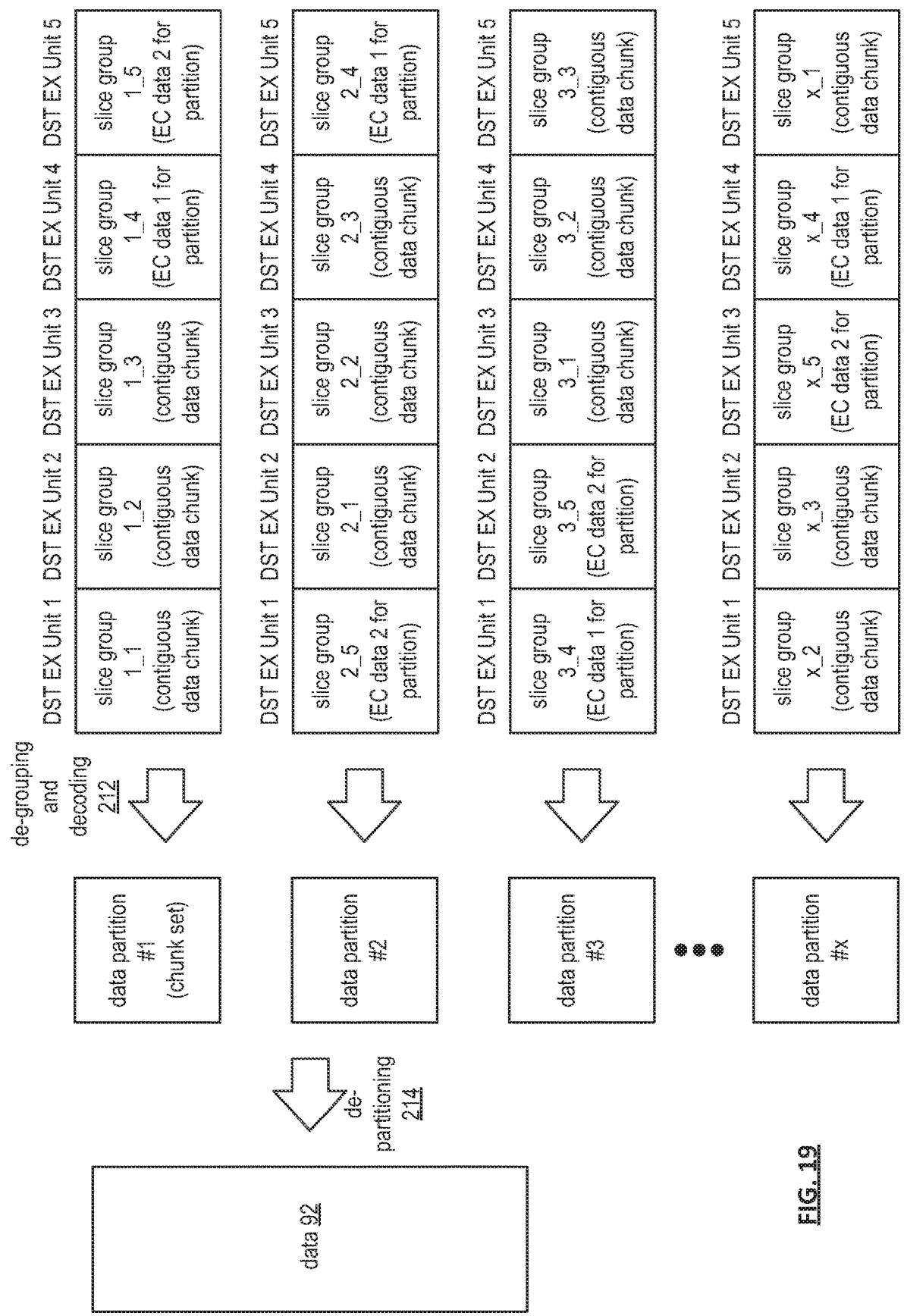
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-*x*, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
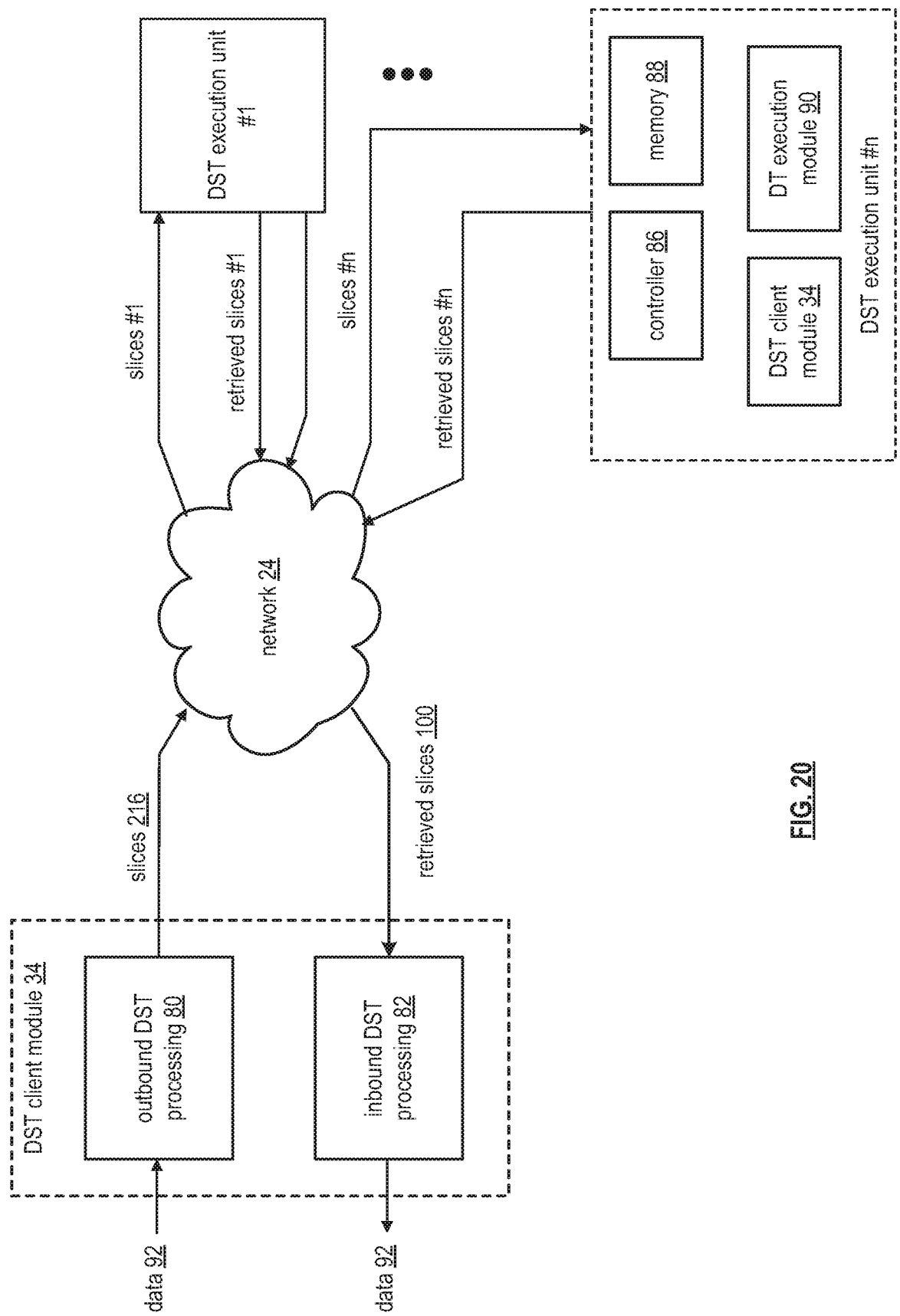
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
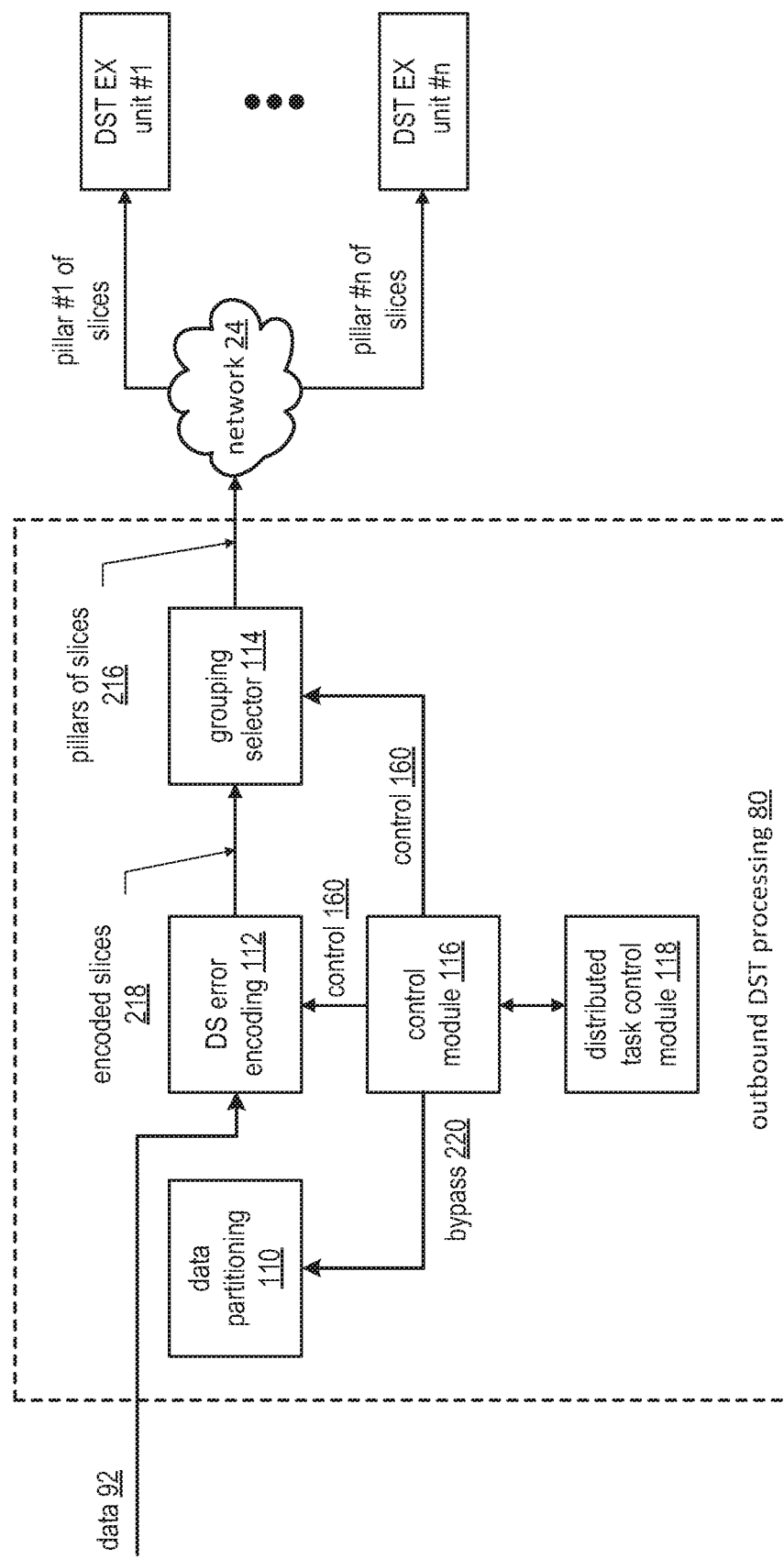
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
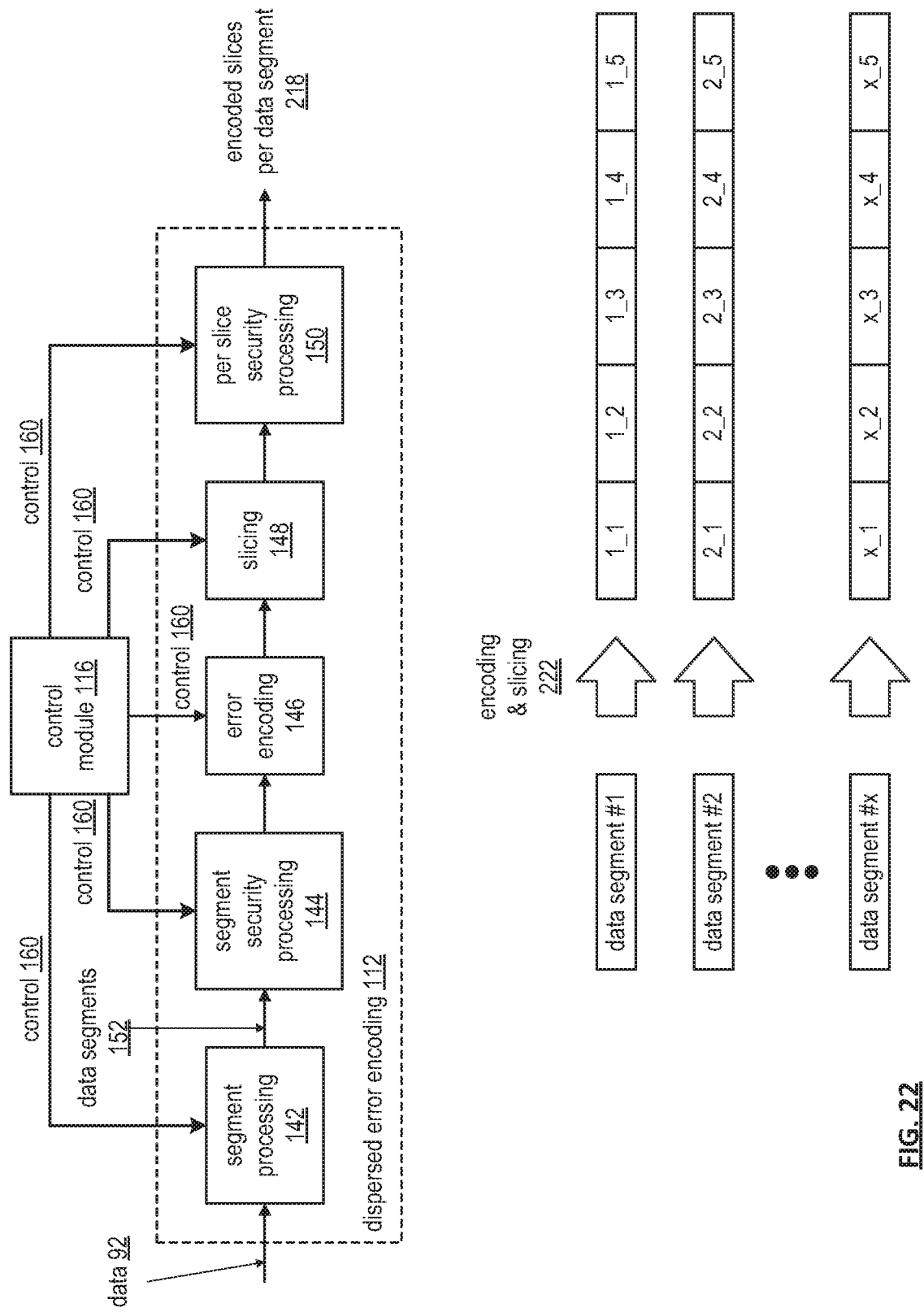
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
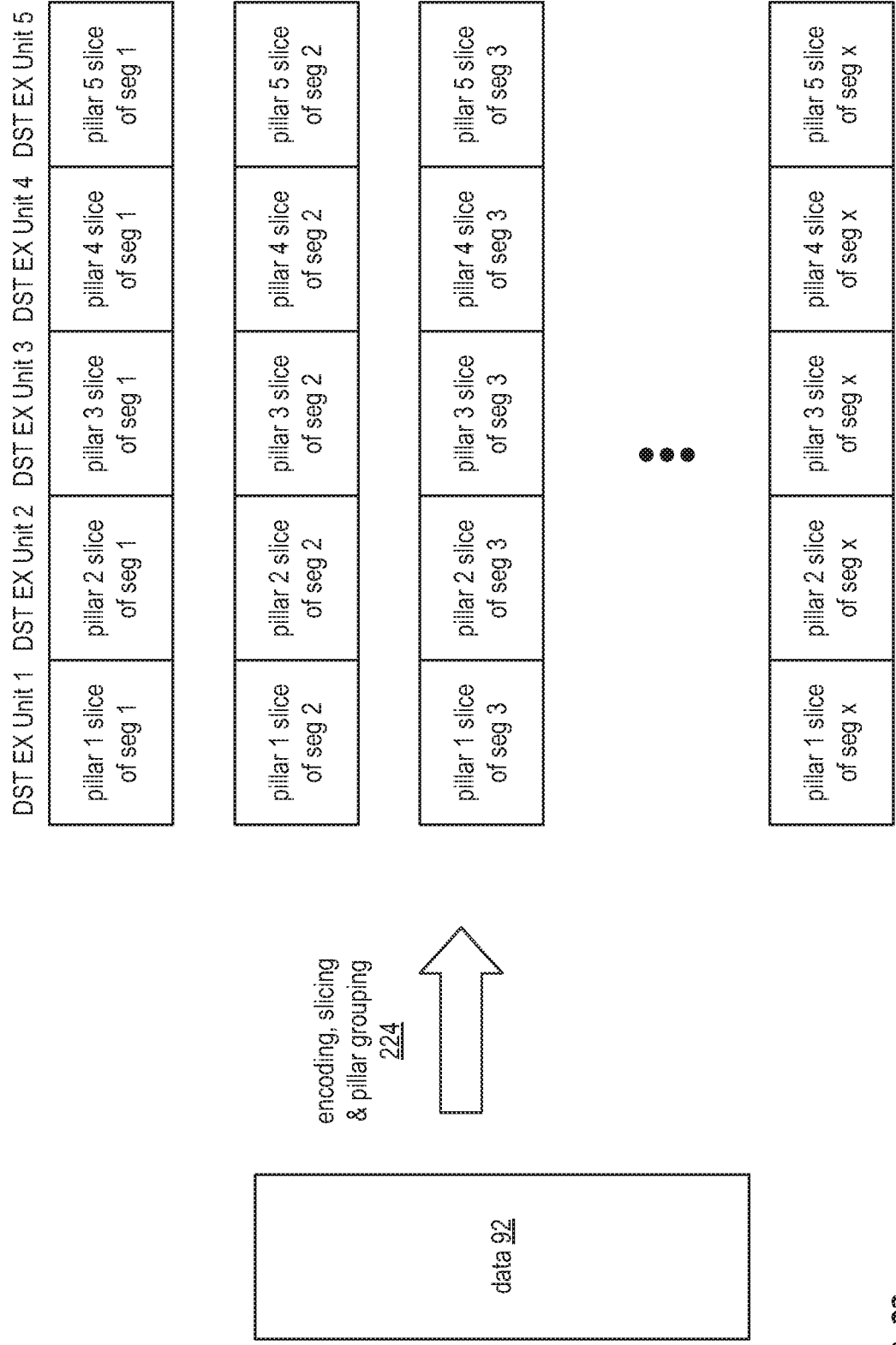
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
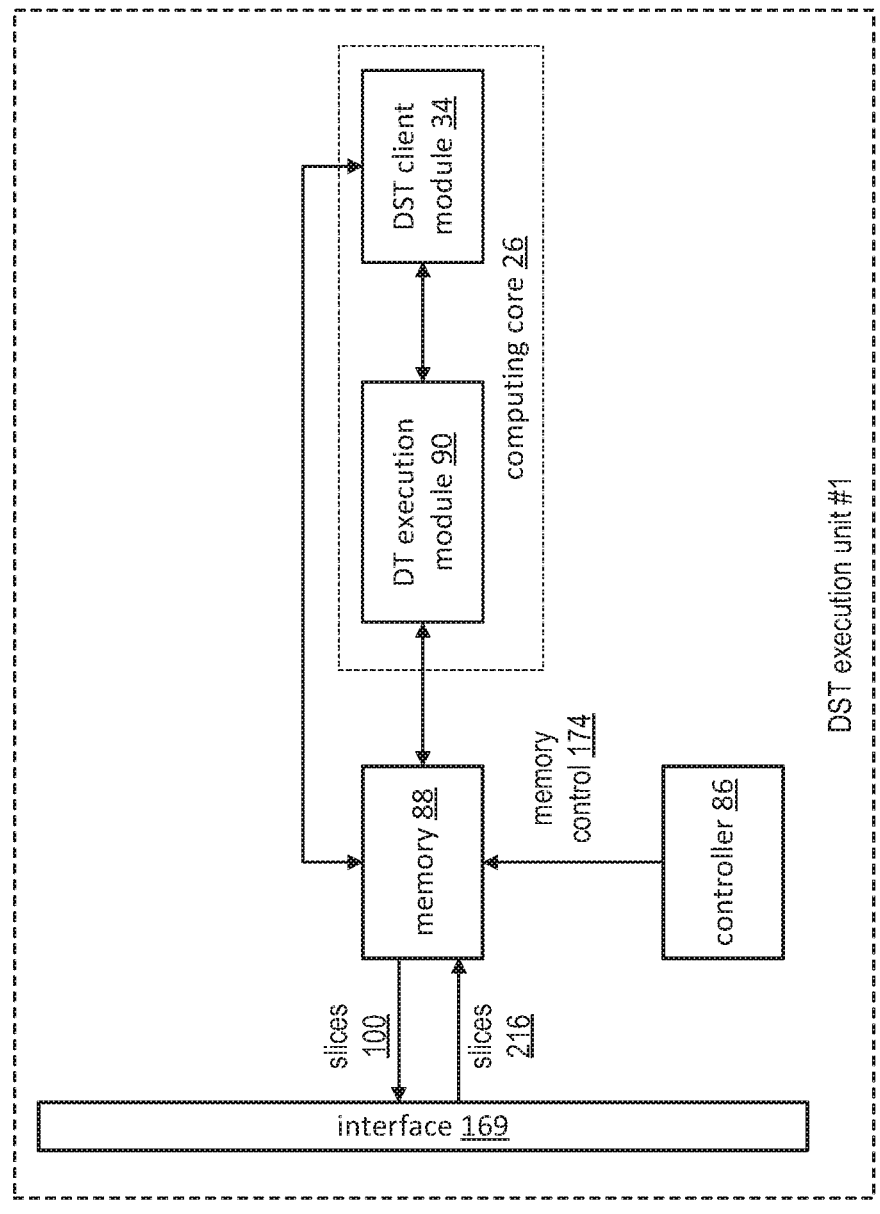
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
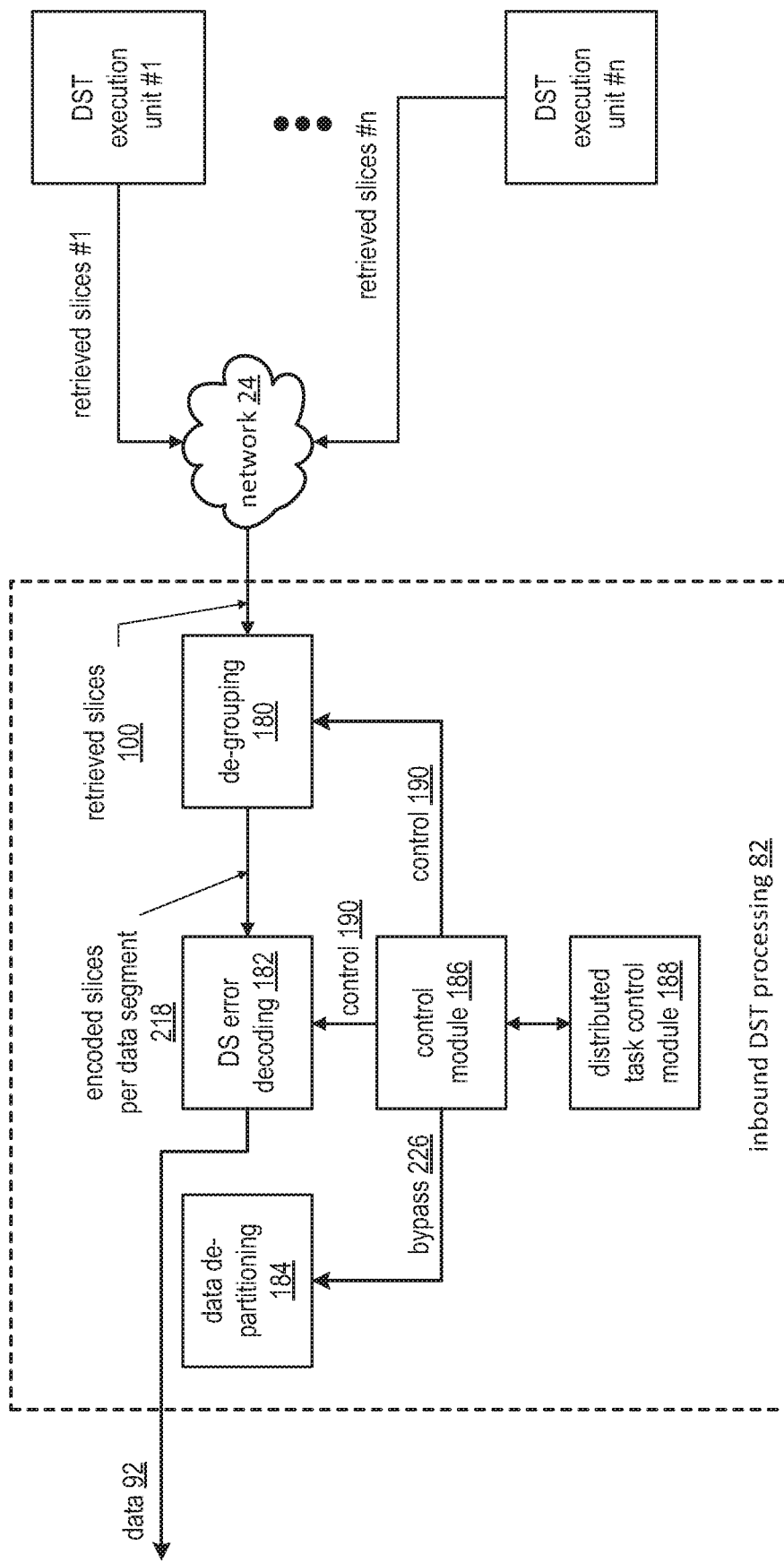
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
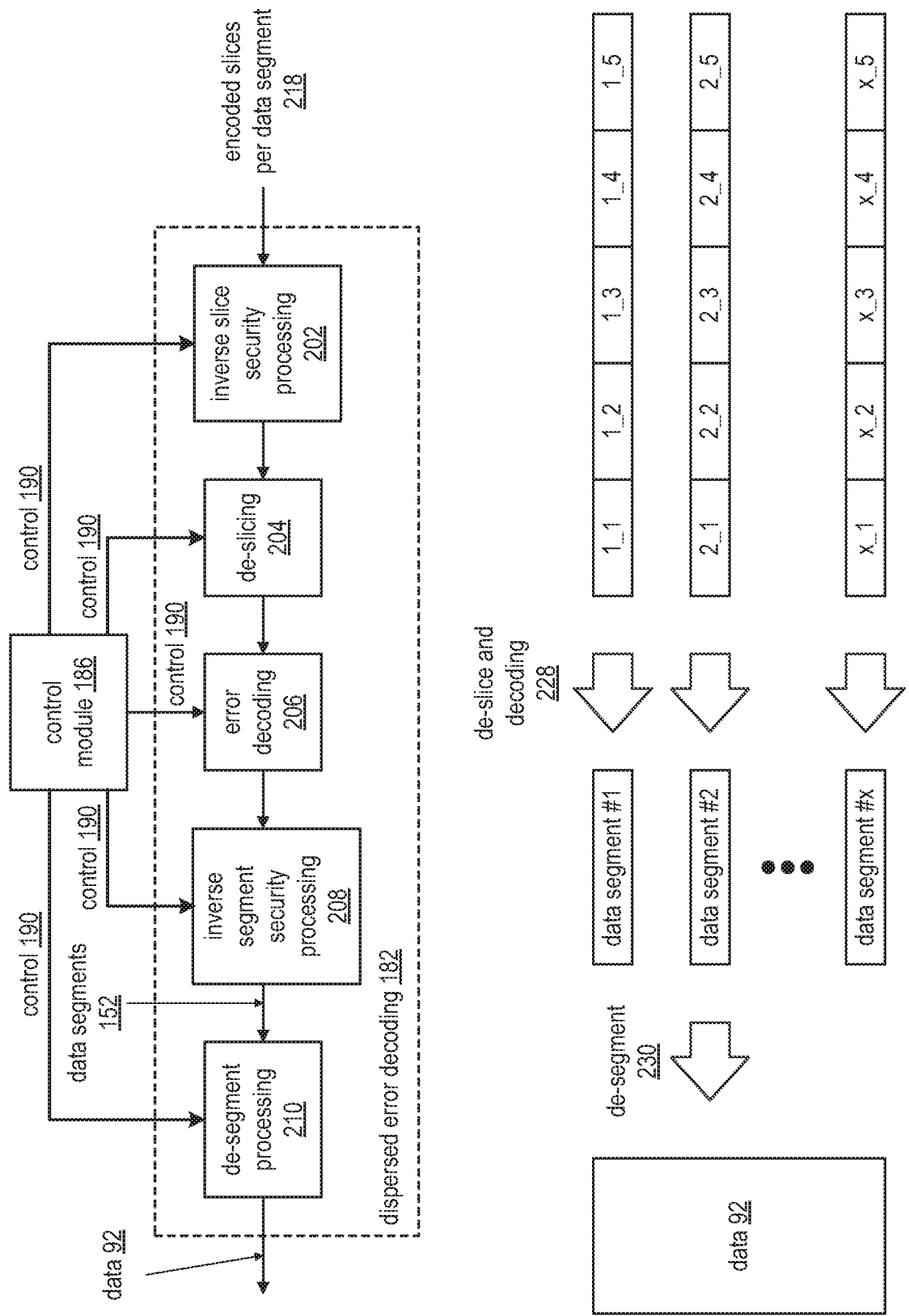
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
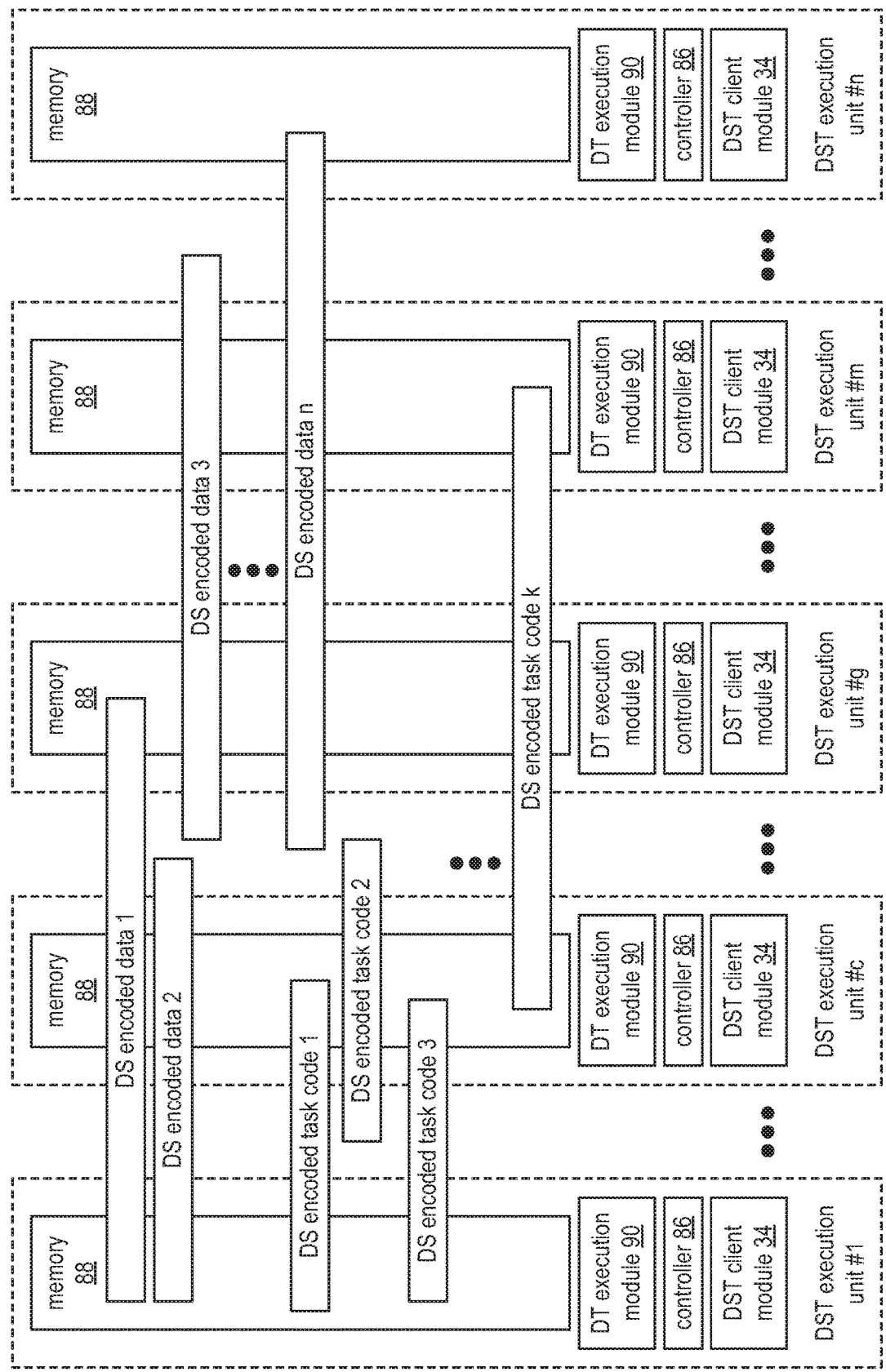
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
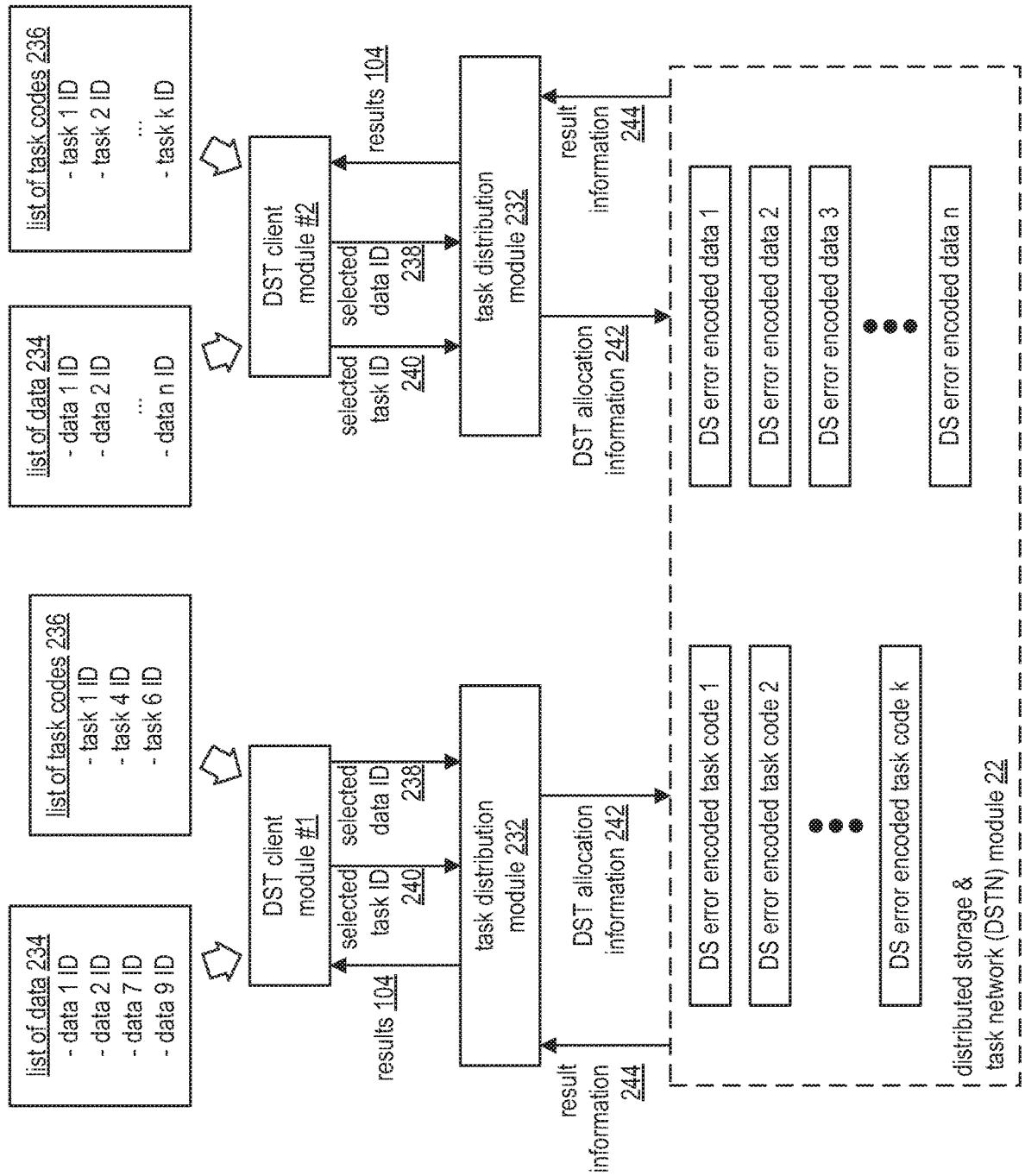
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
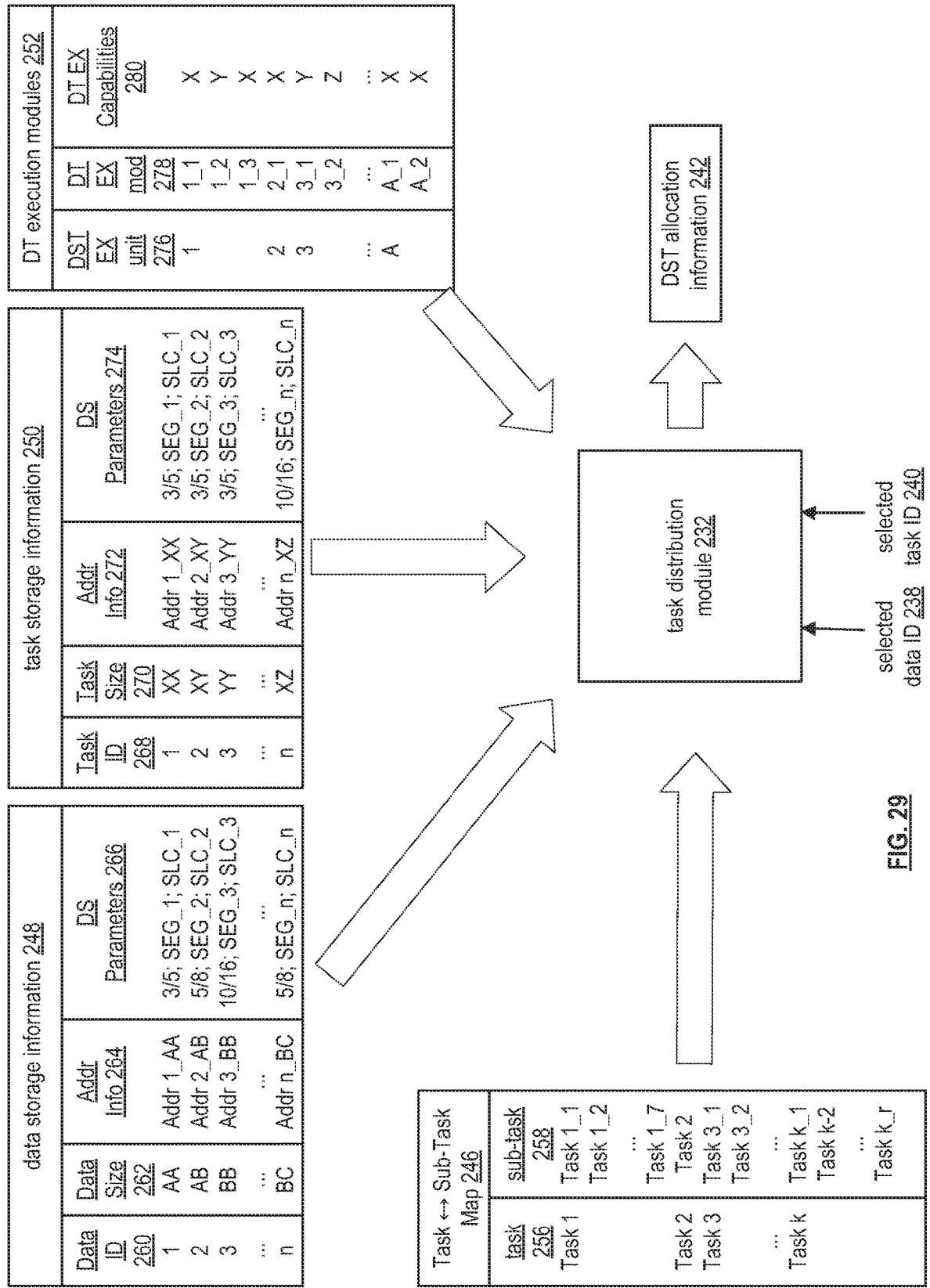
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
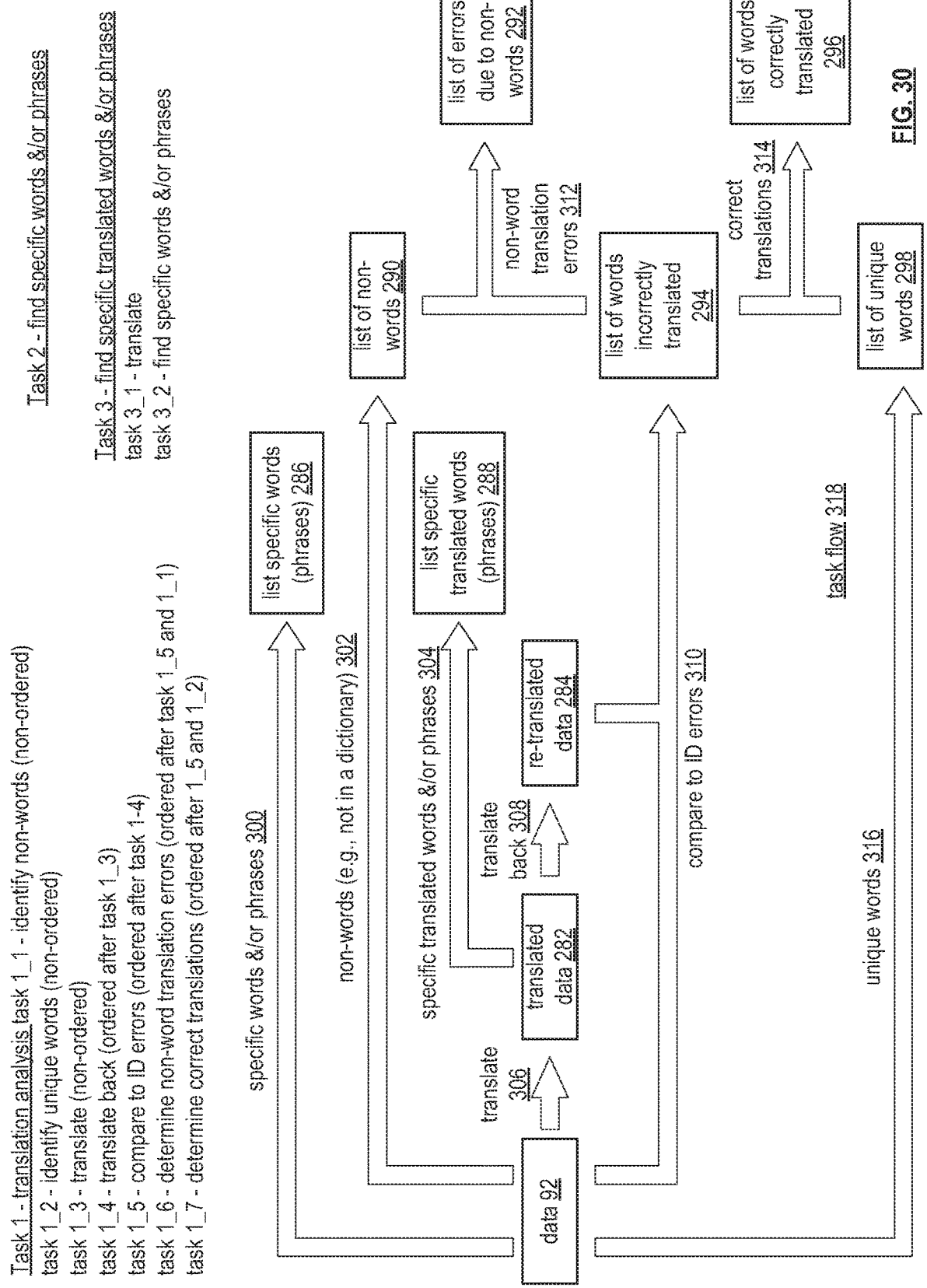
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
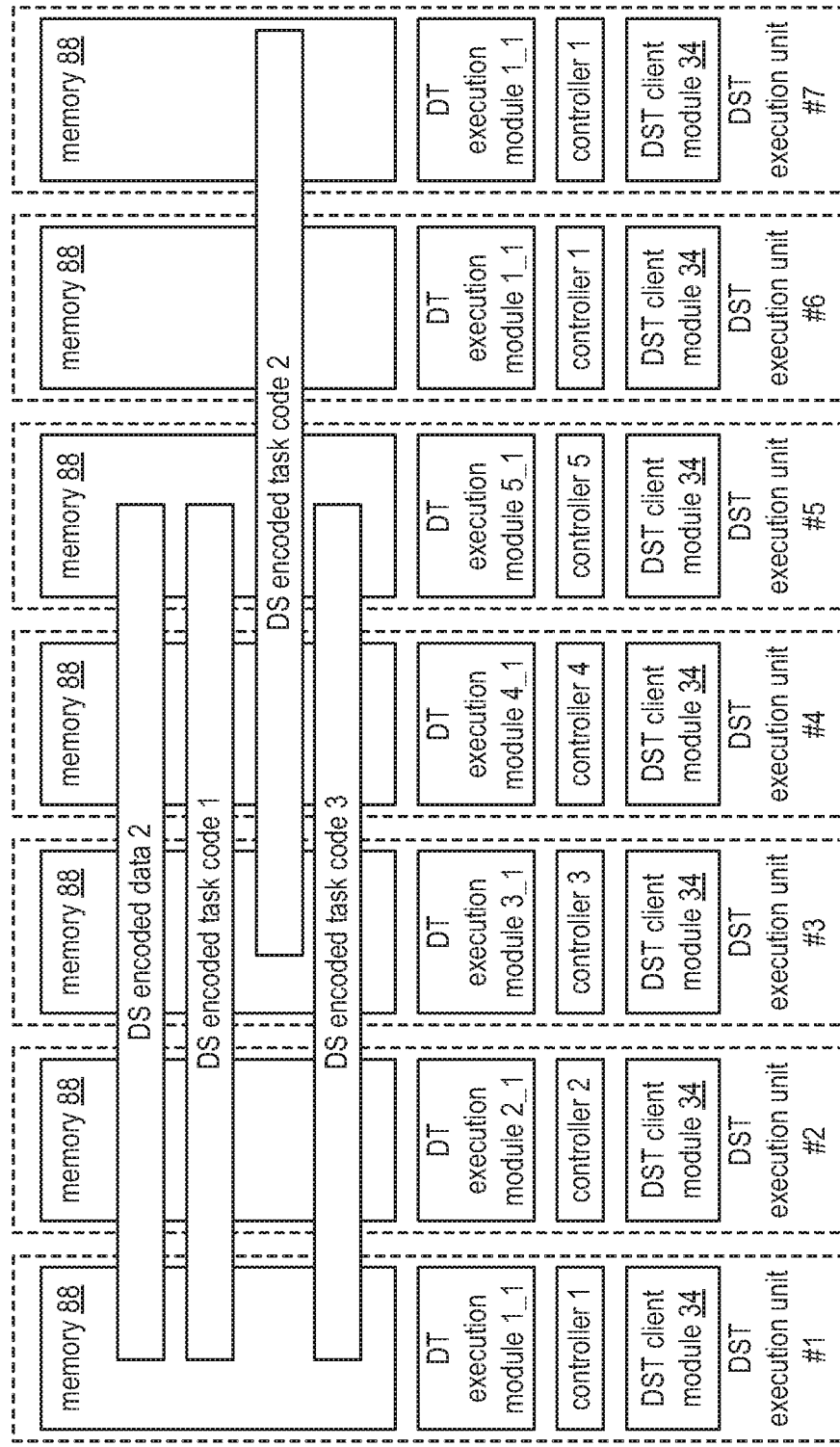
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

Figure 33:
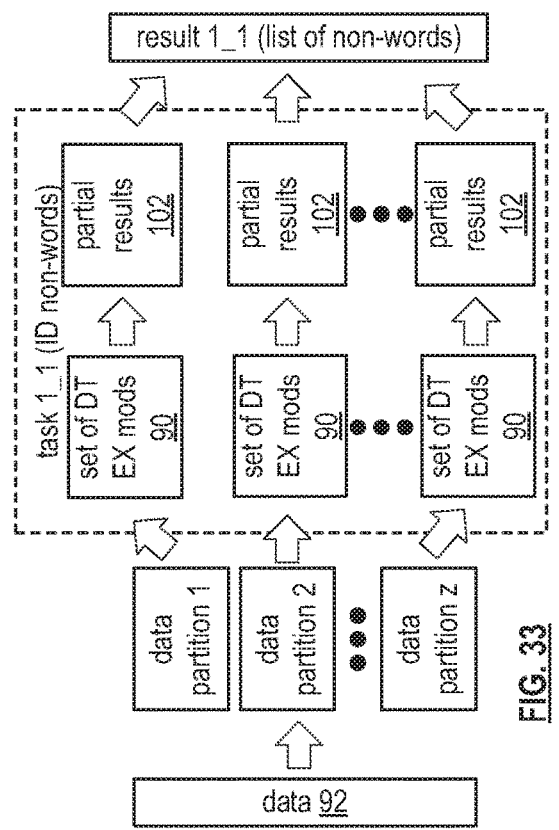

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition. As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

Figure 34:
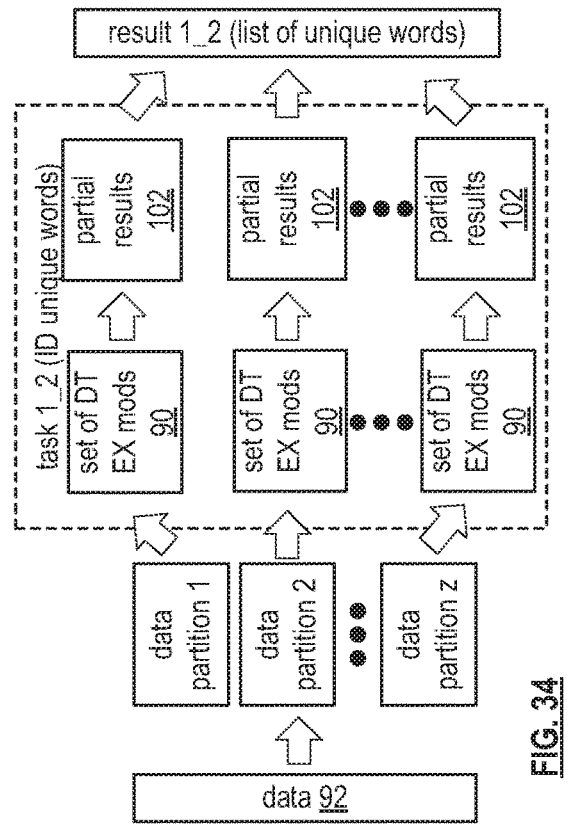

In FIG. 34, the DSTN module is performing task 1_2 (e.g., find unique words) on the data 92. To begin, the DSTN module accesses the data 92 and partitions it into a plurality of partitions 1-z in accordance with the DST allocation information, or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

Figure 35:
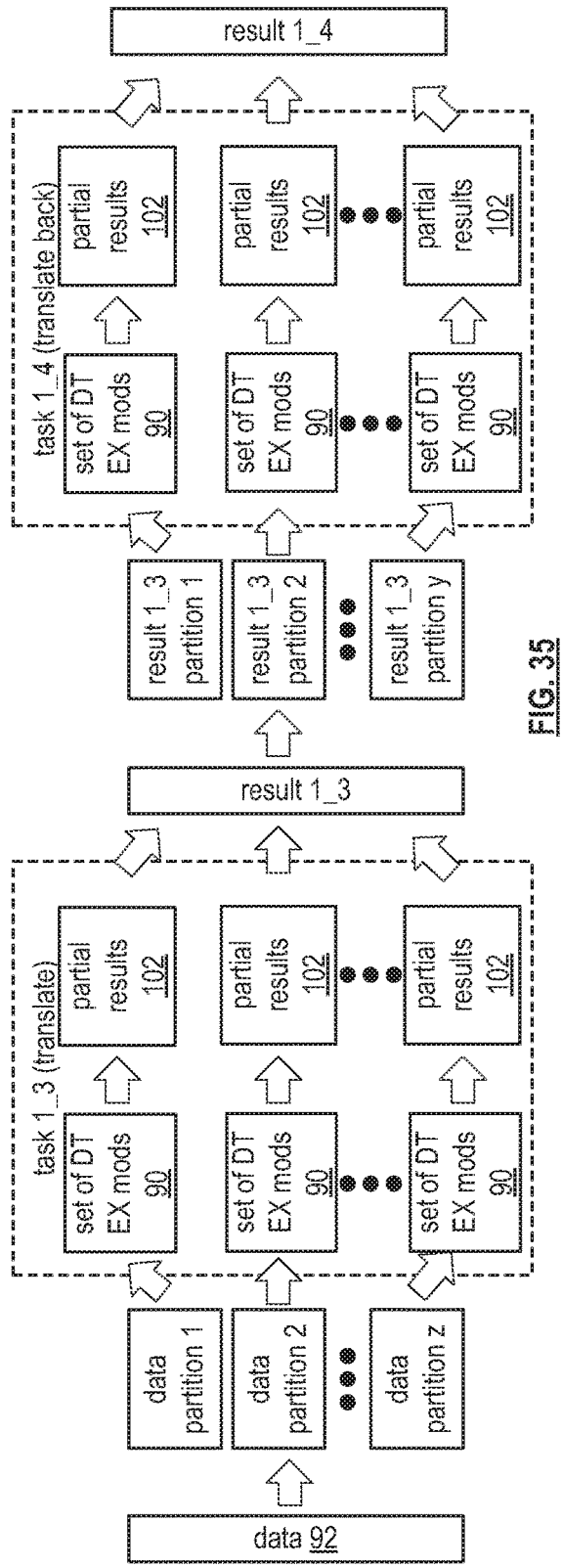

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1$^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
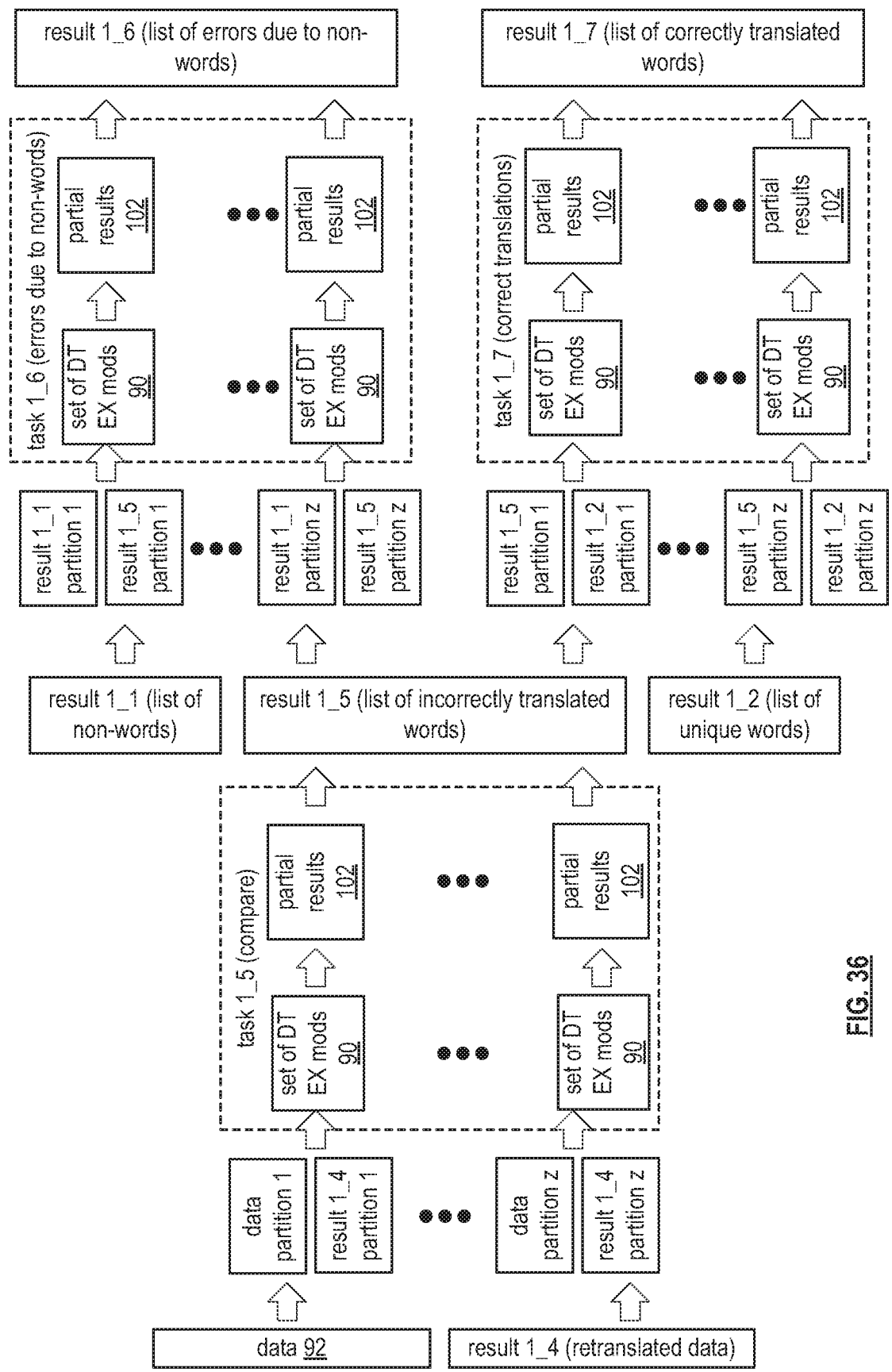

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2).

To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions. As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40B:
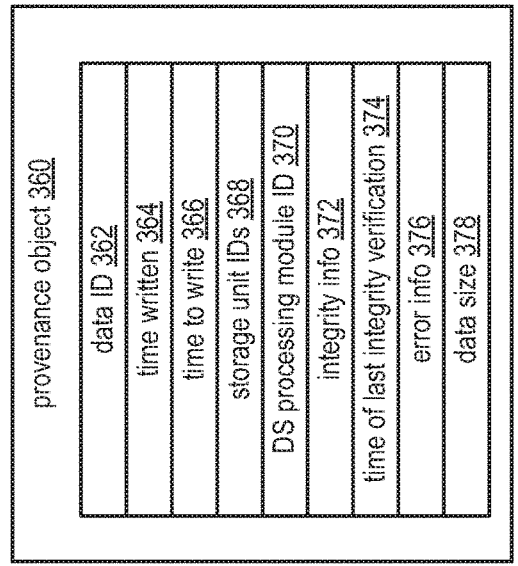
FIG. 40B is a diagram of an embodiment of a structure of a provenance object in accordance with the present invention.
Figure 40A:
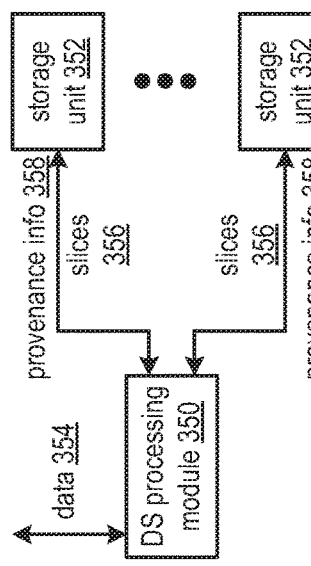
FIG. 40A is a schematic block diagram of an embodiment of a dispersed storage network in accordance with the present invention.

FIG. 40A is a schematic block diagram of an embodiment of a dispersed storage network (DSN) that includes a plurality of DSN entities including a dispersed storage (DS) processing module 350 and a plurality of storage units 352. The DS processing module 350 may be implemented utilizing at least one of the distributed storage and task (DST) execution unit 36 of FIG. 1, a DST processing module, the DST processing unit 16 of FIG. 1, the user device 12 of FIG. 1, and a DS unit. Each storage unit 352 may be implemented utilizing the DST execution unit 36 of FIG. 1.

The DSN functions to perform a plurality of tasks to facilitate storing data 354 in some of the plurality of storage units 352 for subsequent retrieval. The storing includes the DS processing module 350 performing tasks of the plurality of tasks including encoding the data 354 using a dispersed storage error coding function to produce slices 356 and storing the slices 356 in at least a write threshold number of the plurality of storage units 352. The retrieval includes the DS processing module 350 performing other tasks of the plurality of tasks including receiving a data retrieval request, issuing slice requests to at least a read threshold number of the plurality of storage units 352, receiving slices 356, and decoding the slices 356 to produce reproduced data.

The DSN entities may generate provenance information 358 as the plurality of tasks are performed. The provenance information 358 includes a plurality of primary information types, where a first primary information type includes identity of the data, a second primary information type includes timing information, a third primary information type includes DSN entity identifiers, a fourth primary information type includes error/integrity information, and a fifth primary information type includes information about the data. The provenance information 358 is discussed in greater detail with reference to FIG. 40B. The DS processing module 350 receives the provenance information 358 from time to time as the plurality of tasks are performed. The DS processing module 350 aggregates the provenance information 358 to generate one or more provenance objects. The DS processing module three and 50 encodes each of the one or more provenance objects using the dispersed storage error coding function to produce one or more sets of corresponding provenance slices 356 for storage in at least a write threshold number of storage units of the plurality of storage units 352.

The provenance information 358 from the one or more provenance objects may be utilized from time to time by an analyzing DSN entity to produce summary information with regards to the performance of the plurality of tasks. The analyzing DSN entity includes at least one of a DS managing unit, the DSTN managing unit 18 of FIG. 1, a DS processing module, a DST processing module, a DS processing unit, the DST processing unit 16 of FIG. 1, and the user device 12 of FIG. 1. For example, the analyzing DSN entity recovers the provenance information 358 and sorts the provenance information using the second primary information type of the timing information to identify a time based DSN error condition to produce the summary information.

At least one of the DS processing module 350 and the analyzing DSN entity produces one or more dispersed hierarchical indexes to facilitate recovering the provenance information 358 from the one or more stored provenance objects. Each of the one or more dispersed hierarchical indexes may be associated with one or more of the plurality of information types. For example, a first dispersed hierarchical index is associated with the first primary information type that includes the identity of the data. As another example, a second dispersed hierarchical index is associated with the second primary information type that includes the timing information. The structure of the one or more dispersed hierarchical indexes is discussed in greater detail with reference to FIG. 40C.

FIG. 40B is a diagram of an embodiment of a structure of a provenance object 360 that includes a data identifier (ID) field 362, a time written field 364, a time to write field 366, a storage unit IDs field 368, a DS processing module ID field 370, an integrity information field 372, a time of last integrity verification field 374, and the error information field 376, and a data size field 378. The data ID field 362 includes at least one of an object name of a data object, an object number, and a dispersed storage network (DSN) ID. The time written field 364 includes a timestamp associated with when a data object was written and when each slice of a set of slices was written. The time to write field 366 includes a time duration of a time span associated with how long a write sequence took to completion. The storage unit IDs field 368 includes identifiers of each storage unit of a set of storage units utilized to store a set of encoded data slices and may further include a storage success indicator indicating whether a corresponding encoded data slice of the set of encoded data slices was stored successfully. The DS processing module ID field 370 includes an identifier associated with a particular DS processing module associated with a task. The integrity information field 372 includes integrity information with regards to one or more of a data object, a data segment, and a data slice. The integrity information includes at least one of an integrity value, a re-created integrity value, and an_integrity algorithm ID. The time of last integrity verification field 374 includes a timestamp and tree associated with when a last integrity verification task was performed with regards to a particular data segment and/or data slice. The error information field 376 includes an indicator with regards to an error associated with a task. The data size field 378 includes a data size entry associated with at least one of a size of the data object, a size of a data segment, and a size of an encoded data slice.

Figure 40C:
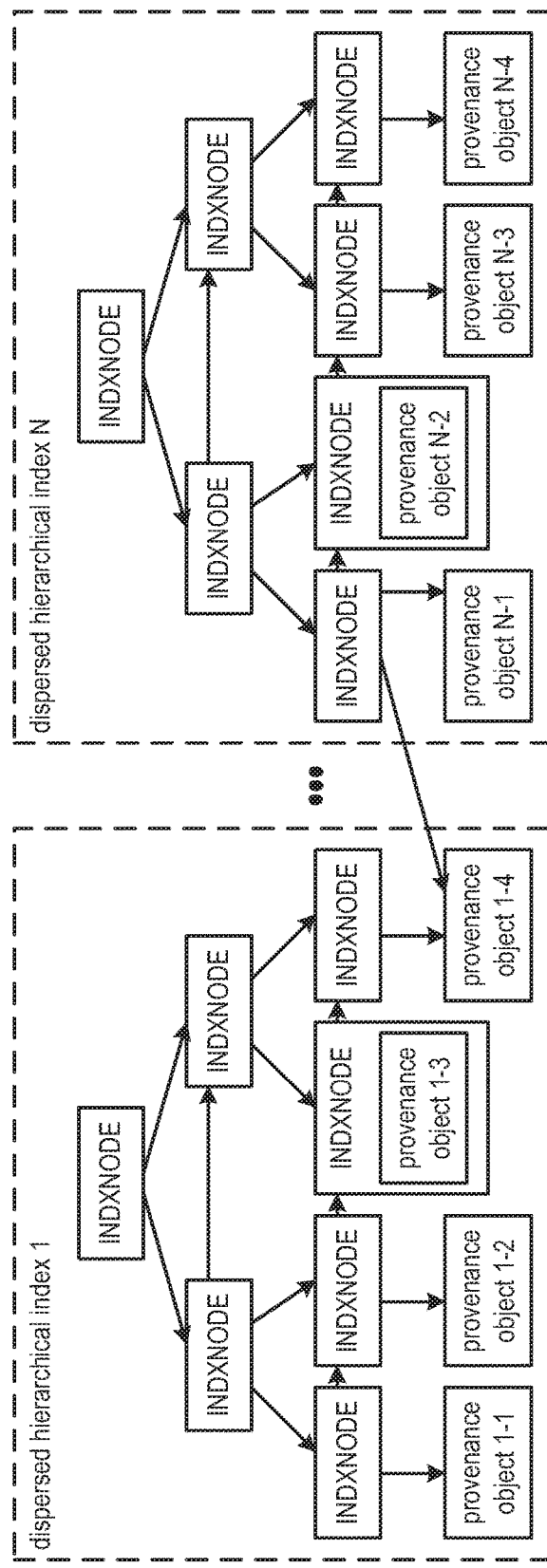
FIG. 40C is a diagram of an embodiment of a set of dispersed hierarchical indexes in accordance with the present invention.

FIG. 40C is a diagram of an embodiment of a set of dispersed hierarchical indexes 1-N which may be utilized to index one or more provenance objects stored in a dispersed storage network (DSN). Each dispersed hierarchical index includes a plurality of index nodes arranged in a plurality of levels where a top-level includes a root index node and a bottom level includes one or more leaf nodes as the index nodes. Index nodes in a higher level above other index nodes at a lower level may serve as a parent index nodes and the other index nodes at the lower-level serve as child index nodes to the parent index nodes. Index nodes at a common level serve as siblings index nodes to index nodes at the common level. Leaf nodes may include a data object such as a provenance object and/or may include a DSN address associated with the provenance object stored as a set of provenance slices within the DSN. For example, an index node of the dispersed hierarchical index 1 points to provenance object 1-1, and another index node of the dispersed hierarchical index 1 points to provenance object 1-2, etc. The index nodes include a DSN address field that points to a storage location within the DSN where associated index nodes are stored. For example, the DSN address field includes a DSN address associated with a sibling index node to the right and another DSN address associated with one or more child index nodes.

The index nodes are further associated with a minimum index key value to assist in searching the dispersed hierarchical index structure to identify a leaf node that corresponds to a desired provenance object. The dispersed hierarchical index may be searched using an index key associated with an attribute of a desired search and comparing the index key to minimum index key values associated with index nodes as searching starts with the root index node the top and proceeds in a downward direction within the structure to identify the leaf note that corresponds to the desired provenance object. A series of retrievals of sets of encoded index slices from the DSN may be required to recover index nodes along a search path from the root index node to the leaf node associated with the desired provenance object. Two or more dispersed hierarchical indexes of the set of dispersed hierarchical indexes may include entries within leaf nodes that point to a common provenance object when two or more attributes of the common provenance object are associated with two or more index keys utilized when searching the two or more dispersed hierarchical indexes. For example, an index node of the dispersed hierarchical index 1 points and another index node of the dispersed hierarchical index N both point to provenance object 1-4.

Figure 40D:
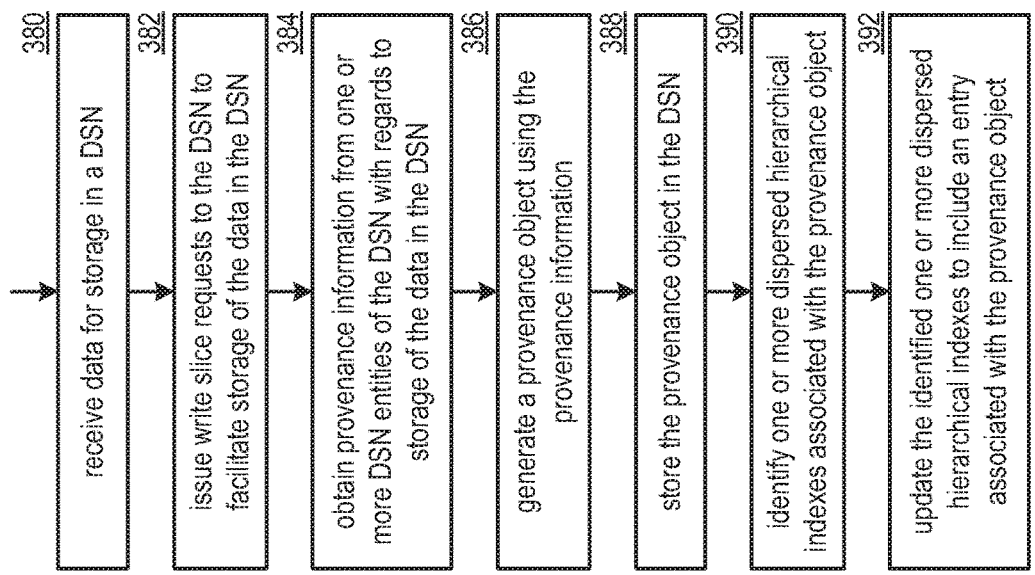
FIG. 40D is a flowchart illustrating an example of generating provenance information in accordance with the present invention.

FIG. 40D is a flowchart illustrating an example of generating provenance information. The method begins with step 380 where a processing module (e.g., of a dispersed storage (DS) processing module, a distributed storage and task (DST) client module) receives data for storage in a dispersed storage network (DSN). The receiving may include receiving a data identifier of the data and a requesting entity identifier. The method continues at step 382 where the processing module issues write slice requests to the DSN to facilitate storage of the data in the DSN. The issuing includes encoding the data to produce slices, generating write slice requests to include the slices, selecting storage units of the DSN, outputting the write slice requests to the selected storage units, and generating timestamps associated with the outputting to contribute to the provenance information.

The method continues at step 384 where the processing module obtains provenance information from one or more DSN entities of the DSN with regards to storage of the data in the DSN. The obtaining includes at least one of initiating a query, receiving the provenance information, performing a lookup, and generating the provenance information. The processing module may utilize a provenance information template based on one or more of a data type of the data, the requesting entity ID, a data size indicator, an error message, a historical performance record, and any other factor associated with storage of the data. For example, the processing module determines to utilize a provenance information template associated with timestamps of each step of sending slices across the network when the data type indicates a videotape and a historical performance record indicates that previous storage timing latency was unfavorable.

The method continues at step 386 where the processing module generates a provenance object using the provenance information. The generating includes one or more of aggregating the provenance information and generating additional provenance information based on the obtained provenance information. For example, the processing module calculates a time for completion of a task. The method continues at step 388 where the processing module stores the provenance object in the DSN. The storing includes encoding the provenance object to produce provenance slices and sending the provenance slices to the DSN for storage at a provenance object DSN address.

The method continues at step 390 where the processing module identifies one or more dispersed hierarchical indexes associated with the provenance object. The identifying includes selecting the one or more dispersed hierarchical indexes based on an index template associated with the provenance information. For example, the processing module selects a time delay index when time delay is included in the provenance information and selects a DSN addressing index when the provenance object DSN address falls within a DSN address range associated with the index template. The method continues at step 392 where the processing module updates the identified one or more dispersed hierarchical indexes to include an entry associated with the provenance object. The updating includes generating an index key associated with the provenance information, generating the entry to include the provenance object and/or the provenance object DSN address and the index key, accessing a corresponding dispersed hierarchical indexes the one or more dispersed hierarchical indexes index using the index key to identify and recover an index node for updating (e.g., a leaf node), and updating the recovered index node to include the entry (e.g., modify and store in the DSN).

Figure 41:
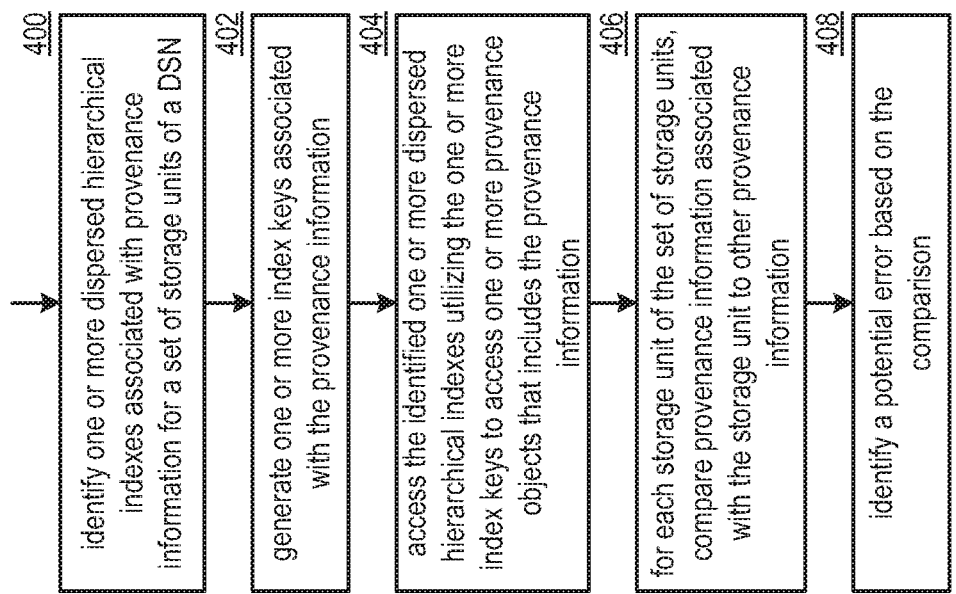
FIG. 41 is a flowchart illustrating an example of identifying a potential error in accordance with the present invention.

FIG. 41 is a flowchart illustrating an example of identifying a potential error within a dispersed storage network (DSN) as discussed with reference to FIG. 40A. The method begins with step 400 where a processing module (e.g., of a distributed storage and task (DST) client module, of a dispersed storage (DS) processing module) identifies one or more dispersed hierarchical indexes associated (e.g., as discussed with reference to FIGS. 40A-D) with provenance information for a set of storage units of the DSN. The identifying includes determining an error type of interest (e.g., initiating a query, receiving the error type of interest, performing a lookup, interpreting one or more error messages to produce the error type) and selecting the one or more dispersed hierarchical indexes based on the error type of interest and an index type. For example, the processing module selects an index associated with missing slices when the error type of interest includes unsuccessfully stored slices.

The method continues at step 402 where the processing module generates one or more index keys associated with the provenance information. The generating includes identifying one or more search attributes (e.g., time, a data identifier, a slice name, data type, a DSN entity identifier) based on one or more of the error type of interest and the one or more dispersed hierarchical indexes and selecting the one or more index keys based on the identified search attributes. For example, the processing module generates one or more index keys associated with a particular set of storage units of the DSN and a particular timeframe.

The method continues at step 404 where the processing module accesses the identified one or more dispersed hierarchical indexes utilizing the one or more index keys to access one or more provenance objects that includes the provenance information. The accessing includes searching each of the one or more identified dispersed hierarchical indexes using a corresponding index key of the one or more index keys to identify an index entry and retrieving a corresponding provenance object from the DSN based on a provenance object DSN address extracted from the index entry (e.g., issue read slice requests using the provenance object DSN address, receive slices, and decode the slices to reproduce the corresponding provenance object). Alternatively, the accessing includes extracting the provenance object directly from the identified index entry when the provenance object is available from the identified index entry.

For each storage unit of the set of storage units, the method continues at step 406 where the processing module compares provenance information associated with the storage unit to other provenance information. The comparing includes at least one of comparing the provenance information of the storage unit to similar provenance information of at least one other storage unit of the set of storage units and comparing the provenance information of the storage unit to an average value associated with provenance information of the set of storage units. For example, the processing module compares a latency time of the storage unit to an average latency time of the set of storage units.

The method continues at step 408 where the processing module identifies a potential error based on the comparison. The identifying includes indicating an error when the provenance information of the storage unit compares unfavorably (e.g., greater than a threshold value difference) to the similar provenance information of the at least one other storage unit. For example, the processing module indicates a potential error associated with writing slices when the comparison indicates that the at least one other storage unit has performed more slice writing tasks within a particular timeframe than that of the storage unit. As another example, the processing module indicates potential missing slices as the potential errors when the comparison indicates that the storage unit was offline when the potential missing slices were written to the set of storage units. Still further examples of potential errors includes one or more of identifiers of storage units with an error, and identity of a memory device associated with an error, and a DSN address range to be scanned for slice errors.

Figure 42A:
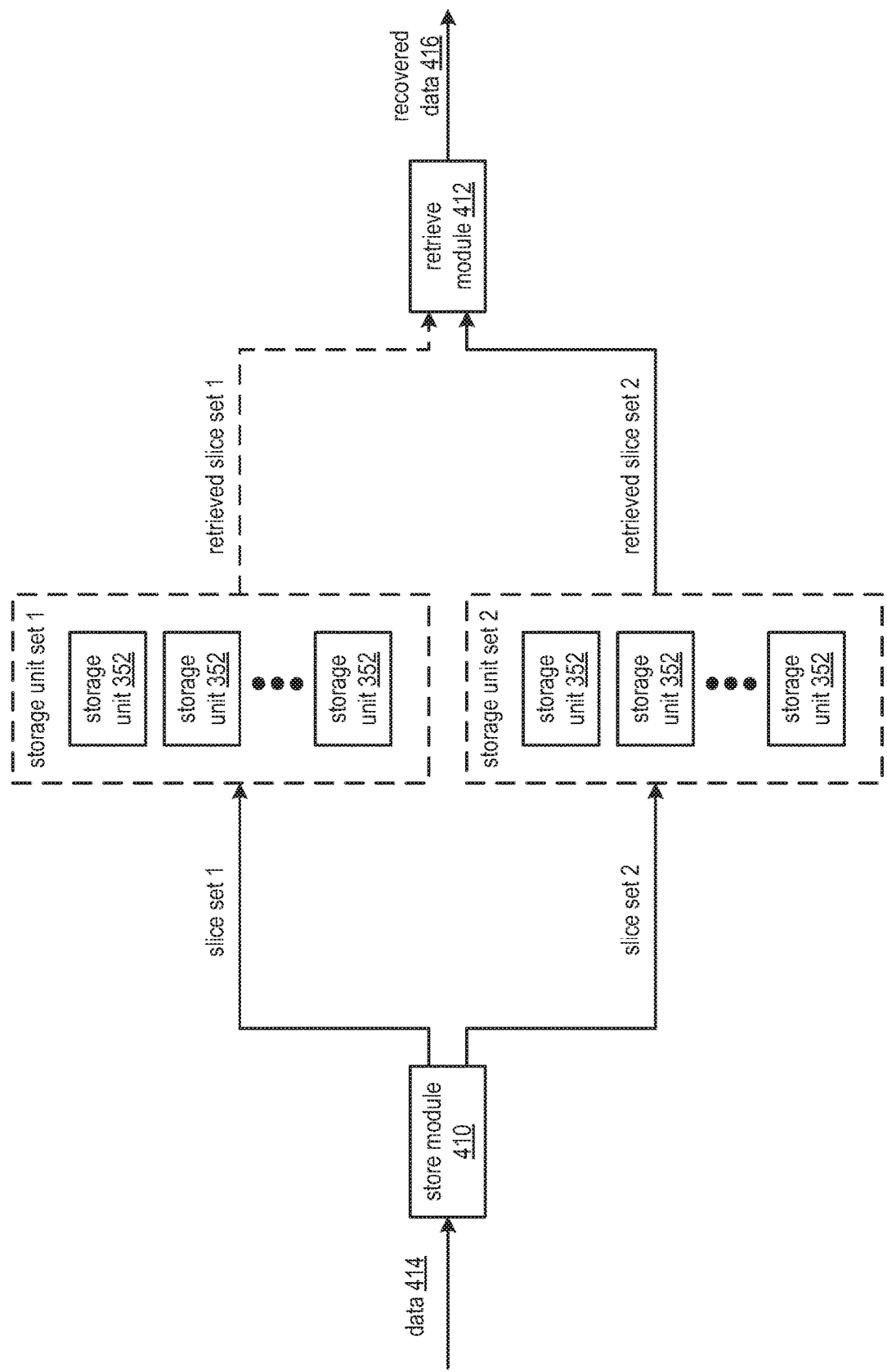
FIG. 42A is a diagram of another embodiment of a dispersed storage network in accordance with the present invention.

FIG. 42A is a diagram of another embodiment of a dispersed storage network (DSN) that includes a store module 410, a storage unit sets 1-2, and a retrieve module 412. The DSN may include any number of storage unit sets. The store module 410 and the retrieve module 412 may be implemented utilizing one or more of a dispersed storage (DS) processing module, a DS processing unit, a distributed storage and task (DST) processing module, the DST processing unit 16 of FIG. 1, and the user device 12 of FIG. 1. Each of the storage unit sets includes a set of storage units 352, where a number of storage units of each storage unit set is in accordance with a unique set of dispersal parameters associated with the storage unit set. Each set of dispersal parameters for the storage unit sets 1-2 is established to meet particular performance, reliability, and availability goals for storage and retrieval of data. For example, storage unit set 1 includes 16 storage units and storage unit set 2 includes three storage units when a pillar width of a first set of dispersal parameters associated with storage unit set 1 is 16 and a pillar width of a second set of dispersal parameters associated with storage unit set 2 is 3. In such an example, the pillar width of 16 may be established when a goal associated with storage unit set 1 includes higher than average storage availability and higher than average retrieval reliability and the pillar width of 3 may be established when a goal associated with storage unit set 2 includes minimizing input/output operations within the DSN to store and retrieve the data.

The DSN functions to receive data 414, store the data 414 in the storage unit sets, 1-2 and subsequently retrieve the data from the storage unit sets as recovered data 416. The store module 410 performs a series of steps to store the data 414 in the storage unit sets and the retrieve module 412 performs another series of steps to subsequently retrieve the data from the storage unit sets to produce the recovered data 416.

In an example of operation, the store module 410 receives the data 414 for storage (e.g., a data segment of the plurality of data segments of a data object) and encodes the data 414 using a dispersed storage error coding function and in accordance with the first set of dispersal parameters associated with the storage unit set 1 to produce slice set 1 of encoded data slices. The store module 410 outputs the slice set 1 to the storage unit set 1 for storage.

Having stored the data as the sliced set 1 in the storage unit set 1, the store module 410 generates a representation of the data to include at least one of the data, a compressed version of the data, a redacted version of the data, and a transformed version of the data. The store module 410 encodes the representation of the data using the dispersed storage error coding function and in accordance with the second set of encoded dispersal parameters associated with the storage unit set 2 to produce a slice set 2. For example, the store module 410 encodes the representation of the data to generate a set of three slices as slice set 2. The store module 410 outputs the slice set 2 to the storage unit set 1 for storage. The store module 410 updates one or more of a dispersed hierarchical index and a directory to include addressing information (e.g., a data ID, a data ID for the representation of the data, and one or more DSN addresses).

The retrieve module 412, when retrieving the data, identifies two or more sets of encoded data slices stored in two or more storage unit sets of the DSN. The retrieve module 412 selects one of the two or more sets of encoded data slices based on one or more of a predetermination, a DSN activity level, a reliability requirement, a timing performance requirements, and a bandwidth requirement. The selecting includes identifying the unique sets of dispersal parameters corresponding to each of the two or more sets of encoded data slices (e.g., a vault lookup, a registry information look up, initiating a query, receiving dispersal parameters) and selecting the one of the two or more sets of encoded data slices based on a corresponding unique set of dispersal parameters associated with the one of the two or more sets of encoded data slices. For example, the retrieve module 412 selects a unique set of dispersal parameters with a lowest pillar width when the DSN activity level indicates an above average level of activity. As another example, the retrieve module selects another unique set of dispersal parameters with a highest pillar width when the DSN activity level indicates a below-average level of activity and the reliability requirement includes a higher than average level of required reliability.

The retrieve module 412 determines whether at least a decode threshold number of encoded data slices of the selected set of encoded data slices are recoverable from a corresponding storage unit set. The determining includes at least one of issuing a list request, receiving a list response, issuing read slice requests, and receiving read slice responses that includes at least one of a retrieved slice set 1 and a retrieved slice set 2. When the decode threshold number of encoded data slices are recoverable, the retrieve module 412 decodes the at least the decode threshold number of retrieved encoded data slices using the dispersed storage error coding function and in accordance with the selected unique set of dispersal parameters to produce the recovered data 416. When the decode threshold number of encoded data slices are not recoverable, the retrieve module 412 selects another set of encoded data slices of the two or more sets of encoded data slices retrieves at least a decode threshold number of encoded data slices of the other set of encoded data slices, and decodes the at least the decode threshold number of encoded data slices of the other set of encoded data slices using the dispersed storage error coding function and in accordance with a corresponding unique set of dispersal parameters to produce the recovered data. The selecting the other set of encoded data slices includes selecting a next best set of unique set of dispersal parameters associated with the other set of encoded data slices. For example, the retrieve module selects the slice set 1 associated with the pillar width of 16 as the other set of encoded data slices.

Figure 42B:
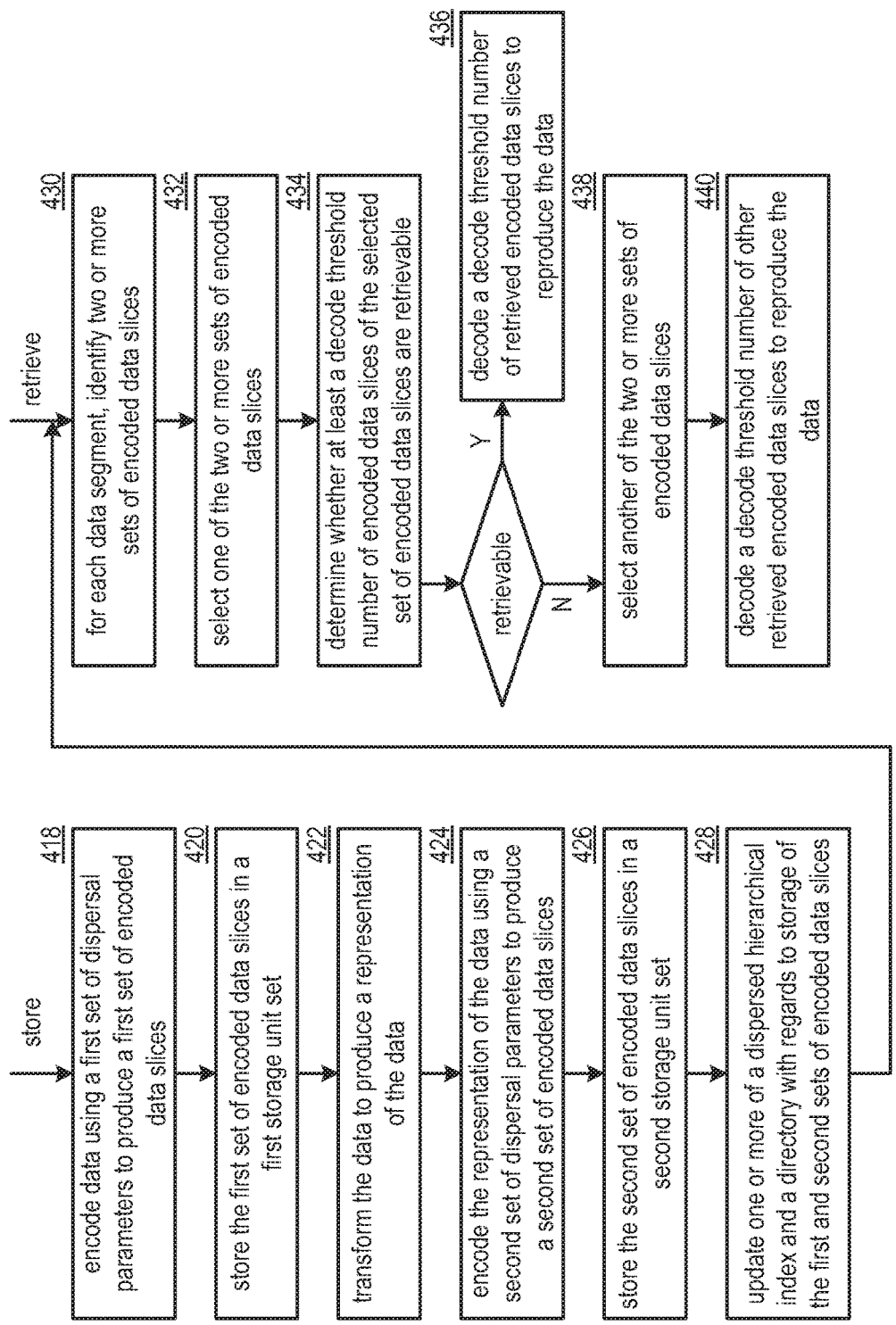
FIG. 42B is a flowchart illustrating an example of accessing data in accordance with the present invention.

FIG. 42B is a flowchart illustrating an example of accessing data. The method begins to store data with step 418 where a processing module (e.g., of a store module, of a retrieve module, of a distributed storage and task (DST) client module) encodes data using a dispersed storage error coding function in accordance with a first set of dispersal parameters to produce a first set of encoded data slices. The encoding may further include segmenting a data object to produce a plurality of data segments and encoding a first data segment of the plurality of data segments. The method continues at step 420 where the processing module stores the first set of encoded data slices in a first storage unit set. The storing includes generating a set of slice names, generating a set of write slice requests that includes the set of slice names and the first set of encoded data slices, and outputting the set of write slice requests to the first storage unit set.

The method continues at step 422 where the processing module transforms the data to produce a representation of the data. The transforming includes applying at least one of a null transformation, a compression algorithm, a redacting algorithm, an encryption algorithm, a deterministic function, and an interleaving function. The method continues at step 424 where the processing module encodes the representation of the data using the dispersed storage error coding function and in accordance with a second set of dispersal parameters to produce a second set of encoded data slices.

The method continues at step 426 where the processing module stores the second set of encoded data slices in a second storage unit set. The method continues at step 428 where the processing module updates one or more of a dispersed hierarchical indexes in a directory with regards to storage of the first and second sets of encoded data slices. The updating includes associating dispersed storage network (DSN) addresses of the first and second sets of encoded data slices with an identifier of the data.

The method continues, when retrieving data, at step 430 where, for each data segment of the plurality data segments, the processing module identifies two or more sets of encoded data slices. The identifying includes at least one of accessing the dispersed hierarchical index and accessing the directory to identify two or more DSN addresses associated with the two or more sets of encoded data slices. The method continues at step 432 where the processing module selects one of the two or more sets of encoded data slices. The selecting includes identifying a DSN address of a set of encoded data slices associated with an expected performance level that compares favorably to a desired performance level (e.g., a smallest width when minimizing input/output operations).

The method continues at step 434 where the processing module determines whether at least a decode threshold number of encoded data slices of the selected set of encoded data slices are retrievable (e.g., a list slices, attempting to retrieve slices). The method branches to step 438 when the at least the decode threshold number of encoded data slices of the selected set of encoded data slices are not retrievable. The method continues to step 436 when the at least the decode threshold number of encoded data slices of the selected set of encoded data slices are retrievable. The method continues at step 436 where the processing module decodes a decode threshold number of retrieved encoded data slices using the dispersed storage error coding function and in accordance with dispersal parameters associated with the selected set of encoded data slices to reproduce the data.

When the at least the decode threshold number of encoded data slices of the selected set of encoded data slices are not retrievable, the method continues at step 438 where the processing module selects another of the two or more sets of encoded data slices. The selecting includes identifying another DSN address of the other set of encoded data slices associated with an expected performance level that compares most favorably to the desired performance level (e.g., a next smallest width when minimizing input/output operations). The method continues at step 440 where the processing module decodes the decode threshold number of other retrieved encoded data slices using the dispersed storage error coding function and in accordance with dispersal parameters associated with the other set of encoded data slices to reproduce the data. Alternatively, or in addition to, the method may continue in a similar fashion to try as many of the two or more sets of encoded data slices to obtain at least a decode threshold number of encoded data slices.

Figure 43A:
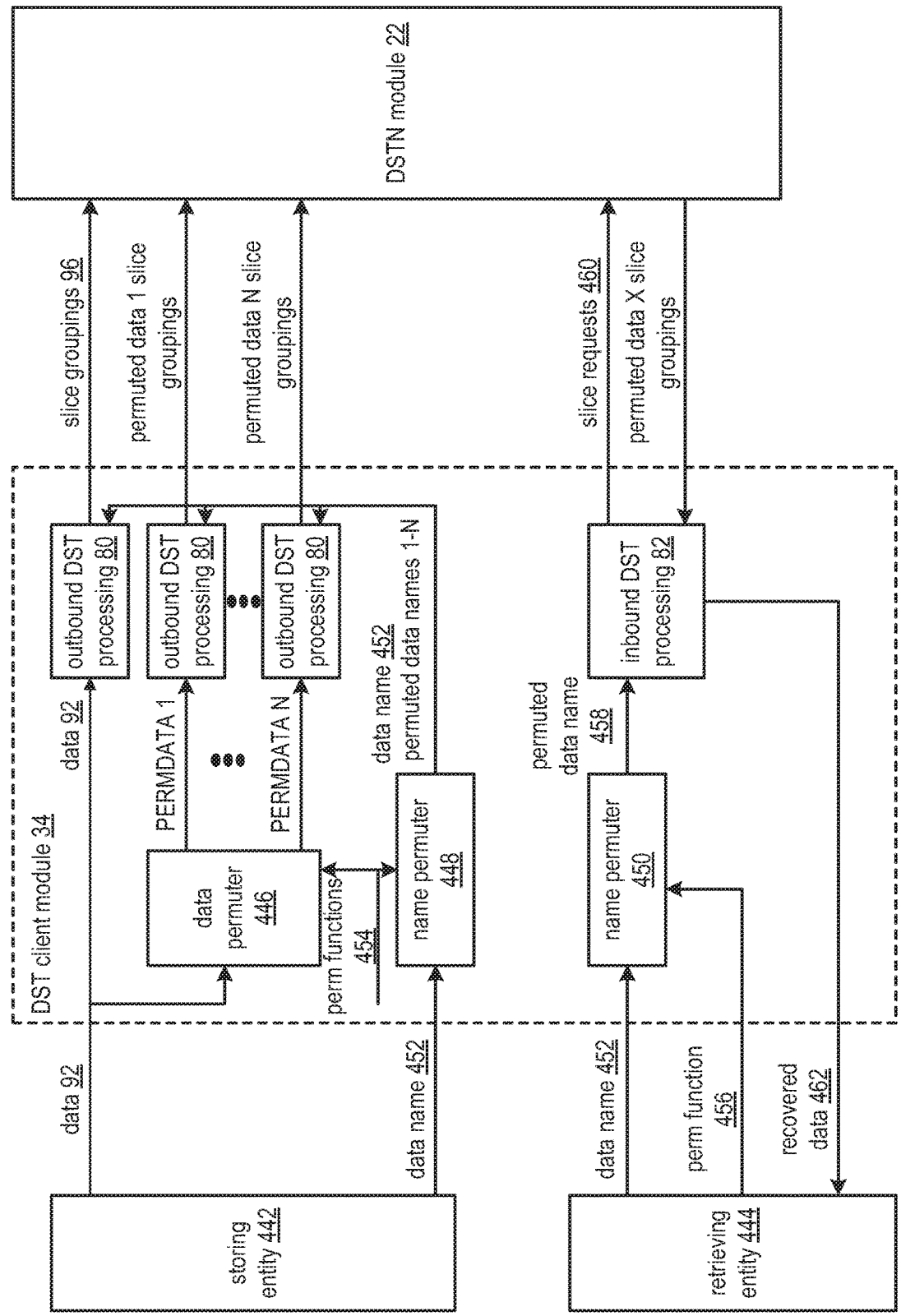
FIG. 43A is a diagram of another embodiment of a dispersed storage network in accordance with the present invention.

FIG. 43A is a diagram of another embodiment of a dispersed storage network (DSN) that includes a storing entity 442, a retrieving entity 444, the distributed storage and task (DST) client module 34 of FIG. 1, and the distributed storage and task network (DSTN) module 22 of FIG. 1. The storing entity 442 and retrieving entity 444 may be implemented utilizing one or more of a DS processing module, a DS processing unit, a DST processing module, the DST processing unit 16 of FIG. 1, the user device 12 of FIG. 1, a storage unit, a storage device, the DST execution unit 36 of FIG. 1, and a DS unit. The DSTN module 22 includes the plurality of DST execution units 36 of FIG. 1. The DST client module 34 includes a plurality of the outbound DST processing s 80 of FIG. 3, a data permuter 446, name permuters 448-450, and the inbound DST processing 82 of FIG. 3.

The DSN functions to store data 92 and one or more permutations (1-N) of the data in the DSTN module 22 and retrieves at least one of the data and one of the one or more permutations of the data from the DSTN module 22 to produce recovered data 462. The one or more permutations of the data provides reliable storage of variations of the data when the variations of the data may be desired for subsequent retrieval. Such variations of the data includes rescaling images, reformatting video, compressing data files, converting data files from a first industry standard format to a second industry standard format, etc.

The DSN stores the data 92 and the one or more permutations of the data in the DSN module 22 through a series of steps performed by the DST client module 34. The DST client module 34 obtains N permutation functions 454 based on at least one of a lookup, a predetermination, initiating a query, and receiving, and based on a type of data. The permutation functions includes at least one of a compression function, a rescaling function, a transformation function, a redacting function, and interleaving function, a reformatting function, and any other function to provide a variation of the data.

The name permuted 448 permutes a received data name 452 based on the permutation functions to produce a set of permuted data names 1-N. For example, the name permuted 448 performs a deterministic function on the data name 452 in accordance with each permutation function to produce the set of N permuted data names. The deterministic function includes at least one of a hashing function, a hash-based message authentication code, a mask generating function, a logical function, an arithmetic function, and a sponge function. For example, the name permuter 448 performs a hashing function on the data name 452 to produce an intermediate hash value and adds the intermediate hash value to the data name 452 to produce a first permuted data name of N permuted data names.

For each permutation function of the N permutation functions, the data permuter 446 permutes the data 92 using the permutation function 454 to produce a corresponding permuted data (e.g., PERMDAT1 through PERMDATN). For example, the data permuter permutes the data 92 using an image compression function to produce the PERM-DATA1 and permutes the data 92 using another image compression function (e.g., a further level of compression compared to the image compression function) to produce PERMDATA2.

For each of the data 92 and the permuted data 1-N, a corresponding outbound DST processing 80 encodes the data and each of the permuted data 1-N to produce a slice groupings 96 and permuted data 1-N slice groupings. Each of the outbound DST processing 80 output corresponding slice groupings to the DSTN module 22 for storage using the data name 452 and the permuted data names 1-N. For example, a first outbound DST processing 80 encodes the data 92 to produce the slice groupings 96, generates a set of slice names based on the data name 452, generates a set of write slice requests that includes the slice groupings 96 and set of slice names, and outputs the set of write slice requests to the DSTN module 22. As another example, a second outbound DST processing 80 encodes PERMDATA1 to produce the permuted data 1 slice groupings, generates another set of slice names based on permuted data name 1, generates another set of write slice requests that includes the permuted data 1 slice groupings and other set of slice names, and outputs the other set of write slice requests to the DSTN module 22.

The DSN retrieves the at least one of the data and the one of the one or more permutations of the data from the DSTN module 22 to produce the recovered data 462 by a series of steps performed by the DST client module 34. The name permuter 450 uses a received permutation function 456 from the retrieving entity 444 and the data name 452 from the retrieving entity 444 to deterministically generate a permuted data name 458 as previously discussed. The inbound DST processing 82 issues slice requests 460 to the DSTN module 22 based on the permuted data name 458. The issuing includes generating a set of slice names based on the permuted data name, generating a set of read slice requests that includes the set of slice names, and outputting the set of read slice requests to the DSTN module 22.

The inbound DST processing 82 receives corresponding permuted data X slice groupings (e.g., which may include at least some of slice groupings 96 when the permutation function is a function to retrieve the data 92). The inbound DST processing 82 decodes the permuted data X slice groupings using the dispersed storage error coding function to produce the recovered data 462.

Figure 43B:
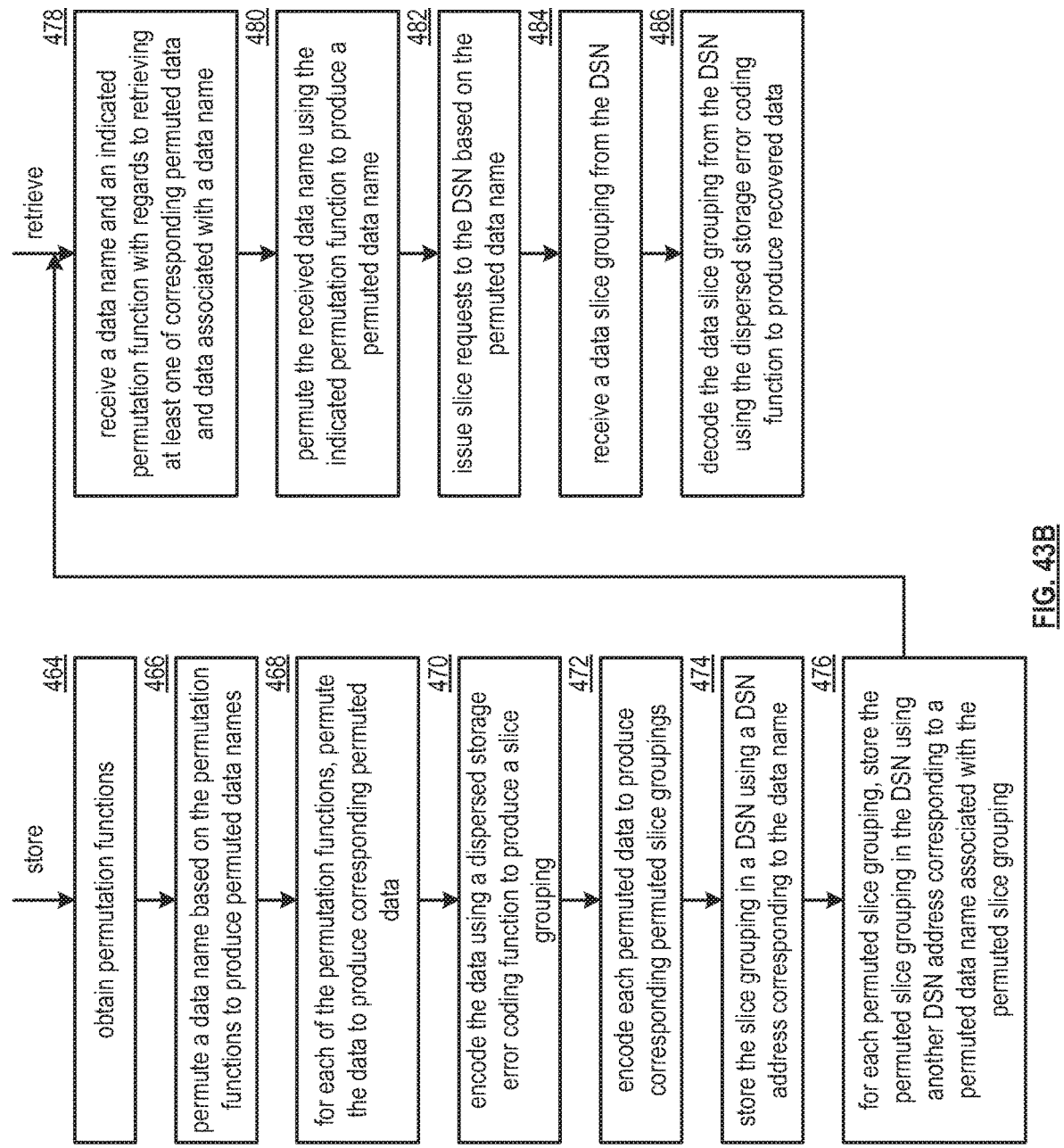
FIG. 43B is a flowchart illustrating an example of accessing permuted data in accordance with the present invention.

FIG. 43B is a flowchart illustrating an example of accessing permuted data. The method begins, when storing data, with step 464 where a processing module (e.g., of a distributed storage and task (DST) client module, of a dispersed storage (DS) processing module) obtains permutation functions. The method continues at step 466 where the processing module permutes a data name based on the permutation functions to produce permuted data names. The permuting of the data name includes performing a deterministic function on one or more of the data name and an attribute of a permutation function. For each of the permutation functions, the method continues at step 468 where the processing module permutes the data to produce corresponding permuted data. The permuting includes performing the permutation function on the data to produce the corresponding permuted data. The method continues at step 470 where the processing module encodes the data using a dispersed storage error coding function to produce a slice grouping.

The method continues at step 472 where the processing module encodes each permuted data using the dispersed storage error coding function to produce corresponding permuted slice groupings. The method continues at step 474 where the processing module stores the slice grouping in a dispersed storage network (DSN) memory using a DSN address corresponding to the data name. The storing includes generating at least one set of slice names based on the DSN address, generating at least one set of write slice requests that includes the at least one set of slice names and the slice grouping, and sending the at least one set of write slice request to the DSN memory.

For each permuted slice grouping, the method continues at step 476 where the processing module stores the permuted slice grouping in the DSN memory using another DSN address corresponding to a permuted data name associated with the permuted slice grouping. The storing includes determining the other DSN address based on the permuted data name, generating slice names based on the other DSN address, generating other write slice requests to include the slice names of the other DSN address and the permuted slice grouping, and outputting the other write slice requests to the DSN memory.

The method continues, when retrieving data, with step 478 where the processing module receives a data name and an indicated permutation function with regards to retrieving at least one of corresponding permuted data and data associated with the data name. The method continues at step 480 where the processing module permutes the received data name using the indicated permutation function to produce a permuted data name. The permuting may include performing a null permutation when recovering the data.

The method continues at step 482 where the processing module issues slice requests to the DSN memory based on the permuted data name. The issuing includes generating slice names based on the permuted data name, generating read slice requests that includes the slice names, and outputting the read slice requests to the DSN memory. The method continues at step 484 where the processing module receives a data slice grouping from the DSN. The data slice grouping includes at least one of a permuted slice grouping associated with the permuted data and a slice grouping associated with the data. The method continues at step 486 where the processing module decodes the data slice grouping from the DSN memory using the dispersed storage error coding function to produce recover data.

Figure 44A:
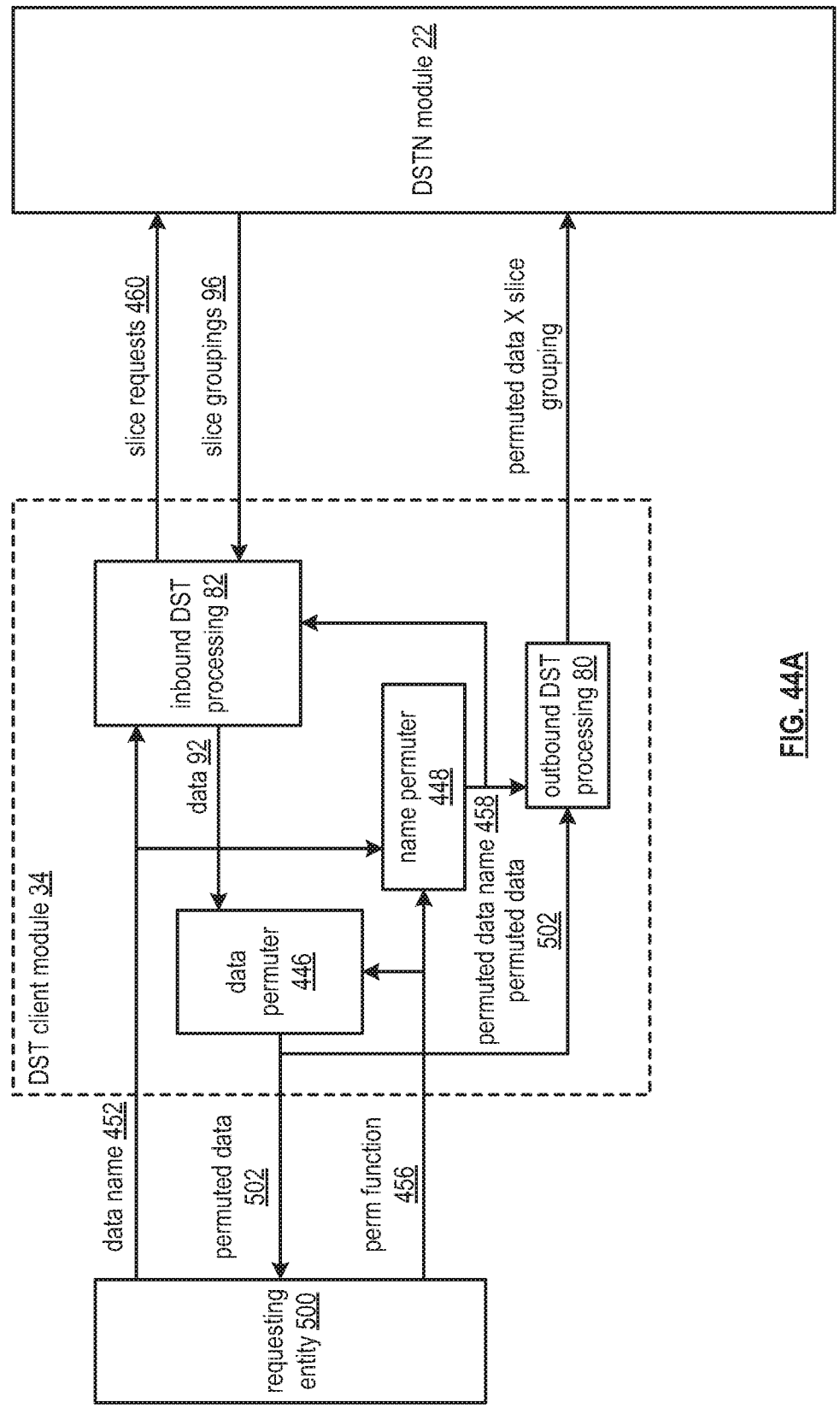
FIG. 44A is a diagram of another embodiment of a dispersed storage network in accordance with the present invention.

FIG. 44A is a diagram of another embodiment of a dispersed storage network (DSN) that includes a requesting entity 500, the distributed storage and task (DST) client module 34 of FIG. 43A, and the distributed storage and task network (DSTN) module 22 of FIG. 1. The requesting entity 500 may be implemented utilizing one or more of a DS processing module, a DS processing unit, a DST processing module, the DST processing unit 16 of FIG. 1, the user device 12 of FIG. 1, a storage unit, a storage device, the DST execution unit 16 of FIG. 1, and a DS unit. The DSTN module 22 includes the plurality of DST execution units 36 of FIG. 1. The DST client module 34 includes the data permuter 446 of FIG. 43A, the name permuter 448 of FIG. 43A, the inbound DST processing 82 of FIG. 3 and the outbound DST processing 80 of FIG. 3.

The DSN functions to produce one or more permutations (1-N) of data 92 recovered from storage within the DSTN module 22 and may function to store permuted data 502 in the DSTN module 22 once produced to facilitate immediate subsequent retrieval without a need to regenerate the permuted data 502. The one or more permutations of the data provides variations of the data when the variations of the data may be desired. Such variations of the data includes rescaled images, reformatting video, compressed data files, converted data files from a first industry standard format to a second industry standard format, etc.

The DSN produces the data permutation by a series of steps performed by the DST client module 34. The DST client module 34 receives a request for the permuted data that includes a data name 452 and a permutation function 456. The DST client module 34 determines whether the permuted data is already stored within the DSTN module 22. The determining includes the name permuter 448 permuting the data name 452 based on the permutation function to produce a permuted data name 458, the inbound DST processing 82 generating slice names based on the permuted data name 458, the inbound DST processing 82 generating at least one of a set of list slice requests and a set of read slice requests 460 that includes the slice names, the inbound DST processing 82 outputting the at least one of the set of lists slice request and the set of read slice requests 460 to the DSTN module 22, and the inbound DST processing 82 receiving responses that includes slice groupings 96. Alternatively, the determining includes accessing at least one of a directory and a dispersed hierarchical index utilizing the permuted data name to determine whether the permuted data has already been stored within the DSTN module.

When the permuted data has not already been stored within the DSTN module, the inbound DST processing 82 recovers the data 92 from the DSTN module. The recovering includes generating the slice names using the permuted data name 458, generating read slice requests 460 that includes the slice names, sending the read slice requests 460 to the DSTN module 22, receiving slice groupings 96 from the DSTN module 22, decoding the slice groupings 96 using a dispersed storage error coding function to reproduce the data 92. The data permuted 446 permutes the data 92 using the permutation function to produce the permuted data 502.

When storing the permuted data 502 in the DSTN module 22, the outbound DST processing 80 encodes the permuted data 502 using the dispersed storage error coding function to produce a permuted data X slice grouping, generates permuted slice names based on the permuted data name, generates one or more sets of write slice requests that includes the permuted slice names and the permuted data slice grouping, and outputs the one or more sets of write slice requests to the DSTN module 22

Figure 44B:
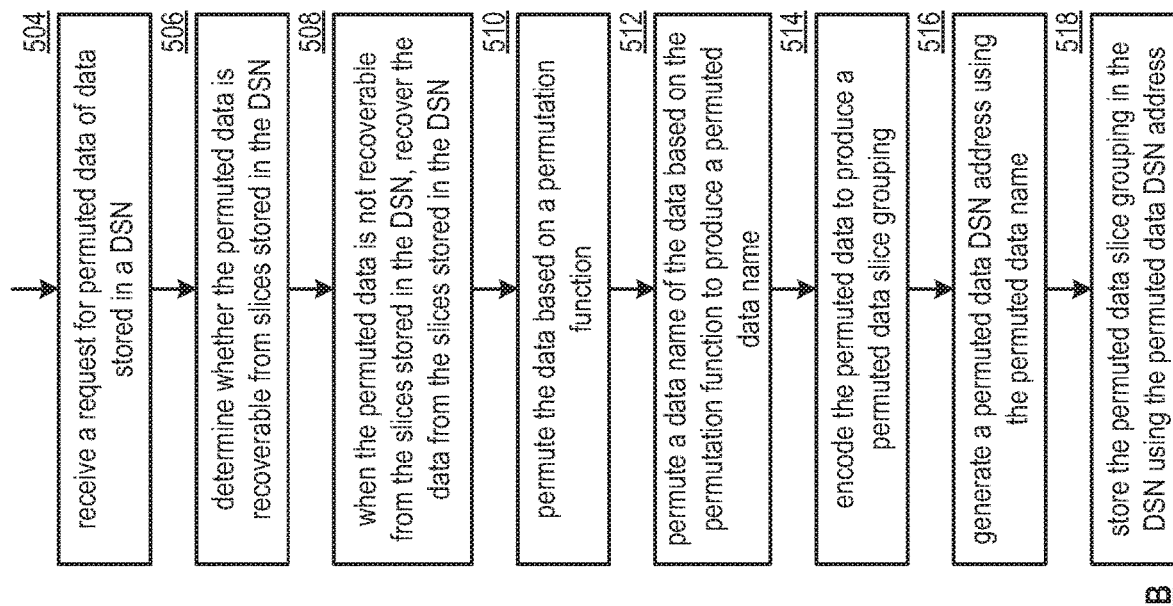
FIG. 44B is a flowchart illustrating another example of accessing permuted data in accordance with the present invention.

FIG. 44B is a flowchart illustrating another example of accessing permuted data. The method begins with step 504 where a processing module (e.g., of a distributed storage and task (DST) client module, of a dispersed storage (DS) processing module) receives a request for permuted data of data stored in a dispersed storage network (DSN). The request includes a data name and a permutation function identifier (ID). The method continues at step 506 where the processing module determines whether the permuted data is recoverable from slices stored in the DSN. The determining includes permuting the data name to produce a permuted data name, generating a permuted data DSN address using the permuted data name, generating permuted slice names using the permuted data DSN address, issuing read slice requests to the DSN that includes the permuted slice names, receiving responses, and indicating that the permuted data is recoverable when the responses are favorable (e.g., favorable when the slices of the permuted data are stored in the DSN). Alternatively, the processing module accesses at least one of a dispersed hierarchical index and a directory to determine whether the permuted DSN address exists.

When the permuted data is not recoverable from the slices stored in the DSN, the method continues at step 508 where the processing module recovers the data stored in the DSN from the slices stored in the DSN. The recovering includes generating a data DSN address using the data name, issuing read slice requests to the DSN that includes a data slice names based on the data DSN address, and decoding the retrieved data slices from received read slice responses to reproduce the data. The method continues at step 510 where the processing module permutes the data based on the permutation function identifier to produce the permuted data. For example, the processing module accesses a table of permutation functions using the permutation function identifier and performs the permutation function on the reproduce data to produce the permuted data. The method continues at step 512 where the processing module permutes the data name of the data using a deterministic function based on the permutation function to produce a permuted data name. For example, the processing module performs an exclusive OR function on a portion of the data name and a portion of the identifier of the permutation function to produce the permuted data name.

The method continues at step 514 where the processing module encodes the permuted data using a dispersed storage error coding function to produce a permuted data slice grouping. The method continues at step 516 where the processing module generates a permuted data DSN address using the permuted data name. For example, the processing module obtains a new DSN address for the permuted data name. The obtaining may include updating at least one of a dispersed hierarchical index and a directory to indicate an association between the permuted data name and the new DSN address for the permuted data name. The method continues at step 518 where the processing module stores the permuted data slice grouping in the DSN using the permuted data slice DSN address. The storing includes generating permuted slice names using the permuted DSN address, generating write slice requests that includes the permuted slice names and the permuted data slice grouping, and outputting the write slice requests to the DSN.

FIGS. 45A-D are diagrams of another embodiment of a dispersed storage network (DSN) illustrating an example of rebuilding data. The DSN includes the distributed storage and task (DST) client module 34 of FIG. 1, the network 24 of FIG. 1, and a DST execution unit set 520. The DST execution unit set 520 includes a set of DST execution units 1-8. Alternatively, the DST execution unit set 520 may include any number of DST execution units. Hereafter, the DST execution unit may be referred to interchangeably as a storage unit of a set of storage units. Each DST execution unit may be implemented utilizing the DST execution unit 36 of FIG. 1. The DST client module 34 includes the outbound DST processing 80 of FIG. 3 and the inbound DST processing 82 of FIG. 3. The outbound DST processing 80 includes the DS error encoding 112 of FIG. 4. The inbound DST processing 82 includes the DS error decoding 182 of FIG. 13 and an error detector 522. The error detector 522 may be implemented utilizing the processing module 84 of FIG. 3.

The DST client module 34 further includes a dispersed storage (DS) module. The DS module may be implemented utilizing a plurality of processing modules. For instance, the plurality of processing modules may include the processing module 84 of FIG. 3. As a specific example, the plurality of processing module includes a first module, a second module, a third module, a fourth module, a fifth module, and a sixth module.

The DSN functions to rebuild data associated with storage errors, where data is stored in the DST execution unit set 520. In an example of the storing of the data, DST client module 34 encodes a data segment in accordance with a dispersed storage error coding function to produce a set of encoded data slices (e.g., slices 1-8) and facilitates storage of the set of encoded data slices in the set of DST execution units 1-8 (e.g., set of storage units). The set of encoded data slices include a total number of encoded data slices. When subsequently retrieving the data segment, at least a decode threshold number of encoded data slices of the set of encoded data slices is required to recover the data segment, where the decode threshold number is less than the total number. A storage error includes at least one of a missing encoded data slice, a corrupted encoded data slice, and a missing revision of and encoded data slice.

FIG. 45A illustrates initial steps of the example of the rebuilding of the data, where the inbound DST processing 82 sends, via the network 24, representations of a read-rebuild inquiry request to storage units of the DSN, where the storage units collectively store the set of encoded data slices and where the data segment was encoded in accordance with the dispersed storage error coding function to produce the set of encoded data slices. As a specific example, the inbound DST processing 82 receives a read data request 524 that includes a data segment read request. Having received the data segment read request, the inbound DST processing 82 processes the data segment read request to produce the read-rebuild inquiry request. For example, the inbound DST processing 82 identifies the data segment based on the data segment read request and generates a DSN addressing information (e.g., generates a set of slice names) based on the identified data segment.

The sending of the representations of the read-rebuild inquiry request includes generating the representations of the read-rebuild inquiry request. As a specific example of the generating of the representations of the read-rebuild inquiry request, the inbound DST processing 82 generates read requests regarding a read threshold number of encoded data slices of the set of encoded data slices, where the read threshold number is less than the total number and equal to or greater than the decode threshold number. For instance, the inbound DST processing 82 generates read slice requests 1-6, where the read slice requests 1-6 includes slice names of the set of slice names that corresponds to encoded data slices 1-6 when the read threshold is 6.

Having generated the read requests, the inbound DST processing 82 generates status check requests regarding a difference number of encoded data slices of the set of encoded data slices, where the difference number is equal or less than a difference between the total number and the read threshold number. For example, the inbound DST processing 82 generates check slice requests 7-8, where the check slice requests 7-8 includes slice names of the set of slice names that corresponds to encoded data slices 7-8 when the total number is 8 and the read threshold number is 6.

Having generated the read requests and the status check request, the inbound DST processing 82 sends the read requests and a status check requests to the set of DST execution units 1-8. For example, the inbound DST processing 82 sends, via the network 24, the read slice requests 1-6 to DST execution units 1-6 and the inbound DST processing 82 sends, via the network 24, the check slice requests 7-8 to the DST execution units 7-8.

Alternatively, or in addition to, after sending the representations of the read-rebuild inquiry request and when another data segment read request for the data segment is not received prior to expiration of a status check time out period, the inbound DST processing 82 sends, via the network 24, status check requests regarding the set of encoded data slices to the set of DST execution units 520. For example, the inbound DST processing 82 generates check slice requests 1-8 and sends, via the network 24, the check slice requests 1-8 to the DST execution units 1-8.

FIG. 45B illustrates further steps of the example of the rebuilding of the data, where the inbound DST processing 82 receives, via the network 24, a decode threshold number of encoded data slices in response from at least some of the storage units, where the set of encoded data slices include the total number of encoded data slices, and where the decode threshold number is less than the total number. For example, DST execution units 1-6 issues read slice responses 1-6 to the inbound DST processing 82, where each read slice response includes one or more of a slice name, an encoded data slice, and one or more revision numbers when the read slice response includes at least one encoded data slice. For instance, the DST execution unit 1 generates the read slice response 1 to include encoded data slice 1, the DST execution unit 2 generates the read slice response 2 to include encoded data slice 2, the DST execution unit 4 generates the read slice response 4 to include encoded data slice 4, the DST execution unit 5 generates the read slice response 5 to include encoded data slice 5, and the DST execution unit 6 generates the read slice response 6 to include encoded data slice 6. As such, the inbound DST processing 82 receives encoded data slices 1, 2, 4, 5, and 6 as the decode threshold number of encoded data slices.

Having received the decode threshold number of encoded data slices from the read slice responses 1-6, inbound DST processing 82 receives a remaining number of slice status responses from one or more other storage units of the storage units regarding a remaining number of encoded data slices, where the remaining number is equal or less than a difference between the total number and the decode threshold number. The remaining number of slice status responses includes one or more of another read slice response and a status check response. As a specific example, the inbound DST processing 82 receives three slice status responses as the remaining number of slice status responses when the total number is 8 and the decode threshold number is 5. For instance, DST execution unit 3 generates a read slice response 3 without encoded data slice 3 when a storage error has occurred for encoded data slice 3 (e.g., missing, corrupted). As another instance, DST execution unit 7 generates a check slice response 7 that indicates a storage error associated with encoded data slice 7. As yet another instance, DST execution unit 8 generates a check slice response 8 that indicates that encoded data slice 8 is stored with no storage errors.

Having received the decode threshold number of encoded data slices, the DS error decoding 182 decodes the decode threshold number of encoded data slices to reproduce the data segment 526. For example, the DS error decoding 182 decodes encoded data slices 1, 2, 4, 5, and 6 using the dispersed storage error coding function to reproduce the data segment 526. Having received the remaining number of slice status responses, the error detector 522 interprets the remaining number of slice status responses to determine whether one of the remaining number of encoded data slices includes an error.

As a specific example of the interpreting of the remaining number of slice status responses, the error detector 522 determines whether, for one of the read requests, an encoded data slice was not received within a given time period (e.g., 5 seconds). For instance, the error detector 522 determines that the encoded data slice 3 was not received within the given time period. When the encoded data slice was not received in the given time period, the error detector 522 interprets the encoded data slice not being received within the given time frame as the one of the remaining number of slices status responses indicating that the encoded data slice includes the error. For instance, the error detector 522 indicates that encoded data slice three includes the error.

As another specific example of the interpreting of the remaining number of slice status responses, the error detector 522 determines whether, for one of the read requests, an encoded data slice was received within a given time period and includes a revision error. For instance, the error detector 522 determines that the most recent revision of encoded data slice 3 is missing. When the encoded data slice was received in the given time period and includes the revision error, the error detector 522 interprets the encoded data slice as the one of the remaining number of slices status responses indicating that the encoded data slice includes the error. For instance, the error detector 522 indicates that the encoded data slice 3 includes the error.

As yet another specific example of the interpreting of the remaining number of slice status responses, the error detector 522 determines whether, for one of the read requests, an encoded data slice was received within a given time period and includes a corruption error. For instance, the error detector 522 determines that the encoded data slice 3 includes the corruption error when a comparison of a received encoded data slice 3 compares unfavorably to a stored integrity information for the encoded data slice 3. When the encoded data slice was received in the given time period and includes the corruption error, the error detector 522 interprets the encoded data slice as the one of the remaining number of slices status responses indicating that the encoded data slice includes the error. For instance, the error detector 522 indicates that the encoded data slice 3 includes the error.

Alternatively, error detector 522 receives at least some of the remaining number of slice status responses in response to the status check requests. For example, the error detector 522 receives the check slice response 7, where the check slice response 7 indicates that at least one error has occurred (e.g., missing all revisions of encoded data slice 7, missing a most recent revision of the encoded data slice 7, encoded data slice 7 has failed and integrity test).

FIG. 45C illustrates further steps of the example of the rebuilding of the data, where the DS error decoding 182 outputs the reproduced data segment 526 and provides the reproduced data segment 526 to the DS error encoding 112. Having provided the reproduced data segment 526 to the DS error encoding 112, the error detector 522 outputs slice identities of the encoded data slices associated with errors to the DS error encoding 112. For example, the error detector 522 identifies encoded data slices 3 and 7 as including the errors.

FIG. 45D illustrates final steps of the example of the rebuilding of the data. When the one of the remaining number of encoded data slices includes the error, the DS error encoding 112 generate a rebuilt encoded data slice based on the reproduced data segment to replace the one of the remaining number of encoded data slices that includes the error. For example, the DS error encoding 112 encodes the reproduced data segment 526 using the dispersed storage error encoding function to reproduce the set of encoded data slices.

Having reproduced the set of encoded data slices, the DS error encoding 112 identifies one or more of the reproduced encoded data slices based on the identified encoded data slices that includes the errors. For example, the DS error encoding 112 identifies reproduced encoded data slices 3 and 7 based on the identified encoded data slices 3 and 7 as including the errors. Having identified the one or more reproduced encoded data slices, the outbound DST processing 80 sends, via the network 24, the identified reproduced encoded data slices to the corresponding DST execution units of the DST execution unit set 520 for storage. For example, the outbound DST processing 80 sends, via the network 24, a write slice request 3 to the DST execution unit 3, where the write slice request 3 includes the reproduced encoded data slice 3 and the outbound DST processing 80 sends, via the network 24, a write slice request 7 to the DST execution unit 7, where the write slice request 7 includes the reproduced encoded data slice 7.

FIG. 45E is a flowchart illustrating an example of rebuilding data. The method begins at step 530 where a processing module of a dispersed storage network (DSN) (e.g., of a distributed storage and task (DST) client module) sends representations of a read-rebuild inquiry request to storage units of the DSN, where the storage units collectively store a set of encoded data slices and where a data segment was encoded in accordance with a dispersed storage error coding function to produce the set of encoded data slices. The sending may include one or more of interpreting a test schedule, interpreting an error message, and processing a data segment read request to produce the read-rebuild inquiry request.

The sending further includes generating the representations of the read-rebuild inquiry request. As a specific example, the processing module generates read requests regarding a read threshold number of encoded data slices of the set of encoded data slices, where the read threshold number is less than the total number and equal to or greater than the decode threshold number. For instance, the processing module generates 6 read requests when the read threshold is 6, the total number is 8, and the decode number is 5.

As another specific example, the processing module generates status check requests regarding a difference number of encoded data slices of the set of encoded data slices, where the difference number is equal or less than a difference between the total number and the read threshold number. For instance, the processing module generates 2 status check requests when the difference number is 2 (e.g., 2=8-6).

Alternatively, or in addition to, after sending the representations of the read-rebuild inquiry request and when another data segment read request for the data segment is not received prior to expiration of a status check time out period, the processing module sends status check requests regarding the set of encoded data slices. For instance, the processing module sends 8 status check requests regarding the set of encoded data slices to the storage units.

The method continues at step 532 where the processing module receives a decode threshold number of encoded data slices in response from at least some of the storage units, where the set of encoded data slices include the total number of encoded data slices, and where the decode threshold number is less than the total number. For example, the processing module receives read responses that includes the decode threshold number (e.g., 5) of encoded data slices.

The method continues at step 534 where the processing module receives a remaining number of slice status responses from one or more other storage units of the storage units regarding a remaining number of encoded data slices, where the remaining number is equal or less than a difference between the total number and the decode threshold number. The processing module receives at least some of the remaining number of slice status responses in response to the status check requests. As a specific example, the processing module receives 3 slice status responses (e.g., 8−5=3), where the 3 slice status responses includes a 6th read response and two status check responses. The method continues at step 536 where the processing module decodes the decode threshold number of encoded data slices to reproduce the data segment.

The method continues at step 538 where the processing module interprets the remaining number of slice status responses to determine whether one of the remaining number of encoded data slices includes an error. As a specific example, the processing module determines whether, for one of the read requests, an encoded data slice was not received within a given time period. When the encoded data slice was not received in the given time period, the processing module interprets the encoded data slice not being received within the given time frame as the one of the remaining number of slices status responses indicating that the encoded data slice includes the error.

As another specific example, the processing module determines whether, for one of the read requests, an encoded data slice was received within a given time period and includes a revision error. When the encoded data slice was received in the given time period and includes the revision error, the processing module interprets the encoded data slice as the one of the remaining number of slices status responses indicating that the encoded data slice includes the error.

As yet another example, the processing module determines whether, for one of the read requests, an encoded data slice was received within a given time period and includes a corruption error. When the encoded data slice was received in the given time period and includes the corruption error, the processing module interprets the encoded data slice as the one of the remaining number of slices status responses indicating that the encoded data slice includes the error.

When the one of the remaining number of encoded data slices includes the error, the method continues at step 540 where the processing module generates a rebuilt encoded data slice based on the reproduced data segment to replace the one of the remaining number of encoded data slices that includes the error. For example, the processing module disperse storage error encodes the reproduced data segment to produce a reproduced set of encoded data slices. Having produced the reproduced set of encoded data slices, the processing module identifies the rebuilt encoded data slice based on the one of the remaining number of encoded data slices that includes the error.

FIG. 46A is a diagram of another embodiment of a dispersed storage network (DSN) that includes a configuration module 542, a DSN memory 544, and a DSN entity 546. The configuration module 542 and the DSN entity 546 may be implemented using one or more of a dispersed storage (DS) processing module, a DS processing unit, a dispersed storage and task (DST) processing module, the DST processing unit 16 of FIG. 1, the user device 12 of FIG. 1, a DS managing unit, the DSTN managing unit 18 of FIG. 1, the DST execution unit 36 of FIG. 1, and a DS unit. The DSN memory 544 includes a plurality of storage devices, where a storage device may be implemented using one or more of a memory device, a memory array, a storage unit, the DS unit, the DST execution unit 36 of FIG. 1, and the user device 12 of FIG. 1.

The system functions to provide an install package, including at least one of software 548 (e.g., executable instructions for a processing module of the DSN entity 546) and configuration information (e.g., memory mapping, memory allocation, port mapping, device type, identity information, security information, registration information, which portions of the software to execute, a DSN address range, access control list information, permissions information, etc.), and to utilize the install package. The configuration module 542 performs a series of steps to provide the install package. The configuration module 542 determines to provide the install package based on at least one of interpreting a schedule, detecting that the DSN entity 546 is in need of the install package, detecting that the DSN entity 546 has been replaced, receiving a request, detecting a software failure associated with the DSN entity 546, detecting a configuration failure associated with the DSN entity 546, and receiving an error message. For example, the DSN entity 546 is installed and sends a message to the configuration module indicating that the DSN entity 546 is available for assignment within the DSN.

The configuration module 542 identifies the DSN entity 546 by at least one of initiating a query, interpreting an error message, and receiving an identifier of the DSN, where the identifier includes at least one of an Internet protocol (IP) address, a universal unique identifier (UUID), and any other identifier. The configuration module 542 generates the configuration information for the DSN entity 546 based on one or more of an entity type of the DSN entity 546 and one or more vault assignments for the DSN entity 546. For example, the configuration module 542 accesses registry information associated with a vault assigned to the DSN entity 546 to retrieve at least a portion of the configuration information. The configuration module 542 obtains the software 548 for the DSN entity 546. The obtaining includes at least one of initiating a query to a software server, receiving the software 548 from the software server, accessing a manufacturer software distribution portal, and auto-generating the software 548 based on requirements listed within registry information of the DSN.

The configuration module 542 generates the install package to include the configuration information and the software 548. The configuration module 542 encodes the install package using a dispersed storage error coding function to produce a plurality of sets of install package slices 550. The configuration module 542 sends the plurality of sets of install package slices 550 to the DSN memory 544 for storage. The configuration module 542 updates at least one of a dispersed hierarchical index and a DSN directory to associate the identifier of the DSN entity and a DSN address utilized to store the plurality of sets of install package slices in the DSN memory. The updating of the dispersed hierarchical index includes generating a new entry (e.g., that includes the identifier the DSN entity and the DSN address) for the dispersed hierarchical index, encoding the new entry using the dispersed storage error coding function to produce a set of install index slices 552, and sending the set of install index slices 552 to the DSN memory 544 for storage.

The DSN entity 546 performs a series of steps to utilize the install package. The DSN entity 546 determines that at least one of the configuration information and the software 548 is required (e.g., detecting an error, receiving a new assignment message, receiving a reconfiguration request, receiving notification that a new version of software is available, etc.). The DSN entity 546 accesses the at least one of the dispersed hierarchical index and the DSN directory to identify the DSN address associated with the install package. The accessing of the dispersed hierarchical index includes generating an index key associated with the identifier of the DSN entity, issuing index slice requests 554 to the DSN memory 544 based on the index key and receiving install index slices 556 to search the dispersed hierarchical index for an index node that includes the entry associated with the DSN entity, decoding the install index slices 552 to reproduce a recovered index node that includes the entry, and extracting the DSN address associated with the install package from the entry of the recovered index node.

The DSN entity 546 issues one or more sets of install package slice requests 558 using the DSN address associated with the install package to the DSN memory. The DSN entity 546 receives install package slice responses 560 from the DSN memory 544 that includes at least a decode threshold number of install package slices for each set of install package slices of the plurality of sets of install package slices. For each set of install package slices, the DSN entity 546 decodes the at least the decode threshold number of install package slices to reproduce at least a portion of the install package. The DSN entity 546 extracts the at least one of the configuration information and the software 548 from the reproduced install package. The DSN entity 546 utilizes the at least one of the configuration information and the software 548. For example, the DSN entity installs the software 548 within memory of the DSN entity, writes the configuration information to memory of the DSN entity, and activates the software 548.

FIG. 46B is a flowchart illustrating an example of updating configuration information and software. A method to perform a series of steps to store and utilize an install package begins with step 562 where a configuration module (e.g., a dispersed storage (DS) managing unit) determines to provide the install package for a dispersed storage network (DSN) entity (e.g., a DS processing unit). The method continues at 564 where the configuration module identifies the DSN entity. The identifying includes at least one of obtaining an identifier of the DSN entity and identifying a DSN entity type. The method continues at step 566 where the configuration module generates configuration information for the DSN entity. The generating includes at least one of performing a lookup, retrieving, accessing registry information based on one or more of the identifier the DSN entity and the DSN entity type, and determining based on a configuration algorithm. The method continues at step 568 where the configuration module obtains software for the DSN entity. The obtaining includes at least one of initiating a request, receiving, and retrieving.

The method continues at step 570 where the configuration module generates the install package to include one or more of the configuration information, the software, the identifier of the DSN entity, an identifier of the configuration module, a timestamp, a revision indicator, integrity information, and the DSN entity type. The method continues at step 572 where the configuration module encodes the install package using a dispersed storage error coding function to produce a plurality of sets of install package slices. The method continues at step 574 where the configuration module stores the plurality of sets of install package slices in a DSN. For example, the configuration module generates a DSN address associated with the install package, generates a plurality of sets of slice names based on the DSN address, generates one or more sets of write slice requests that includes the plurality of sets of slice names and the plurality of sets of install package slices, and outputs the one or more sets of write slice requests to the DSN.

The method continues at step 576 where the configuration module updates a dispersed hierarchical index to associate the identifier the DSN entity and the DSN address. The updating includes generating an entry that includes the identifier the DSN entity and the DSN address, recovering an index node of the dispersed hierarchical index based on the identifier of the DSN entity, modifying the recovered index node to include the entry to produce a modified index node, encoding the modified index node using the dispersed storage error coding function to produce a set of updated index node slices, and issuing a set of write slice request to the DSN where the set of write slice requests includes the updating the set of index node slices.

The method continues to perform more steps associated with using the install package and begins with step 578 where the DSN entity determines that at least one of current configuration information of the DSN entity and current software of the DSN entity requires updating. The determining includes at least one of detecting an error, receiving a message with regards to an update, receiving and indicator for a new configuration assignment, receiving an error message. The method continues at step 580 where the DSN entity accesses at least one of the dispersed hierarchical index and a DSN directory to identify the DSN address associated with the install package for the DSN entity. The method continues at step 582 where the DSN entity issues install package slice requests using the DSN address to the DSN. The method continues at step 584 where they DSN entity receives install package slice responses.

The method continues at step 586 where the DSN entity decodes the install package slices using the dispersed storage error coding function to reproduce the install package. The method continues at step 588 where the DSN entity extracts at least one of the configuration information and the software from the install package. The DSN entity may select a portion of the at least one of the configuration information and the software based on the determining that the at least one of the current configuration information and the current software requires updating. The method continues at step 590 where the DSN entity activates the at least one of the configuration information and the software within the DSN entity. For example, the DSN entity installs the software, installs the configuration information, and reboots to use the install package.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more computing devices of a dispersed storage network (DSN), the method comprises:
    executing a read request regarding a set of encoded data slices stored in storage units of the DSN, wherein a data segment of data is encoded in accordance with a dispersed storage error coding function to produce the set of encoded data slices, and wherein a decode threshold number of encoded data slices of the set of encoded data slices is required to rebuild the data segment;
    reconstructing the data segment from at least the decode threshold number of encoded data slices of the set of encoded data slices, wherein the at least the decode threshold number of encoded data slices are included in read responses from the storage units;
    determining an encoded data slice of the set of encoded data slices not used in the reconstructing needs to be rebuilt; and
    rebuilding the encoded data slice using the reconstructed data segment.

2. The method of claim 1, wherein the determining the encoded data slice requires rebuilding comprises:
    interpreting a read response of the read responses to determine a revision error of the encoded data slice.

3. The method of claim 1, wherein the determining the encoded data slice requires rebuilding comprises:
    determining that an expected read response to the read request was not received.

4. The method of claim 1, wherein the determining the encoded data slice requires rebuilding comprises:
    interpreting a read response of the read responses to determine that the encoded data slice is corrupted.

5. The method of claim 1, wherein the determining the encoded data slice requires rebuilding comprises:
    interpreting a read response of the read responses to determine an integrity check value does not substantially match a known integrity check value for the encoded data slice.

6. The method of claim 1, wherein the determining the encoded data slice requires rebuilding comprises:
    determining the encoded data slice is flagged in a rebuilding list.

7. The method of claim 1, wherein the determining the encoded data slice requires rebuilding comprises:
    determining the encoded data slice as being previously identified during a rebuilding process.

8. The method of claim 1 further comprises:
    subsequent to the reconstructing the data segment, determining to temporarily keep the reconstructed data segment until the expiration of a time period.

9. The method of claim 8 further comprises:
    receiving a second read request for the set of encoded data slices; and
    determining to use the reconstructed data segment in executing the second read request.

10. A computing device of a dispersed storage network (DSN) comprises:
    an interface;
    memory; and
    a processing module operably coupled to the memory and the interface, wherein the processing module is operable to:
    execute a read request regarding a set of encoded data slices stored in storage units of the DSN, wherein a data segment of data is encoded in accordance with a dispersed storage error coding function to produce the set of encoded data slices, and wherein a decode threshold number of encoded data slices of the set of encoded data slices is required to rebuild the data segment;
    reconstruct the data segment from at least the decode threshold number of encoded data slices of the set of encoded data slices, wherein the at least the decode threshold number of encoded data slices are included in read responses from the storage units;
    determine an encoded data slice of the set of encoded data slices not used in the reconstructing needs to be rebuilt; and
    rebuild the encoded data slice using the reconstructed data segment.

11. The computing device of claim 10, wherein the processing module is operable to determine the encoded data slice requires rebuilding by:
    interpreting a read response of the read responses to determine a revision error of the encoded data slice.

12. The computing device of claim 10, wherein the processing module is operable to determine the encoded data slice requires rebuilding by:
    determining that an expected read response to the read request was not received.

13. The computing device of claim 10, wherein the processing module is operable to determine the encoded data slice requires rebuilding by:
    interpreting a read response of the read responses to determine that the encoded data slice is corrupted.

14. The computing device of claim 10, wherein the processing module is operable to determine the encoded data slice requires rebuilding by:
    interpreting a read response of the read responses to determine an integrity check value does not substantially match a known integrity check value for the encoded data slice.

15. The computing device of claim 10, wherein the processing module is operable to determine the encoded data slice requires rebuilding by:
    determining the encoded data slice is flagged in a rebuilding list.

16. The computing device of claim 10, wherein the processing module is operable to determine the encoded data slice requires rebuilding by:
    determining the encoded data slice as being previously identified during a rebuilding process.

17. The computing device of claim 10, wherein the processing module, subsequent to the reconstructing the data segment, is operable to:
    determine to temporarily keep the reconstructed data segment until the expiration of a time period.

18. The computing device of claim 17, wherein the processing module is further operable to:

receive, via the interface, a second read request for the set of encoded data slices; and determine to use the reconstructed data segment in processing the second read request.

* * * * *